United States Patent
Kakutani et al.

(10) Patent No.: US 6,203,134 B1
(45) Date of Patent: Mar. 20, 2001

(54) DOT RECORDING METHOD AND DOT RECORDING DEVICE

(75) Inventors: Toshiaki Kakutani; Kazumichi Shimada, both of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/147,363

(22) PCT Filed: Apr. 7, 1998

(86) PCT No.: PCT/JP98/01606

§ 371 Date: Dec. 8, 1998

§ 102(e) Date: Dec. 8, 1998

(87) PCT Pub. No.: WO98/45120

PCT Pub. Date: Oct. 15, 1998

(30) Foreign Application Priority Data

Apr. 8, 1997 (JP) .................................................. 9-106736
Apr. 6, 1998 (JP) ................................................ 10-110222

(51) Int. Cl.[7] .............................. B41J 2/205; B41J 29/38; B41J 2/145; B41J 2/15

(52) U.S. Cl. .................................. 347/15; 347/9; 347/16; 347/41

(58) Field of Search ................................. 347/15, 14, 12, 347/16, 41, 9

(56) References Cited

U.S. PATENT DOCUMENTS 4,920,355 * 4/1990 Katerberg .............................. 347/43
6,086,181 * 7/2000 Majette et al. ........................ 347/16

OTHER PUBLICATIONS

U.S. application No. 09/147,363, filed Dec. 8, 1998, pending.
U.S. application No. 09/249,140, filed Feb. 12, 1999, pending.
U.S. application No. 09/147,363, filed Dec. 8, 1998, pending.
U.S. application No. 09/539,886, filed Mar. 31, 2000, pending.

* cited by examiner

Primary Examiner—Thinh Nguyen
(74) Attorney, Agent, or Firm—Oblon, Spivak, McClelland, Maier & Neustadt, P.C.

(57) ABSTRACT

The pitch k of dot-forming elements is set at a product m·n of two integers m and n (where m an n are integers of no less than 2). The sub-scan feed is executed by plural sub-scan feed sets, each consisting of m sub-scan feeds. When feed amounts of the m sub-scan feeds in each sub-scan feed set are expressed as Li dots (where i is an integer of 1 to m), the following (1) and (2) hold: (1) the feed amounts Li (i=1 to (m−1)) at first through (m−1)-th sub-scan feeds are established so that a remainder obtained by dividing each feed amount Li by the pitch k is equal to the integer n; (2) a feed amount Lm in the m-th sub-scan is established so that a remainder obtained by dividing the feed amount Lm by the pitch k is an integer that is different from a value n·j that is j times the integer n (where j denotes an arbitrary integer).

20 Claims, 43 Drawing Sheets

Fig. 5(A) ARRANGEMENT OF NOZZLE ARRAYS
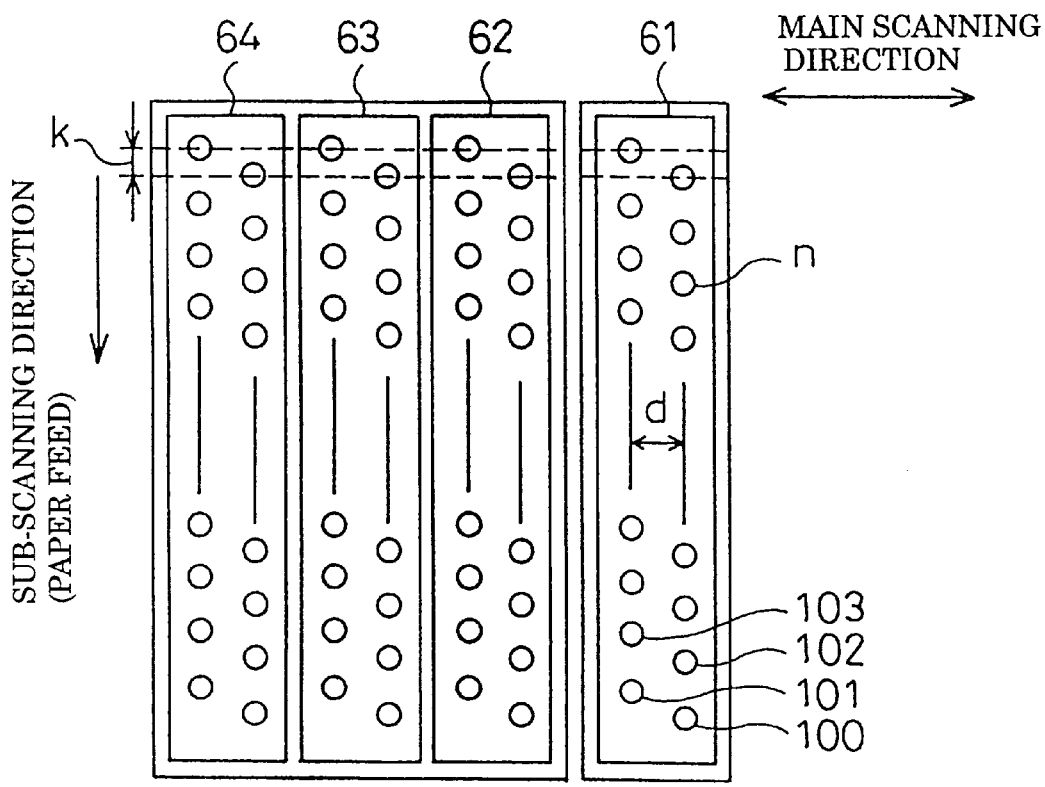
Fig. 5(B) DOTS FORMED BY ONE NOZZLE ARRAY
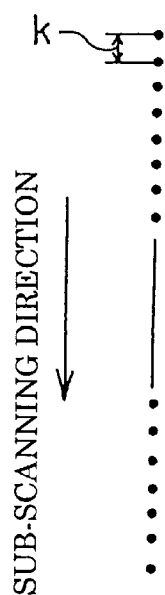

Fig. 6(A) CONCEPT OF SUB-SCAN FEED (s=1)
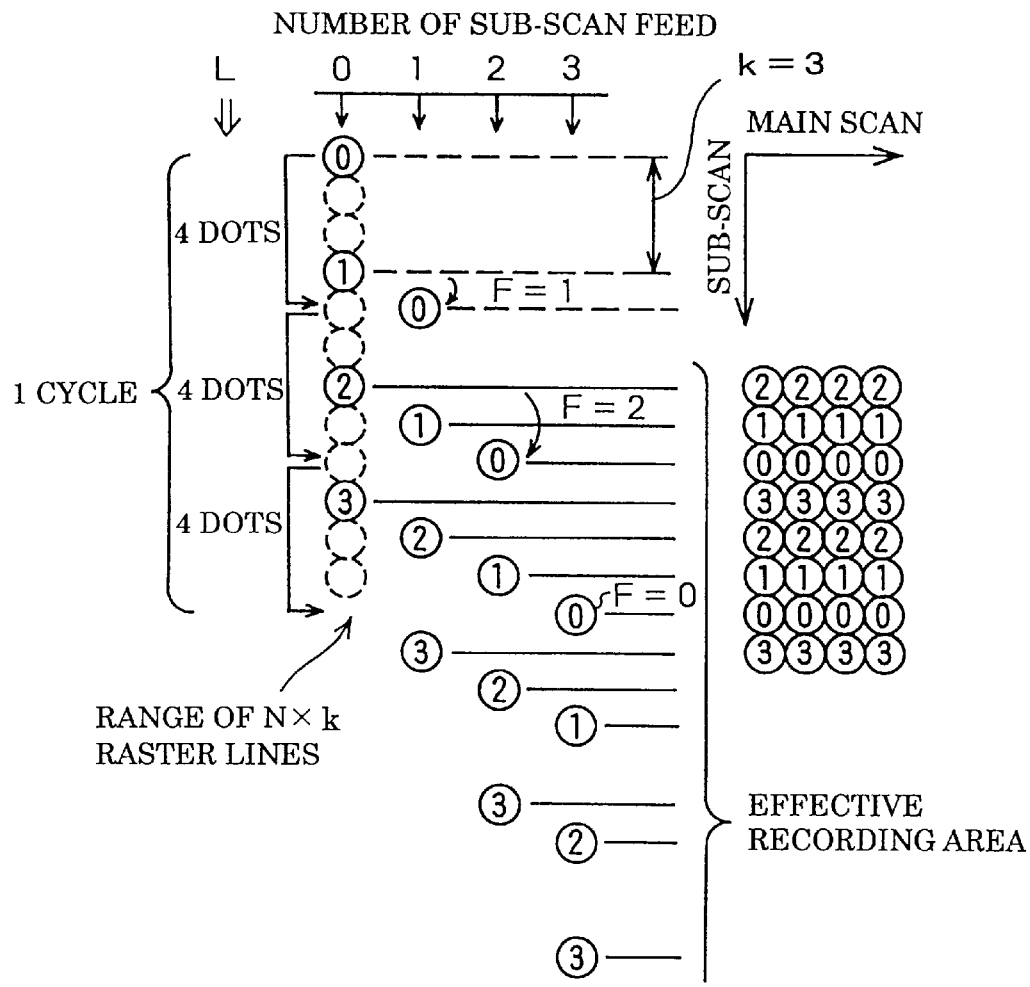
Fig. 6(B) PARAMETERS
NOZZLE PITCH k : 3 [dot]
NUMBER OF USED NOZZLES N : 4
NUMBER OF SCAN REPEATS s : 1
NUMBER OF EFFECTIVE NOZZLES Neff : 4
| NUMBER OF SUB-SCAN FEED | 0 | 1 | 2 | 3 |
|---|---|---|---|---|
| FEED AMOUNT L [dot] | 0 | 4 | 4 | 4 |
| ΣL | 0 | 4 | 8 | 12 |
| F = (ΣL) % k | 0 | 1 | 2 | 0 |

Fig. 7 (A) CONCEPT OF SUB-SCAN FEED (s=2)
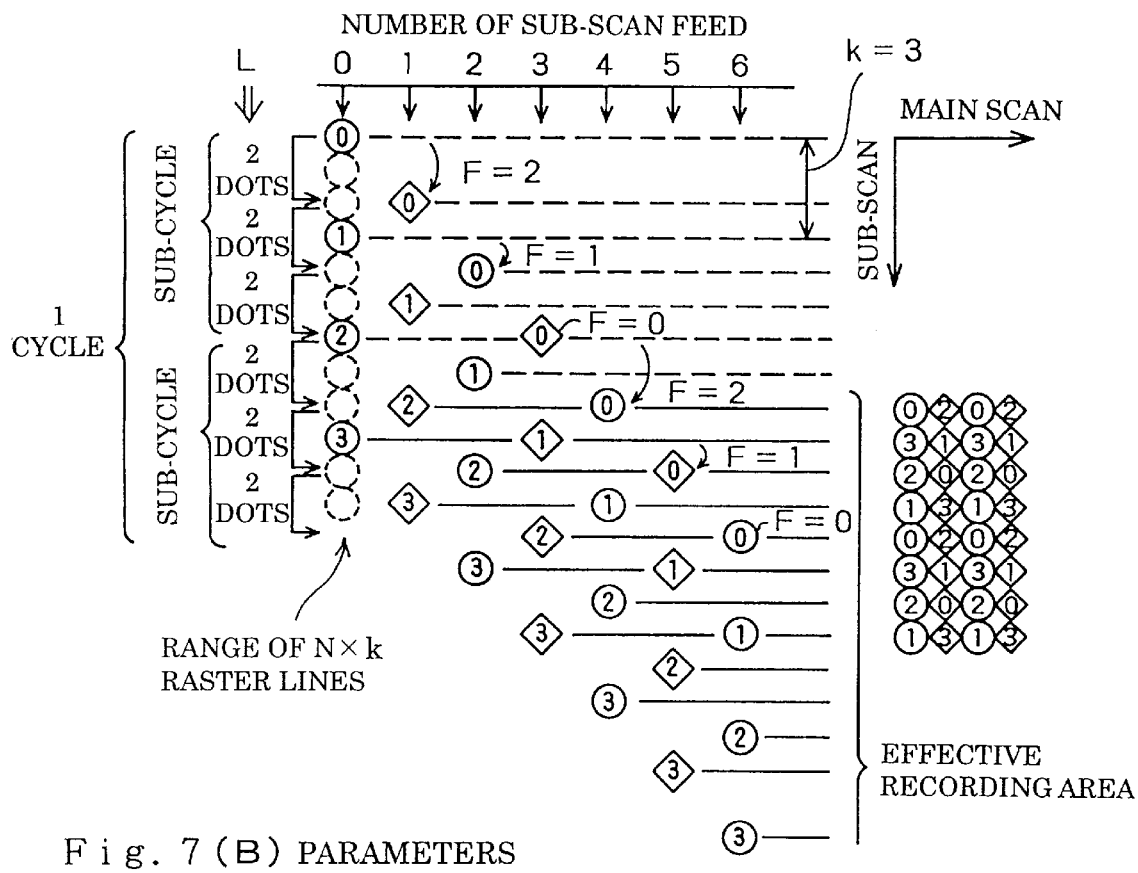
Fig. 7 (B) PARAMETERS
NOZZLE PITCH k : 3 [dot]
NUMBER OF USED NOZZLES N : 4
NUMBER OF SCAN REPEATS s : 2
NUMBER OF EFFECTIVE NOZZLES Neff : 2
| NUMBER OF SUB-SCAN FEED | 0 | 1 | 2 | 3 | 4 | 5 | 6 |
|---|---|---|---|---|---|---|---|
| FEED AMOUNT L [dot] | 0 | 2 | 2 | 2 | 2 | 2 | 2 |
| ΣL | 0 | 2 | 4 | 6 | 8 | 10 | 12 |
| F = (ΣL) % k | 0 | 2 | 1 | 0 | 2 | 1 | 0 |

Fig. 8(A) FIRST DOT RECORDING SCHEME FOR k=4
NOZZLE PITCH k (=m x n) : 4 [dot]
NUMBER OF SCANS IN 1 SET  m : 2
VIRTUAL NOZZLE PITCH  n : 2
| NUMBER OF SUB-SCAN FEED | 0 | 1 | 2 | 3 | 4 | 5 | 6 | 7 | 8 |
|---|---|---|---|---|---|---|---|---|---|
| $F = (\Sigma L) \% k$ | 0 | 2 | 1 | 3 | 0 | 2 | 1 | 3 | 0 |
| $\Delta F = L \% k$ | 0 | 2 | 3 | 2 | 1 | 2 | 3 | 2 | 1 |
(L DENOTES SUB-SCAN FEED AMOUNT)
Fig. 8(B) POSITIONS OF NOZZLE ARRAYS
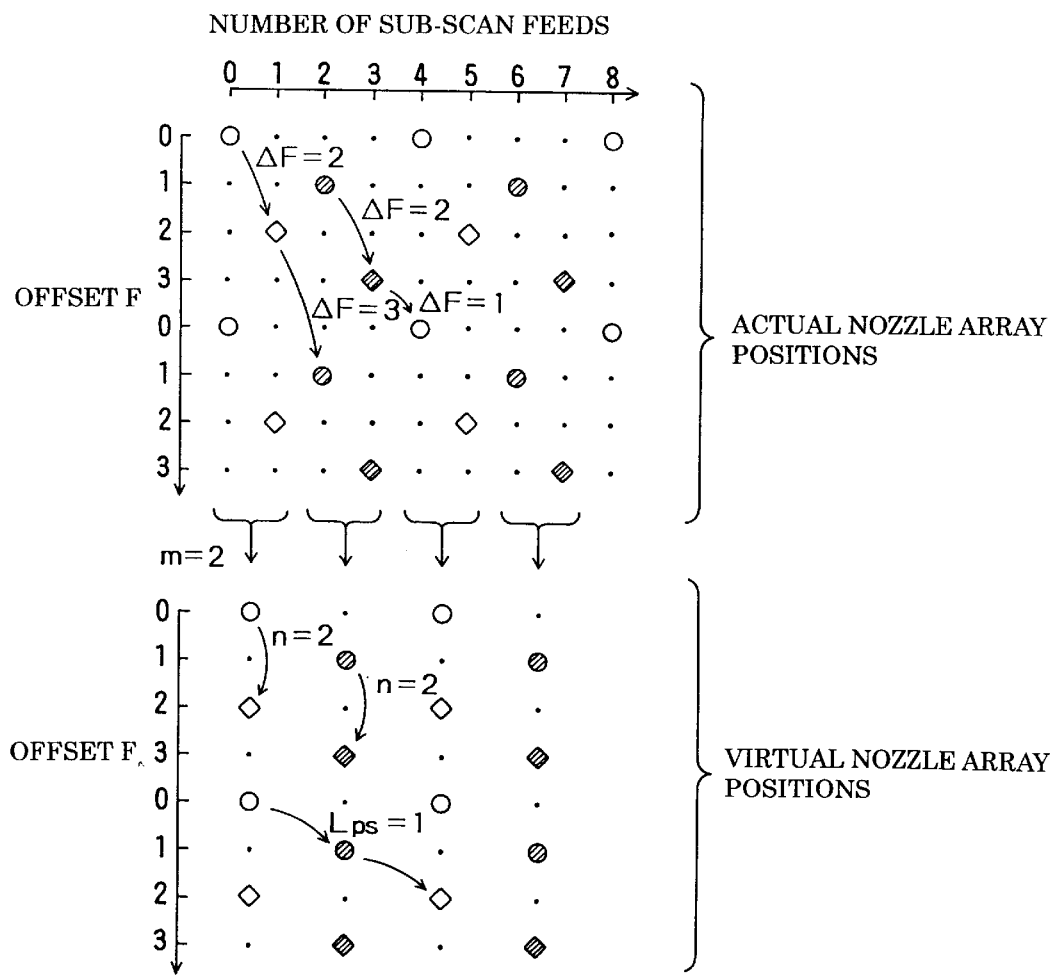

Fig. 9(A) FIRST DOT RECORDING SCHEME FOR k=6

NOZZLE PITCH k (=m x n) : 6 [dot]
NUMBER OF SCANS IN 1 SET m : 2
VIRTUAL NOZZLE PITCH n : 3

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| $F = (\Sigma L) \% k$ | 0 | 3 | 5 | 2 | 4 | 1 | 3 | 0 | 2 | 5 | 1 | 4 | 0 |
| $\Delta F = L \% k$ | 0 | 3 | 2 | 3 | 2 | 3 | 2 | 3 | 2 | 3 | 2 | 3 | 2 |

(L DENOTES SUB-SCAN FEED AMOUNT)

Fig. 9(B) SECOND DOT RECORDING SCHEME FOR k=6

NOZZLE PITCH k (=m x n) : 6 [dot]
NUMBER OF SCANS IN 1 SET m : 3
VIRTUAL NOZZLE PITCH n : 2

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| $F = (\Sigma L) \% k$ | 0 | 2 | 4 | 3 | 5 | 1 | 0 | 2 | 4 | 3 | 5 | 1 | 0 |
| $\Delta F = L \% k$ | 0 | 2 | 2 | 5 | 2 | 2 | 5 | 2 | 2 | 5 | 2 | 2 | 5 |

(L DENOTES SUB-SCAN FEED AMOUNT)

FIRST DOT RECORDING SCHEME FOR k=4

SCAN PARAMETERS
NOZZLE PITCH k : 4 [dot]
NUMBER OF NOZZLES N : 8
NUMBER OF SCAN REPEATS s : 1
NUMBER OF EFFECTIVE NOZZLES Neff: 8

DOT RECORDING SCHEME OF FIRST EMBODIMENT FOR k=4

Fig. 13(A)   SCAN PARAMETERS

NOZZLE PITCH k : 4 [dot]
NUMBER OF USED NOZZLES   N : 8
NUMBER OF SCAN REPEATS   s : 1
NUMBER OF EFFECTIVE NOZZLES Neff : 8
NUMBER OF SCANS IN 1 SET   m : 2
VIRTUAL NOZZLE PITCH   n : 2
NUMBER OF NOZZLES IN VIRTUAL NOZZLE ARRAY Nps : 16
SUB-SCAN FEED SET : (10,7), (6,9)

| NUMBER OF SUB-SCAN FEED | 0 | 1 | 2 | 3 | 4 |
|---|---|---|---|---|---|
| FEED AMOUNT L [dot] | 0 | 10 | 7 | 6 | 9 |
| $\Sigma L$ | 0 | 10 | 17 | 23 | 32 |
| $F = (\Sigma L) \% k$ | 0 | 2 | 1 | 3 | 0 |
| $\Delta F = L \% k$ | 0 | 2 | 3 | 2 | 1 |

Fig. 13(B)   RASTER NUMBERS OF EFFECTIVE RASTER LINES RECORDED BY RESPECTIVE NOZZLES

```
              NUMBER OF SUB-SCAN FEED
NOZZLE   0    1    2    3    4    5    6    7
  #0:    .    .    .    4   13   23   30  (36)
  #1:    .    .    2    8   17   27  (34) (40)
  #2:    .    .    6   12   21   31  (38) (44)
  #3:    .    3   10   16   25  (35) (42) (48)
  #4:    .    7   14   20   29  (39) (46) (52)
  #5:    1   11   18   24  (33) (43) (50) (56)
  #6:    5   15   22   28  (37) (47) (54) (60)
  #7:    9   19   26   32  (41) (51) (58) (64)
```

Fig. 14

NOZZLE NUMBERS FOR RECORDING RESPECTIVE RASTER LINES
(FIRST EMBODIMENT FOR k=4)

| RASTER | @ | Δ | \multicolumn{7}{c}{NUMBER OF SUB-SCAN FEED} |
|---|---|---|---|---|---|---|---|---|---|

| RASTER | @ | Δ | 0 | 1 | 2 | 3 | 4 | 5 | 6 |
|---|---|---|---|---|---|---|---|---|---|
| 1 | • | – | #5 | | | | | | |
| 2 | X | 2 | | | #1 | | | | |
| 3 | • | – | | #3 | | | | | |
| 4 | X | 3 | | | | #0 | | | |
| 5 | • | – | #6 | | | | | | |
| 6 | X | 2 | | | #2 | | | | |
| 7 | • | – | | #4 | | | | | |
| 8 | X | 3 | | | | #1 | | | |
| 9 | • | – | #7 | | | | | | |
| 10 | X | 2 | | | #3 | | | | |
| 11 | • | – | | #5 | | | | | |
| 12 | ↑ | 2 | | | | #2 | | | |
| 13 | X | 2 | | | | | #0 | | |
| 14 | ↓ | 1 | | | #4 | | | | |
| 15 | • | – | | #6 | | | | | |
| 16 | ↑ | 2 | | | | #3 | | | |
| 17 | X | 2 | | | | | #1 | | |
| 18 | ↓ | 1 | | | #5 | | | | |
| 19 | • | – | | #7 | | | | | |
| 20 | ↑ | 2 | | | | #4 | | | |
| 21 | X | 2 | | | | | #2 | | |
| 22 | • | – | | | #6 | | | | |
| 23 | X | 3 | | | | | | #0 | |
| 24 | • | – | | | | #5 | | | |
| 25 | X | 2 | | | | | #3 | | |
| 26 | • | – | | | #7 | | | | |
| 27 | X | 3 | | | | | | #1 | |
| 28 | • | – | | | | #6 | | | |
| 29 | ↑ | 1 | | | | | #4 | | |
| 30 | X | 2 | | | | | | | #0 |
| 31 | ↓ | | | | | | | #2 | |

DOT RECORDING SCHEME OF FIRST CONTROL EXAMPLE FOR k=4

Fig. 15(A)   SCAN PARAMETERS

NOZZLE PITCH k : 4 [dot]
NUMBER OF USED NOZZLES N : 7
NUMBER OF SCAN REPEATS s : 1
NUMBER OF EFFECTIVE NOZZLES $N_{eff}$ : 7

| NUMBER OF SUB-SCAN FEED | 0 | 1 | 2 | 3 | 4 |
|---|---|---|---|---|---|
| FEED AMOUNT L [dot] | 0 | 7 | 7 | 7 | 7 |
| $\Sigma L$ | 0 | 7 | 14 | 21 | 28 |
| $F = (\Sigma L) \% k$ | 0 | 3 | 2 | 1 | 0 |
| $\Delta F = L \% k$ | 0 | 3 | 3 | 3 | 3 |

Fig. 15(B)   RASTER NUMBERS OF EFFECTIVE RASTER LINES RECORDED BY RESPECTIVE NOZZLES

```
            NUMBER OF SUB-SCAN FEED
NOZZLE  0   1   2   3   4   5   6   7
 #0:    .   .   .   4  11  18  25 (32)
 #1:    .   .   1   8  15  22 (29)
 #2:    .   .   5  12  19  26 (33)
 #3:    .   2   9  16  23 (30)
 #4:    .   6  13  20  27 (34)
 #5:    3  10  17  24 (31)
 #6:    7  14  21  28 (35)
```

Fig. 16

NOZZLE NUMBERS FOR RECORDING RESPECTIVE RASTER LINES
(FIRST CONTROL EXAMPLE FOR k=4)

| RASTER | @ | Δ | 0 | 1 | 2 | 3 | 4 | 5 | 6 |
|---|---|---|---|---|---|---|---|---|---|
| 1 | ↓ | 1 | | | #1 | | | | |
| 2 | ↓ | 1 | | #3 | | | | | |
| 3 | • | – | #5 | | | | | | |
| 4 | X | 3 | | | | | #0 | | |
| 5 | ↓ | 1 | | | #2 | | | | |
| 6 | ↓ | 1 | | #4 | | | | | |
| 7 | • | – | #6 | | | | | | |
| 8 | X | 3 | | | | | #1 | | |
| 9 | ↓ | 1 | | | #3 | | | | |
| 10 | • | – | | #5 | | | | | |
| 11 | X | 3 | | | | | #0 | | |
| 12 | ↓ | 1 | | | | #2 | | | |
| 13 | ↓ | 1 | | | #4 | | | | |
| 14 | • | – | | #6 | | | | | |
| 15 | X | 3 | | | | | #1 | | |
| 16 | ↓ | 1 | | | | #3 | | | |
| 17 | • | – | | | #5 | | | | |
| 18 | X | 3 | | | | | | #0 | |
| 19 | ↓ | 1 | | | | #2 | | | |
| 20 | ↓ | 1 | | | | #4 | | | |
| 21 | • | – | | | #6 | | | | |
| 22 | X | 3 | | | | | | #1 | |
| 23 | ↓ | 1 | | | | #3 | | | |
| 24 | • | – | | | | #5 | | | |
| 25 | X | 3 | | | | | | #0 | |
| 26 | ↓ | 1 | | | | | #2 | | |
| 27 | ↓ | 1 | | | | #4 | | | |
| 28 | • | – | | | | #6 | | | |
| 29 | X | 3 | | | | | | #1 | |
| 30 | ↓ | 1 | | | | | #3 | | |
| 31 | • | – | | | | #5 | | | |
| 32 | X | 3 | | | | | | | #0 |

POSSIBLE COMBINATIONS OF OFFSET F AND DIFFERENCE ΔF FOR k=4

Fig. 17(A)

| NUMBER OF SUB-SCAN FEED | 0 | 1 | 2 | 3 | 4 | REMARKS |
|---|---|---|---|---|---|---|
| OFFSET F | 0 | 3 | 2 | 1 | 0 | FIRST CONTROL EXAMPLE FOR k=4 |
| DIFFERENCE ΔF = L % k | 0 | 3 | 3 | 3 | 3 | |

Fig. 17(B)

| NUMBER OF SUB-SCAN FEED | 0 | 1 | 2 | 3 | 4 | REMARKS |
|---|---|---|---|---|---|---|
| OFFSET F | 0 | 1 | 2 | 3 | 0 | SECOND CONTROL EXAMPLE FOR k=4 |
| DIFFERENCE ΔF = L % k | 0 | 1 | 1 | 1 | 1 | |

Fig. 17(C)

| NUMBER OF SUB-SCAN FEED | 0 | 1 | 2 | 3 | 4 | REMARKS |
|---|---|---|---|---|---|---|
| OFFSET F | 0 | 2 | 1 | 3 | 0 | FIRST EMBODIMENT FOR k=4 |
| DIFFERENCE ΔF = L % k | 0 | 2 | 3 | 2 | 1 | |

Fig. 17(D)

| NUMBER OF SUB-SCAN FEED | 0 | 1 | 2 | 3 | 4 | REMARKS |
|---|---|---|---|---|---|---|
| OFFSET F | 0 | 3 | 1 | 2 | 0 | SECOND EMBODIMENT FOR k=4 |
| DIFFERENCE ΔF = L % k | 0 | 3 | 2 | 1 | 2 | |

Fig. 17(E)

| NUMBER OF SUB-SCAN FEED | 0 | 1 | 2 | 3 | 4 | REMARKS |
|---|---|---|---|---|---|---|
| OFFSET F | 0 | 2 | 3 | 1 | 0 | THIRD EMBODIMENT FOR k=4 |
| DIFFERENCE ΔF = L % k | 0 | 2 | 1 | 2 | 3 | |

Fig. 17(F)

| NUMBER OF SUB-SCAN FEED | 0 | 1 | 2 | 3 | 4 | REMARKS |
|---|---|---|---|---|---|---|
| OFFSET F | 0 | 1 | 3 | 2 | 0 | FOURTH EMBODIMENT FOR k=4 |
| DIFFERENCE ΔF = L % k | 0 | 1 | 2 | 3 | 2 | |

Fig. 18

SCAN PARAMETERS FOR DOT RECORDING SCHEME OF SECOND CONTROL EXAMPLE FOR k=4

NOZZLE PITCH k : 4 [dot]
NUMBER OF USED NOZZLES N : 5
NUMBER OF SCAN REPEATS s : 1
NUMBER OF EFFECTIVE NOZZLES Neff : 5

| NUMBER OF SUB-SCAN FEE | 0 | 1 | 2 | 3 | 4 |
|---|---|---|---|---|---|
| FEED AMOUNT L [dot] | 0 | 5 | 5 | 5 | 5 |
| $\Sigma L$ | 0 | 5 | 10 | 15 | 20 |
| $F = (\Sigma L) \% k$ | 0 | 1 | 2 | 3 | 0 |
| $\Delta F = L \% k$ | 0 | 1 | 1 | 1 | 1 |

DOT RECORDING SCHEME OF SECOND EMBODIMENT FOR k=4

Fig. 19(A)  SCAN PARAMETERS
    NOZZLE PITCH k                                : 4 [dot]
    NUMBER OF USED NOZZLES   N                     : 8
    NUMBER OF SCAN REPEATS   s                     : 1
    NUMBER OF EFFECTIVE NOZZLES Neff               : 8
    NUMBER OF SCANS IN 1 SET   m                   : 2
    VIRTUAL NOZZLE PITCH   n                       : 2
    NUMBER OF NOZZLES IN VIRTUAL NOZZLE ARRAY Nps  : 16
    SUB-SCAN FEED SET                              : (6,9), (10,7)

| NUMBER OF SUB-SCAN FEED | 0 | 1 | 2 | 3 | 4 |
|---|---|---|---|---|---|
| FEED AMOUNT L [dot] | 0 | 7 | 6 | 9 | 10 |
| $\Sigma L$ | 0 | 7 | 13 | 22 | 32 |
| $F = (\Sigma L) \% k$ | 0 | 3 | 1 | 2 | 0 |
| $\Delta F = L \% k$ | 0 | 3 | 2 | 1 | 2 |

Fig. 19(B)  RASTER NUMBERS OF EFFECTIVE RASTER LINES RECORDED BY RESPECTIVE NOZZLES

```
              NUMBER OF SUB-SCAN FEED
NOZZLE   0    1    2    3    4    5    6    7
 #0:     .    .    .    4   14   21   27  (36)
 #1:     .    .    .    8   18   25   31  (40)
 #2:     .    .    3   12   22   29  (35)
 #3:     .    1    7   16   26  (33)
 #4:     .    5   11   20   30  (37)
 #5:     2    9   15   24  (34)
 #6:     6   13   19   28  (38)
 #7:    10   17   23   32  (42)
```

Fig. 20

NOZZLE NUMBERS FOR RECORDING RESPECTIVE RASTER LINES
(SECOND EMBODIMENT FOR k=4)

| RASTER | @ | △ | 0 | 1 | 2 | 3 | 4 | 5 | 6 |
|---|---|---|---|---|---|---|---|---|---|
| 1 | ↓ | 1 | . | #3 | | | | | |
| 2 | • | – | #5 | | | | | | |
| 3 | ↑ | 2 | . | . | #2 | | | | |
| 4 | X | 2 | . | . | . | #0 | | | |
| 5 | ↓ | 1 | . | #4 | | | | | |
| 6 | • | – | #6 | | | | | | |
| 7 | ↑ | 2 | . | . | #3 | | | | |
| 8 | X | 2 | . | . | . | #1 | | | |
| 9 | ↓ | 1 | . | #5 | | | | | |
| 10 | • | – | #7 | | | | | | |
| 11 | ↑ | 2 | . | . | #4 | | | | |
| 12 | X | 2 | . | . | . | #2 | | | |
| 13 | • | – | . | #6 | | | | | |
| 14 | X | 3 | . | . | . | . | #0 | | |
| 15 | • | – | . | . | #5 | | | | |
| 16 | X | 2 | . | . | . | #3 | | | |
| 17 | • | – | . | #7 | | | | | |
| 18 | X | 3 | . | . | . | . | #1 | | |
| 19 | • | – | . | . | #6 | | | | |
| 20 | ↑ | 1 | . | . | . | #4 | | | |
| 21 | X | 2 | . | . | . | . | . | #0 | |
| 22 | ↓ | 2 | . | . | . | . | #2 | | |
| 23 | • | – | . | . | #7 | | | | |
| 24 | ↑ | 1 | . | . | . | #5 | | | |
| 25 | X | 2 | . | . | . | . | . | #1 | |
| 26 | • | – | . | . | . | #3 | | | |
| 27 | X | 3 | . | . | . | . | . | . | #0 |
| 28 | • | – | . | . | . | #6 | | | |
| 29 | X | 2 | . | . | . | . | . | #2 | |
| 30 | • | – | . | . | . | #4 | | | |
| 31 | X | 3 | . | . | . | . | . | . | #1 |
| 32 | • | – | . | . | . | #7 | | | |

NUMBER OF SUB-SCAN FEED

Fig. 21(A) SCAN PARAMETERS FOR DOT RECORDING SCHEME OF THIRD EMBODIMENT FOR k=4

NOZZLE PITCH k : 4 [dot]
NUMBER OF USED NOZZLES N : 8
NUMBER OF SCAN REPEATS s : 1
NUMBER OF EFFECTIVE NOZZLES Neff : 8
NUMBER OF SCANS IN 1 SET m : 2
VIRTUAL NOZZLE PITCH n : 2
NUMBER OF NOZZLES IN VIRTUAL NOZZLE ARRAY Nps : 16
SUB-SCAN FEED SET : (10,9), (6,7)

| NUMBER OF SUB-SCAN FEED | 0 | 1 | 2 | 3 | 4 |
|---|---|---|---|---|---|
| FEED AMOUNT L [dot] | 0 | 10 | 9 | 6 | 7 |
| ΣL | 0 | 10 | 19 | 25 | 32 |
| F = (ΣL) % k | 0 | 2 | 3 | 1 | 0 |
| ΔF = L % k | 0 | 2 | 1 | 2 | 3 |

Fig. 21(B) SCAN PARAMETERS FOR DOT RECORDING SCHEME OF FOURTH EMBODIMENT FOR k=4

NOZZLE PITCH k : 4 [dot]
NUMBER OF USED NOZZLES N : 8
NUMBER OF SCAN REPEATS s : 1
NUMBER OF EFFECTIVE NOZZLES Neff : 8
NUMBER OF SCANS IN 1 SET m : 2
VIRTUAL NOZZLE PITCH n : 2
NUMBER OF NOZZLES IN VIRTUAL NOZZLE ARRAY Nps : 16
SUB-SCAN FEED SET : (10,7), (6,9)

| NUMBER OF SUB-SCAN FEED | 0 | 1 | 2 | 3 | 4 |
|---|---|---|---|---|---|
| FEED AMOUNT L [dot] | 0 | 9 | 10 | 7 | 6 |
| ΣL | 0 | 9 | 19 | 26 | 32 |
| F = (ΣL) % k | 0 | 1 | 3 | 2 | 0 |
| ΔF = L % k | 0 | 1 | 2 | 3 | 2 |

Fig. 22(A) SCAN PARAMETERS FOR DOT RECORDING SCHEME OF FIFTH EMBODIMENT FOR k=4

NOZZLE PITCH k : 4 [dot]
NUMBER OF USED NOZZLES N : 16
NUMBER OF SCAN REPEATS s : 2
NUMBER OF EFFECTIVE NOZZLES Neff : 8
NUMBER OF SCANS IN 1 SET m : 2
VIRTUAL NOZZLE PITCH n : 2
NUMBER OF NOZZLES IN VIRTUAL NOZZLE ARRAY Nps : 16
SUB-SCAN FEED SET : (10,7), (6,9)

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 10 | 7 | 6 | 9 | 10 | 7 | 6 | 9 |
| $\Sigma$ L | 0 | 10 | 17 | 23 | 32 | 42 | 49 | 55 | 64 |
| F = ($\Sigma$ L) % k | 0 | 2 | 1 | 3 | 0 | 2 | 1 | 3 | 0 |
| $\Delta$ F = L % k | 0 | 2 | 3 | 2 | 1 | 2 | 3 | 2 | 1 |

Fig. 22(B) SCAN PARAMETERS FOR DOT RECORDING SCHEME OF SIXTH EMBODIMENT FOR k=4

NOZZLE PITCH k : 4 [dot]
NUMBER OF USED NOZZLES N : 16
NUMBER OF SCAN REPEATS s : 2
NUMBER OF EFFECTIVE NOZZLES Neff : 8
NUMBER OF SCANS IN 1 SET m : 2
VIRTUAL NOZZLE PITCH n : 2
NUMBER OF NOZZLES IN VIRTUAL NOZZLE ARRAY Nps : 16
SUB-SCAN FEED SET : (6,9), (10,7)

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 7 | 6 | 9 | 10 | 7 | 6 | 9 | 10 |
| $\Sigma$ L | 0 | 7 | 13 | 22 | 32 | 39 | 45 | 54 | 64 |
| F = ($\Sigma$ L) % k | 0 | 3 | 1 | 2 | 0 | 3 | 1 | 2 | 0 |
| $\Delta$ F = L % k | 0 | 3 | 2 | 1 | 2 | 3 | 2 | 1 | 2 |

Fig. 22(C) SCAN PARAMETERS FOR DOT RECORDING SCHEME OF SEVENTH EMBODIMENT FOR k=4

NOZZLE PITCH k : 4 [dot]
NUMBER OF USED NOZZLES N : 16
NUMBER OF SCAN REPEATS s : 2
NUMBER OF EFFECTIVE NOZZLES Neff : 8
NUMBER OF SCANS IN 1 SET m : 2
VIRTUAL NOZZLE PITCH n : 2
NUMBER OF NOZZLES IN VIRTUAL NOZZLE ARRAY Nps : 16
SUB-SCAN FEED SET : (10,9), (6,7)

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 10 | 9 | 6 | 7 | 10 | 9 | 6 | 7 |
| Σ L | 0 | 10 | 19 | 25 | 32 | 42 | 51 | 57 | 64 |
| F = (Σ L) % k | 0 | 2 | 3 | 1 | 0 | 2 | 3 | 1 | 0 |
| Δ F = L % k | 0 | 2 | 1 | 2 | 3 | 2 | 1 | 2 | 3 |

Fig. 22(D) SCAN PARAMETERS FOR DOT RECORDING SCHEME OF EIGHTH EMBODIMENT FOR k=4

NOZZLE PITCH k : 4 [dot]
NUMBER OF USED NOZZLES N : 16
NUMBER OF SCAN REPEATS s : 2
NUMBER OF EFFECTIVE NOZZLES Neff : 8
NUMBER OF SCANS IN 1 SET m : 2
VIRTUAL NOZZLE PITCH n : 2
NUMBER OF NOZZLES IN VIRTUAL NOZZLE ARRAY Nps : 16
SUB-SCAN FEED SET : (10,7), (6,9)

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 9 | 10 | 7 | 6 | 9 | 10 | 7 | 6 |
| Σ L | 0 | 9 | 19 | 26 | 32 | 41 | 51 | 58 | 64 |
| F = (Σ L) % k | 0 | 1 | 3 | 2 | 0 | 1 | 3 | 2 | 0 |
| Δ F = L % k | 0 | 1 | 2 | 3 | 2 | 1 | 2 | 3 | 2 |

DOT RECORDING SCHEME OF FIRST EMBODIMENT FOR k=6

Fig. 23(A)   SCAN PARAMETERS

NOZZLE PITCH k : 6 [dot]
NUMBER OF USED NOZZLES   N : 17
NUMBER OF SCAN REPEATS   s : 2
NUMBER OF EFFECTIVE NOZZLES Neff : 8.5
NUMBER OF SCANS IN 1 SET   m : 2
VIRTUAL NOZZLE PITCH   n : 3
NUMBER OF NOZZLES IN VIRTUAL NOZZLE ARRAY Nps : 34
SUB-SCAN FEED SET : (3,14)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 3 | 14 | 3 | 14 | 3 | 14 | 3 | 14 | 3 | 14 | 3 | 14 |
| Σ L | 0 | 3 | 17 | 20 | 34 | 37 | 51 | 54 | 68 | 71 | 85 | 88 | 102 |
| F = (Σ L) % k | 0 | 3 | 5 | 2 | 4 | 1 | 3 | 0 | 2 | 5 | 1 | 4 | 0 |
| Δ F = L % k | 0 | 3 | 2 | 3 | 2 | 3 | 2 | 3 | 2 | 3 | 2 | 3 | 2 |
| DOT RECORD POSITION* | 0 | 0 | 1 | 1 | 0 | 0 | 1 | 1 | 0 | 0 | 1 | 1 | 0 |

*: 0 DENOTES EVEN DOT POSITION, AND 1 DENOTES ODD DOT POSITION

Fig. 23(B)   RASTER NUMBERS OF EFFECTIVE RASTER LINES RECORDED BY RESPECTIVE NOZZLES

| NOZZLE | NUMBER OF SUB-SCAN FEED | | | | | | | | | | | | | | | | |
|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 |
| #0 | . | . | . | . | . | . | . | . | . | . | 2' | 5' | 19 | 22 | 36' | 39' | (53) |
| #1 | . | . | . | . | . | . | . | . | . | . | 8' | 11' | 25 | 28 | 42' | 45' | (59) |
| #2 | . | . | . | . | . | . | . | . | . | 0 | 14' | 17' | 31 | 34 | 48' | (51)' | |
| #3 | . | . | . | . | . | . | . | . | . | 3 | 6 | 20' | 23' | 37 | 40 | (54)' | |
| #4 | . | . | . | . | . | . | . | . | . | 9 | 12 | 26' | 29' | 43 | 46 | (60)' | |
| #5 | . | . | . | . | . | . | . | . | 1' | 15 | 18 | 32' | 35' | 49 | (52) | | |
| #6 | . | . | . | . | . | . | . | 4' | 7' | 21 | 24 | 38' | 41' | (55) | | | |
| #7 | . | . | . | . | . | . | . | 10' | 13' | 27 | 30 | 44' | 47' | (61) | | | |
| #8 | . | . | . | . | . | . | 2 | 16' | 19' | 33 | 36 | 50' | (53)' | | | | |
| #9 | . | . | . | . | . | 5 | 8 | 22' | 25' | 39 | 42 | (56)' | | | | | |
| #10 | . | . | . | . | 11 | 14 | 28' | 31' | 45 | 48 | (62)' | | | | | | |
| #11 | . | . | 0' | 3' | 17 | 20 | 34' | 37' | (51) | | | | | | | | |
| #12 | . | . | 6' | 9' | 23 | 26 | 40' | 43' | (57) | | | | | | | | |
| #13 | . | . | 12' | 15' | 29 | 32 | 46' | 49' | (63) | | | | | | | | |
| #14 | 1 | 4 | 18' | 21' | 35 | 38 | (52)' | | | | | | | | | | |
| #15 | 7 | 10 | 24' | 27' | 41 | 44 | (58)' | | | | | | | | | | |
| #16 | 13 | 16 | 30' | 33' | 47 | 50 | (64)' | | | | | | | | | | |

RASTER NUMBERS WITHOUT QUOTATION MARK SHOWS THAT EVEN DOT POSITIONS ARE TARGET OF RECORDING
RASTER NUMBERS WITH QUOTATION MARK SHOWS THAT ODD DOT POSITIONS ARE TARGET OF RECORDING

Fig. 24

NOZZLE NUMBERS FOR RECORDING RESPECTIVE RASTER LINES
(FIRST EMBODIMENT FOR k=6)

| RASTER No. | NOZZLE No. EVEN | NOZZLE No. ODD | SCAN No. (Δ) EVEN | SCAN No. (Δ) ODD | HISTORY @ EVEN/ODD | 0 | 1 | 2 | 3 | 4 | 5 | 6 | 7 | 8 | 9 | 10 | 11 | 12 |
|---|---|---|---|---|---|---|---|---|---|---|---|---|---|---|---|---|---|---|
| 0 | #2 | #11 | 9(---) | 2(---) | ↓ · | . | . | $ | . | . | . | . | . | . | . | @ | . | . |
| 1 | #14 | #5 | 0( -9) | 7( 5) | · ↑ | @ | . | . | . | . | . | . | . | $ | . | . | . | . |
| 2 | #8 | #0 | 5( 5) | 10( 3) | ↑ X | . | . | . | . | . | @ | . | . | . | . | . | $ | . |
| 3 | #3 | #11 | 8( 3) | 3( -7) | X · | . | . | . | $ | . | . | . | . | . | @ | . | . | . |
| 4 | #14 | #6 | 1( -7) | 6( 3) | · ↑ | . | @ | . | . | . | . | . | $ | . | . | . | . | . |
| 5 | #9 | #0 | 4( 3) | 11( 5) | ↑ X | . | . | . | . | @ | . | . | . | . | . | . | . | $ |
| 6 | #3 | #12 | 9( 5) | 2( -9) | X · | . | . | $ | . | . | . | . | . | . | . | @ | . | . |
| 7 | #15 | #6 | 0( -9) | 7( 5) | · ↑ | @ | . | . | . | . | . | . | . | $ | . | . | . | . |
| 8 | #9 | #1 | 5( 5) | 10( 3) | ↑ X | . | . | . | . | . | @ | . | . | . | . | . | $ | . |
| 9 | #4 | #12 | 8( 3) | 3( -7) | X · | . | . | . | $ | . | . | . | . | . | @ | . | . | . |
| 10 | #15 | #7 | 1( -7) | 6( 3) | · ↑ | . | @ | . | . | . | . | . | $ | . | . | . | . | . |
| 11 | #10 | #1 | 4( 3) | 11( 5) | ↑ X | . | . | . | . | @ | . | . | . | . | . | . | . | $ |
| 12 | #4 | #13 | 9( 5) | 2( -9) | X · | . | . | $ | . | . | . | . | . | . | . | @ | . | . |
| 13 | #16 | #7 | 0( -9) | 7( 5) | · ↑ | @ | . | . | . | . | . | . | . | $ | . | . | . | . |
| 14 | #10 | #2 | 5( 5) | 10( 3) | ↑ X | . | . | . | . | . | @ | . | . | . | . | . | $ | . |
| 15 | #5 | #13 | 8( 3) | 3( -7) | X · | . | . | . | $ | . | . | . | . | . | @ | . | . | . |
| 16 | #16 | #8 | 1( -7) | 6( 3) | · ↑ | . | @ | . | . | . | . | . | $ | . | . | . | . | . |
| 17 | #11 | #2 | 4( 3) | 11( 5) | ↑ X | . | . | . | . | @ | . | . | . | . | . | . | . | $ |
| 18 | #5 | #14 | 9( 5) | 2( -9) | ↑ · | . | . | $ | . | . | . | . | . | . | . | @ | . | . |
| 19 | #0 | #8 | 12( 3) | 7( 5) | X ↑ | . | . | . | . | . | . | . | $ | . | . | . | . | @ |
| 20 | #11 | #3 | 5( -7) | 10( 3) | · X | . | . | . | . | . | @ | . | . | . | . | $ | . | . |

@ INDICATES THAT EVEN DOT POSITIONS ARE TARGET OF RECORDING.
$ INDICATES THAT ODD DOT POSITIONS ARE TARGET OF RECORDING.

DOT RECORDING SCHEME OF SECOND EMBODIMENT FOR k=6

Fig. 25(A)   SCAN PARAMETERS

NOZZLE PITCH k                              : 6 [dot]
    NUMBER OF USED NOZZLES   N                  : 17
    NUMBER OF SCAN REPEATS   s                  : 2
    NUMBER OF EFFECTIVE NOZZLES Neff            : 8.5
    NUMBER OF SCANS IN 1 SET  m                 : 2
    VIRTUAL NOZZLE PITCH  n                     : 3
    NUMBER OF NOZZLES IN VIRTUAL NOZZLE ARRAY Nps : 34
    SUB-SCAN FEED SET                           : (9,8)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 9 | 8 | 9 | 8 | 9 | 8 | 9 | 8 | 9 | 8 | 9 | 8 |
| ΔF = L % k | 0 | 3 | 2 | 3 | 2 | 3 | 2 | 3 | 2 | 3 | 2 | 3 | 2 |
| ΣL | 0 | 9 | 17 | 26 | 34 | 43 | 51 | 60 | 68 | 77 | 85 | 94 | 102 |
| F = (ΣL) % k | 0 | 3 | 5 | 2 | 4 | 1 | 3 | 0 | 2 | 5 | 1 | 4 | 0 |
| ΔF = L % k | 0 | 3 | 2 | 3 | 2 | 3 | 2 | 3 | 2 | 3 | 2 | 3 | 2 |
| DOT RECORD POSITION* | 0 | 0 | 1 | 1 | 0 | 0 | 1 | 1 | 0 | 0 | 1 | 1 | 0 |

*: 0 DENOTES EVEN DOT POSITION, AND 1 DENOTES ODD DOT POSITION

Fig. 25(B)   RASTER NUMBERS OF EFFECTIVE RASTER LINES RECORDED BY RESPECTIVE NOZZLES

| NOZZLE | \multicolumn{18}{c|}{NUMBER OF SUB-SCAN FEED} |
|---|---|---|---|---|---|---|---|---|---|---|---|---|---|---|---|---|---|---|

| NOZZLE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| #0  | . | . | . | . | . | . | . | . | . | . | . | 5' | 13 | 22 | 30' | 39' | 47 | (56) |
| #1  | . | . | . | . | . | . | . | . | . | . | 2' | 11' | 19 | 28 | 36' | 45' | (53) | |
| #2  | . | . | . | . | . | . | . | . | . | 0 | 8' | 17' | 25 | 34 | 42' | (51)' | | |
| #3  | . | . | . | . | . | . | . | . | . | 6 | 14' | 23' | 31 | 40 | 48' | (57)' | | |
| #4  | . | . | . | . | . | . | . | . | . | 3 | 12 | 20' | 29' | 37 | 46 | (54)' | | |
| #5  | . | . | . | . | . | . | . | . | 1' | 9 | 18 | 26' | 35' | 43 | (52) | | | |
| #6  | . | . | . | . | . | . | . | . | 7' | 15 | 24 | 32' | 41' | 49 | (58) | | | |
| #7  | . | . | . | . | . | . | . | 4' | 13' | 21 | 30 | 38' | 47' | (55) | | | | |
| #8  | . | . | . | . | . | . | . | 2 | 10' | 19' | 27 | 36 | 44' | (53)' | | | | |
| #9  | . | . | . | . | . | . | . | 8 | 16' | 25' | 33 | 42 | 50' | (59)' | | | | |
| #10 | . | . | . | . | . | . | 5 | 14 | 22' | 31' | 39 | 48 | (56)' | | | | | |
| #11 | . | . | . | . | . | 3' | 11 | 20 | 28' | 37' | 45 | (54) | | | | | | |
| #12 | . | . | . | 0' | 9' | 17 | 26 | 34' | 43' | (51) | | | | | | | | |
| #13 | . | . | . | 6' | 15' | 23 | 32 | 40' | 49' | (57) | | | | | | | | |
| #14 | . | 4 | 12' | 21' | 29 | 38 | 46' | (55)' | | | | | | | | | | |
| #15 | 1 | 10 | 18' | 27' | 35 | 44 | (52)' | | | | | | | | | | | |
| #16 | 7 | 16 | 24' | 33' | 41 | 50 | (58)' | | | | | | | | | | | |

RASTER NUMBERS WITHOUT QUOTATION MARK SHOWS THAT EVEN DOT POSITIONS ARE TARGET OF RECORDING
RASTER NUMBERS WITH QUOTATION MARK SHOWS THAT ODD DOT POSITIONS ARE TARGET OF RECORDING

Fig. 26

NOZZLE NUMBERS FOR RECORDING RESPECTIVE RASTER LINES
(SECOND EMBODIMENT FOR k=6)

| RASTER No. | NOZZLE No. EVEN | NOZZLE No. ODD | SCAN No. ($\Delta$) EVEN | SCAN No. ($\Delta$) ODD | HISTORY @ EVEN/ODD | NUMBER OF SUB-SCAN FEED 0 1 2 3 4 5 6 7 8 9 10 11 12 |
|---|---|---|---|---|---|---|
| 0 | #2 | #12 | 9(---) | 2(---) | ↓ · | . . \$ . . . . . . @ . . . |
| 1 | #15 | #5 | 0( -9) | 7( 5) | · ↑ | @ . . . . . . \$ . . . . . |
| 2 | #8 | #1 | 5( 5) | 10( 3) | ↑ X | . . . . . @ . . . \$ . . . |
| 3 | #4 | #11 | 8( 3) | 3( -7) | X · | . . . \$ . . . . @ . . . . |
| 4 | #14 | #7 | 1( -7) | 6( 3) | · ↑ | . @ . . . . \$ . . . . . . |
| 5 | #10 | #0 | 4( 3) | 11( 5) | ↑ X | . . . . @ . . . . . . \$ . |
| 6 | #3 | #13 | 9( 5) | 2( -9) | X · | . . \$ . . . . . @ . . . . |
| 7 | #16 | #6 | 0( -9) | 7( 5) | · ↑ | @ . . . . . . \$ . . . . . |
| 8 | #9 | #2 | 5( 5) | 10( 3) | ↑ X | . . . . . @ . . . . . \$ . |
| 9 | #5 | #12 | 8( 3) | 3( -7) | X · | . . . \$ . . . . @ . . . . |
| 10 | #15 | #8 | 1( -7) | 6( 3) | · ↑ | . @ . . . . \$ . . . . . . |
| 11 | #11 | #1 | 4( 3) | 11( 5) | ↑ X | . . . . @ . . . . . . \$ . |
| 12 | #4 | #14 | 9( 5) | 2( -9) | ↑ · | . . \$ . . . . . @ . . . . |
| 13 | #0 | #7 | 12( 3) | 7( 5) | X ↑ | . . . . . . . \$ . . . . @ |
| 14 | #10 | #3 | 5( -7) | 10( 3) | · X | . . . . . @ . . . \$ . . . |
| 15 | #6 | #13 | 8( 3) | 3( -7) | X · | . . . \$ . . . . @ . . . . |
| 16 | #16 | #9 | 1( -7) | 6( 3) | · ↑ | . @ . . . . \$ . . . . . . |
| 17 | #12 | #2 | 4( 3) | 11( 5) | ↑ X | . . . . @ . . . . . . \$ . |
| 18 | #5 | #15 | 9( 5) | 2( -9) | ↑ · | . . \$ . . . . . @ . . . . |
| 19 | #1 | #8 | 12( 3) | 7( 5) | X ↑ | . . . . . . . \$ . . . . @ |
| 20 | #11 | #4 | 5( -7) | 10( 3) | · X | . . . . . @ . . . \$ . . . |

@ INDICATES THAT EVEN DOT POSITIONS ARE TARGET OF RECORDING.
\$ INDICATES THAT ODD DOT POSITIONS ARE TARGET OF RECORDING.

DOT RECORDING SCHEME OF THIRD EMBODIMENT FOR k=6

Fig. 27(A)   SCAN PARAMETERS

NOZZLE PITCH k : 6 [dot]
NUMBER OF USED NOZZLES  N : 20
NUMBER OF SCAN REPEATS  s : 2
NUMBER OF EFFECTIVE NOZZLES Neff : 10
NUMBER OF SCANS IN 1 SET  m : 2
VIRTUAL NOZZLE PITCH  n : 3
NUMBER OF NOZZLES IN VIRTUAL NOZZLE ARRAY Nps : 40
SUB-SCAN FEED SET : (9,11)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 9 | 11 | 9 | 11 | 9 | 11 | 9 | 11 | 9 | 11 | 9 | 11 |
| ΣL | 0 | 9 | 20 | 29 | 40 | 49 | 60 | 69 | 80 | 89 | 100 | 109 | 120 |
| F = (ΣL) % k | 0 | 3 | 2 | 5 | 4 | 1 | 0 | 3 | 2 | 5 | 4 | 1 | 0 |
| ΔF = L % k | 0 | 3 | 5 | 3 | 5 | 3 | 5 | 3 | 5 | 3 | 5 | 3 | 5 |
| DOT RECORD POSITION* | 0 | 0 | 1 | 1 | 0 | 0 | 1 | 1 | 0 | 0 | 1 | 1 | 0 |

*: 0 DENOTES EVEN DOT POSITION, AND 1 DENOTES ODD DOT POSITION

Fig. 27(B)   RASTER NUMBERS OF EFFECTIVE RASTER LINES RECORDED BY RESPECTIVE NOZZLES

| NOZZLE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| #0 | . | . | . | . | . | . | . | . | . | . | 5' | 16 | 25 | 36' | 45' | 56 | (65) | |
| #1 | . | . | . | . | . | . | . | . | . | . | 2' | 11' | 22 | 31 | 42' | 51' | (62) | |
| #2 | . | . | . | . | . | . | . | . | . | . | 8' | 17' | 28 | 37 | 48' | 57' | (68) | |
| #3 | . | . | . | . | . | . | . | . | . | 3 | 14' | 23' | 34 | 43 | 54' | (63)' | | |
| #4 | . | . | . | . | . | . | . | . | . | 0 | 9 | 20' | 29' | 40 | 49 | (60)' | | |
| #5 | . | . | . | . | . | . | . | . | . | 6 | 15 | 26' | 35' | 46 | 55 | (66)' | | |
| #6 | . | . | . | . | . | . | . | . | 1' | 12 | 21 | 32' | 41' | 52 | (61) | | | |
| #7 | . | . | . | . | . | . | . | . | 7' | 18 | 27 | 38' | 47' | 58 | (67) | | | |
| #8 | . | . | . | . | . | . | . | 4' | 13' | 24 | 33 | 44' | 53' | (64) | | | | |
| #9 | . | . | . | . | . | . | . | 10' | 19' | 30 | 39 | 50' | 59' | (70) | | | | |
| #10 | . | . | . | . | . | 5 | 16' | 25' | 36 | 45 | 56' | (65)' | | | | | | |
| #11 | . | . | . | . | 2 | 11 | 22' | 31' | 42 | 51 | (62)' | | | | | | | |
| #12 | . | . | . | . | 8 | 17 | 28' | 37' | 48 | 57 | (68)' | | | | | | | |
| #13 | . | . | . | 3' | 14 | 23 | 34' | 43' | 54 | (63) | | | | | | | | |
| #14 | . | . | 0' | 9' | 20 | 29 | 40' | 49' | (60) | | | | | | | | | |
| #15 | . | . | 6' | 15' | 26 | 35 | 46' | 55' | (66) | | | | | | | | | |
| #16 | . | 1 | 12' | 21' | 32 | 41 | 52' | (61)' | | | | | | | | | | |
| #17 | . | 7 | 18' | 27' | 38 | 47 | 58' | (67)' | | | | | | | | | | |
| #18 | 4 | 13 | 24' | 33' | 44 | 53 | (64)' | | | | | | | | | | | |
| #19 | 10 | 19 | 30' | 39' | 50 | 59 | (70)' | | | | | | | | | | | |

RASTER NUMBERS WITHOUT QUOTATION MARK SHOWS THAT EVEN DOT POSITIONS ARE TARGET OF RECORDING
RASTER NUMBERS WITH QUOTATION MARK SHOWS THAT ODD DOT POSITIONS ARE TARGET OF RECORDING

Fig. 28

NOZZLE NUMBERS FOR RECORDING RESPECTIVE RASTER LINES
(THIRD EMBODIMENT FOR k=6)

| RASTER No. | NOZZLE No. EVEN | NOZZLE No. ODD | SCAN No. (Δ) EVEN | SCAN No. (Δ) ODD | HISTORY @ EVEN/ODD | 0 | 1 | 2 | 3 | 4 | 5 | 6 | 7 | 8 | 9 | 10 | 11 | 12 |
|---|---|---|---|---|---|---|---|---|---|---|---|---|---|---|---|---|---|---|
| 0 | #4 | #14 | 8(---) | 2(---) | ↓ · | . | . | $ | . | . | . | . | . | @ | . | . | . | . |
| 1 | #16 | #6 | 1(-7) | 7( 5) | · ↑ | . | @ | . | . | . | . | . | . | . | . | . | . | . |
| 2 | #11 | #1 | 4( 3) | 10( 3) | ↑ X | . | . | . | . | . | @ | . | . | . | . | . | . | . |
| 3 | #3 | #13 | 9( 5) | 3(-7) | X · | . | . | . | $ | . | . | . | . | . | @ | . | . | . |
| 4 | #18 | #8 | 0(-9) | 6( 3) | · ↑ | @ | . | . | . | . | . | . | . | . | . | . | . | . |
| 5 | #10 | #0 | 5( 5) | 11( 5) | ↑ X | . | . | . | . | . | @ | . | . | . | . | . | . | . |
| 6 | #5 | #15 | 8( 3) | 2(-9) | X · | . | . | $ | . | . | . | . | . | @ | . | . | . | . |
| 7 | #17 | #7 | 1(-7) | 7( 5) | · ↑ | . | @ | . | . | . | . | . | . | . | . | . | . | . |
| 8 | #12 | #2 | 4( 3) | 10( 3) | ↑ X | . | . | . | . | . | @ | . | . | . | . | . | . | . |
| 9 | #4 | #14 | 9( 5) | 3(-7) | X · | . | . | . | $ | . | . | . | . | . | @ | . | . | . |
| 10 | #19 | #9 | 0(-9) | 6( 3) | · ↑ | @ | . | . | . | . | . | . | . | . | . | . | . | . |
| 11 | #11 | #1 | 5( 5) | 11( 5) | ↑ X | . | . | . | . | . | @ | . | . | . | . | . | . | . |
| 12 | #6 | #16 | 8( 3) | 2(-9) | X · | . | . | $ | . | . | . | . | . | @ | . | . | . | . |
| 13 | #18 | #8 | 1(-7) | 7( 5) | · ↑ | . | @ | . | . | . | . | . | . | . | . | . | . | . |
| 14 | #13 | #3 | 4( 3) | 10( 3) | ↑ X | . | . | . | . | . | @ | . | . | . | . | . | . | . |
| 15 | #5 | #15 | 9( 5) | 3(-7) | ↑ · | . | . | . | $ | . | . | . | . | . | @ | . | . | . |
| 16 | #0 | #10 | 12( 3) | 6( 3) | X ↑ | . | . | . | . | . | . | . | $ | . | . | . | . | @ |
| 17 | #12 | #2 | 5(-7) | 11( 5) | · X | . | . | . | . | . | @ | . | . | . | . | . | . | . |
| 18 | #7 | #17 | 8( 3) | 2(-9) | X · | . | . | $ | . | . | . | . | . | @ | . | . | . | . |
| 19 | #19 | #9 | 1(-7) | 7( 5) | · ↑ | . | @ | . | . | . | . | . | . | . | . | . | . | . |
| 20 | #14 | #4 | 4( 3) | 10( 3) | ↑ X | . | . | . | . | @ | . | . | . | . | . | . | . | . |

@ INDICATES THAT EVEN DOT POSITIONS ARE TARGET OF RECORDING.
$ INDICATES THAT ODD DOT POSITIONS ARE TARGET OF RECORDING.

DOT RECORDING SCHEME OF FOURTH EMBODIMENT FOR k=6

Fig. 29(A)  SCAN PARAMETERS

NOZZLE PITCH k                                : 6 [dot]
NUMBER OF USED NOZZLES   N                    : 20
NUMBER OF SCAN REPEATS   s                    : 2
NUMBER OF EFFECTIVE NOZZLES Neff              : 10
NUMBER OF SCANS IN 1 SET   m                  : 2
VIRTUAL NOZZLE PITCH   n                      : 3
NUMBER OF NOZZLES IN VIRTUAL NOZZLE ARRAY Nps : 40
SUB-SCAN FEED SET                             : (9,8), (9,14)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 9 | 8 | 9 | 8 | 9 | 14 | 9 | 8 | 9 | 14 | 9 | 14 |
| ΣL | 0 | 9 | 17 | 26 | 34 | 43 | 57 | 66 | 74 | 83 | 97 | 106 | 120 |
| F = (ΣL) % k | 0 | 3 | 5 | 2 | 4 | 1 | 3 | 0 | 2 | 5 | 1 | 4 | 0 |
| ΔF = L % k | 0 | 3 | 2 | 3 | 2 | 3 | 2 | 3 | 2 | 3 | 2 | 3 | 2 |
| DOT RECORD POSITION* | 0 | 0 | 1 | 1 | 0 | 0 | 1 | 1 | 0 | 0 | 1 | 1 | 0 |

*: 0 DENOTES EVEN DOT POSITION, AND 1 DENOTES ODD DOT POSITION

Fig. 29(B)  RASTER NUMBERS OF EFFECTIVE RASTER LINES RECORDED BY RESPECTIVE NOZZLES

| NOZZLE | NUMBER OF SUB-SCAN FEED | | | | | | | | | | | | | | | | | |
|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 |
| #0 | . | . | . | . | . | . | . | . | . | . | . | 5' | 19 | 28 | 36' | 45' | 53 | (62) |
| #1 | . | . | . | . | . | . | . | . | . | . | 2' | 11' | 25 | 34 | 42' | 51' | 59 | (68) |
| #2 | . | . | . | . | . | . | . | . | . | . | 8' | 17' | 31 | 40 | 48' | 57' | (65) | |
| #3 | . | . | . | . | . | . | . | . | . | 0 | 14' | 23' | 37 | 46 | 54' | (63)' | | |
| #4 | . | . | . | . | . | . | . | . | . | 6 | 20' | 29' | 43 | 52 | (60)' | | | |
| #5 | . | . | . | . | . | . | . | . | 3 | 12 | 26' | 35' | 49 | 58 | (66)' | | | |
| #6 | . | . | . | . | . | . | . | 1' | 9 | 18 | 32' | 41' | 55 | (64) | | | | |
| #7 | . | . | . | . | . | . | . | 7' | 15 | 24 | 38' | 47' | (61) | | | | | |
| #8 | . | . | . | . | . | . | 4' | 13' | 21 | 30 | 44' | 53' | (67) | | | | | |
| #9 | . | . | . | . | . | . | 10' | 19' | 27 | 36 | 50' | 59' | (73) | | | | | |
| #10 | . | . | . | . | . | 2 | 16' | 25' | 33 | 42 | 56' | (65)' | | | | | | |
| #11 | . | . | . | . | . | 8 | 22' | 31' | 39 | 48 | (62)' | | | | | | | |
| #12 | . | . | . | . | 5 | 14 | 28' | 37' | 45 | 54 | (68)' | | | | | | | |
| #13 | . | . | . | 3' | 11 | 20 | 34' | 43' | 51 | (60) | | | | | | | | |
| #14 | . | . | 0' | 9' | 17 | 26 | 40' | 49' | 57 | (66) | | | | | | | | |
| #15 | . | . | 6' | 15' | 23 | 32 | 46' | 55' | (63) | | | | | | | | | |
| #16 | . | 4 | 12' | 21' | 29 | 38 | 52' | (61)' | | | | | | | | | | |
| #17 | 1 | 10 | 18' | 27' | 35 | 44 | 58' | (67)' | | | | | | | | | | |
| #18 | 7 | 16 | 24' | 33' | 41 | 50 | (64)' | | | | | | | | | | | |
| #19 | 13 | 22 | 30' | 39' | 47 | 56 | (70)' | | | | | | | | | | | |

RASTER NUMBERS WITHOUT QUOTATION MARK SHOWS THAT EVEN DOT POSITIONS ARE TARGET OF RECORDING
RASTER NUMBERS WITH QUOTATION MARK SHOWS THAT ODD DOT POSITIONS ARE TARGET OF RECORDING

Fig. 30

NOZZLE NUMBERS FOR RECORDING RESPECTIVE RASTER LINES
(FOURTH EMBODIMENT FOR k=6)

| RASTER No. | NOZZLE No. EVEN | NOZZLE No. ODD | SCAN No. (Δ) EVEN | SCAN No. (Δ) ODD | HISTORY @ EVEN/ODD | 0 | 1 | 2 | 3 | 4 | 5 | 6 | 7 | 8 | 9 | 10 | 11 | 12 |
|---|---|---|---|---|---|---|---|---|---|---|---|---|---|---|---|---|---|---|
| 0  | #3  | #14 | 9(---)  | 2(---)  | ↓ ·  | . | . | $ | . | . | . | . | . | . | @ | . | . | . |
| 1  | #17 | #6  | 0( -9)  | 7( 5)   | · ↑  | @ | . | . | . | . | . | . | . | . | . | . | . | . |
| 2  | #10 | #1  | 5( 5)   | 10( 3)  | ↑ X  | . | . | . | . | . | @ | . | . | . | . | . | . | . |
| 3  | #5  | #13 | 8( 3)   | 3( -7)  | X ·  | . | . | . | $ | . | . | . | . | @ | . | . | . | . |
| 4  | #16 | #8  | 1( -7)  | 6( 3)   | · ↑  | . | @ | . | . | . | . | . | . | . | . | . | . | . |
| 5  | #12 | #0  | 4( 3)   | 11( 5)  | ↑ X  | . | . | . | . | . | . | @ | . | . | . | . | . | . |
| 6  | #4  | #15 | 9( 5)   | 2( -9)  | X ·  | . | . | $ | . | . | . | . | . | . | @ | . | . | . |
| 7  | #18 | #7  | 0( -9)  | 7( 5)   | · ↑  | @ | . | . | . | . | . | . | . | . | . | . | . | . |
| 8  | #11 | #2  | 5( 5)   | 10( 3)  | ↑ X  | . | . | . | . | . | @ | . | . | . | . | . | . | . |
| 9  | #6  | #14 | 8( 3)   | 3( -7)  | X ·  | . | . | . | $ | . | . | . | . | @ | . | . | . | . |
| 10 | #17 | #9  | 1( -7)  | 6( 3)   | · ↑  | . | @ | . | . | . | . | . | . | . | . | . | . | . |
| 11 | #13 | #1  | 4( 3)   | 11( 5)  | ↑ X  | . | . | . | . | . | . | @ | . | . | . | . | . | . |
| 12 | #5  | #16 | 9( 5)   | 2( -9)  | X ·  | . | . | $ | . | . | . | . | . | . | @ | . | . | . |
| 13 | #19 | #8  | 0( -9)  | 7( 5)   | · ↑  | @ | . | . | . | . | . | . | . | . | . | . | . | . |
| 14 | #12 | #3  | 5( 5)   | 10( 3)  | ↑ X  | . | . | . | . | . | @ | . | . | . | . | . | . | . |
| 15 | #7  | #15 | 8( 3)   | 3( -7)  | X ·  | . | . | . | $ | . | . | . | . | @ | . | . | . | . |
| 16 | #18 | #10 | 1( -7)  | 6( 3)   | · ↑  | . | @ | . | . | . | . | . | . | . | . | . | . | . |
| 17 | #14 | #2  | 4( 3)   | 11( 5)  | ↑ X  | . | . | . | . | . | . | @ | . | . | . | . | . | . |
| 18 | #6  | #17 | 9( 5)   | 2( -9)  | ↑ ·  | . | . | $ | . | . | . | . | . | . | @ | . | . | . |
| 19 | #0  | #9  | 12( 3)  | 7( 5)   | X ↑  | . | . | . | . | . | . | . | . | $ | . | . | . | @ |
| 20 | #13 | #4  | 5( -7)  | 10( 3)  | · X  | . | . | . | . | . | @ | . | . | . | . | . | . | . |

@ INDICATES THAT EVEN DOT POSITIONS ARE TARGET OF RECORDING.
$ INDICATES THAT ODD DOT POSITIONS ARE TARGET OF RECORDING.

DOT RECORDING SCHEME OF FIFTH EMBODIMENT FOR k=6

Fig. 31(A)  SCAN PARAMETERS

NOZZLE PITCH k : 6 [dot]
NUMBER OF USED NOZZLES N : 18
NUMBER OF SCAN REPEATS s : 2
NUMBER OF EFFECTIVE NOZZLES Neff : 9
NUMBER OF SCANS IN 1 SET m : 2
VIRTUAL NOZZLE PITCH n : 3
NUMBER OF NOZZLES IN VIRTUAL NOZZLE ARRAY Nps : 36
SUB-SCAN FEED SET : (9,8), (9,11)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 9 | 8 | 9 | 8 | 9 | 11 | 9 | 8 | 9 | 8 | 9 | 11 |
| ΣL | 0 | 9 | 17 | 26 | 34 | 43 | 54 | 63 | 71 | 80 | 88 | 97 | 108 |
| F = (ΣL) % k | 0 | 3 | 5 | 2 | 4 | 1 | 0 | 3 | 5 | 2 | 4 | 1 | 0 |
| ΔF = L % k | 0 | 3 | 2 | 3 | 2 | 3 | 5 | 3 | 2 | 3 | 2 | 3 | 5 |
| DOT RECORD POSITION* | 0 | 0 | 1 | 1 | 0 | 0 | 1 | 1 | 0 | 0 | 1 | 1 | 0 |

*: 0 DENOTES EVEN DOT POSITION, AND 1 DENOTES ODD DOT POSITION

Fig. 31(B)  RASTER NUMBERS OF EFFECTIVE RASTER LINES RECORDED BY RESPECTIVE NOZZLES

| NOZZLE | NUMBER OF SUB-SCAN FEED | | | | | | | | | | | | | | | | | |
|---|---|---|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 | 15 | 16 | 17 |
| #0 | . | . | . | . | . | . | . | . | . | . | . | 5' | 16 | 25 | 33' | 42' | 50 | (59) |
| #1 | . | . | . | . | . | . | . | . | . | . | . | 2' | 11' | 22 | 31 | 39' | 48' | (56) |
| #2 | . | . | . | . | . | . | . | . | . | . | 0 | 8' | 17' | 28 | 37 | 45' | (54)' | |
| #3 | . | . | . | . | . | . | . | . | . | . | 6 | 14' | 23' | 34 | 43 | 51' | (60)' | |
| #4 | . | . | . | . | . | . | . | . | . | 3 | 12 | 20' | 29' | 40 | 49 | (57)' | | |
| #5 | . | . | . | . | . | . | . | . | 1' | 9 | 18 | 26' | 35' | 46 | (55) | | | |
| #6 | . | . | . | . | . | . | . | . | 7' | 15 | 24 | 32' | 41' | 52 | (61) | | | |
| #7 | . | . | . | . | . | . | . | 4' | 13' | 21 | 30 | 38' | 47' | (58) | | | | |
| #8 | . | . | . | . | . | . | . | 10' | 19' | 27 | 36 | 44' | 53' | (64) | | | | |
| #9 | . | . | . | . | . | . | 5 | 16' | 25' | 33 | 42 | 50' | (59)' | | | | | |
| #10 | . | . | . | . | . | 2 | 11 | 22' | 31' | 39 | 48 | (56)' | | | | | | |
| #11 | . | . | . | . | 0' | 8 | 17 | 28' | 37' | 45 | (54) | | | | | | | |
| #12 | . | . | . | . | 6' | 14 | 23 | 34' | 43' | 51 | (60) | | | | | | | |
| #13 | . | . | . | 3' | 12' | 20 | 29 | 40' | 49' | (57) | | | | | | | | |
| #14 | . | 1 | 9' | 18' | 26 | 35 | 46' | (55)' | | | | | | | | | | |
| #15 | . | 7 | 15' | 24' | 32 | 41 | 52' | (61)' | | | | | | | | | | |
| #16 | 4 | 13 | 21' | 30' | 38 | 47 | (58)' | | | | | | | | | | | |
| #17 | 10 | 19 | 27' | 36' | 44 | 53 | (64)' | | | | | | | | | | | |

RASTER NUMBERS WITHOUT QUOTATION MARK SHOWS THAT EVEN DOT POSITIONS ARE TARGET OF RECORDING
RASTER NUMBERS WITH QUOTATION MARK SHOWS THAT ODD DOT POSITIONS ARE TARGET OF RECORDING

Fig. 32

NOZZLE NUMBERS FOR RECORDING RESPECTIVE RASTER LINES
(FIFTH EMBODIMENT FOR k=6)

| RASTER No. | NOZZLE No. EVEN | NOZZLE No. ODD | SCAN No. (Δ) EVEN | SCAN No. (Δ) ODD | HISTORY @ EVEN/ODD | NUMBER OF SUB-SCAN FEED 0 | 1 | 2 | 3 | 4 | 5 | 6 | 7 | 8 | 9 | 10 | 11 | 12 |
|---|---|---|---|---|---|---|---|---|---|---|---|---|---|---|---|---|---|---|
| 0 | #2 | #11 | 9(---) | 3(---) | ↓ • | . | . | . | $ | . | . | . | . | . | @ | . | . | . |
| 1 | #14 | #5 | 1( -8) | 7( 4) | • ↑ | . | @ | . | . | . | . | . | . | . | . | . | . | . |
| 2 | #10 | #1 | 4( 3) | 10( 3) | ↑ X | . | . | . | . | @ | . | . | . | . | . | . | . | . |
| 3 | #4 | #13 | 8( 4) | 2( -8) | X • | . | . | $ | . | . | . | . | . | @ | . | . | . | . |
| 4 | #16 | #7 | 0( -8) | 6( 4) | • ↑ | @ | . | . | . | . | . | . | . | . | . | . | . | . |
| 5 | #9 | #0 | 5( 5) | 11( 5) | ↑ X | . | . | . | . | . | . | @ | . | . | . | . | . | . |
| 6 | #3 | #12 | 9( 4) | 3( -8) | X • | . | . | . | $ | . | . | . | . | . | @ | . | . | . |
| 7 | #15 | #6 | 1( -8) | 7( 4) | • ↑ | . | @ | . | . | . | . | . | . | . | . | . | . | . |
| 8 | #11 | #2 | 4( 3) | 10( 3) | ↑ X | . | . | . | . | @ | . | . | . | . | . | . | . | . |
| 9 | #5 | #14 | 8( 4) | 2( -8) | X • | . | . | $ | . | . | . | . | . | @ | . | . | . | . |
| 10 | #17 | #8 | 0( -8) | 6( 4) | • ↑ | @ | . | . | . | . | . | . | . | . | . | . | . | . |
| 11 | #10 | #1 | 5( 5) | 11( 5) | ↑ X | . | . | . | . | . | . | @ | . | . | . | . | . | . |
| 12 | #4 | #13 | 9( 4) | 3( -8) | X • | . | . | . | $ | . | . | . | . | . | @ | . | . | . |
| 13 | #16 | #7 | 1( -8) | 7( 4) | • ↑ | . | @ | . | . | . | . | . | . | . | . | . | . | . |
| 14 | #12 | #3 | 4( 3) | 10( 3) | ↑ X | . | . | . | . | @ | . | . | . | . | . | . | . | . |
| 15 | #6 | #15 | 8( 4) | 2( -8) | ↑ • | . | . | $ | . | . | . | . | . | @ | . | . | . | . |
| 16 | #0 | #9 | 12( 4) | 6( 4) | X ↑ | . | . | . | . | . | . | . | $ | . | . | . | . | @ |
| 17 | #11 | #2 | 5( -7) | 11( 5) | • X | . | . | . | . | . | @ | . | . | . | . | . | . | . |
| 18 | #5 | #14 | 9( 4) | 3( -8) | X • | . | . | . | $ | . | . | . | . | . | @ | . | . | . |
| 19 | #17 | #8 | 1( -8) | 7( 4) | • ↑ | . | @ | . | . | . | . | . | . | . | . | . | . | . |
| 20 | #13 | #4 | 4( 3) | 10( 3) | ↑ X | . | . | . | . | @ | . | . | . | . | . | . | . | . |

@ INDICATES THAT EVEN DOT POSITIONS ARE TARGET OF RECORDING.
$ INDICATES THAT ODD DOT POSITIONS ARE TARGET OF RECORDING.

DOT RECORDING SCHEME OF SIXTH EMBODIMENT FOR k=6

Fig. 33(A) SCAN PARAMETERS

NOZZLE PITCH k                                  : 6 [dot]
    NUMBER OF USED NOZZLES   N                      : 18
    NUMBER OF SCAN REPEATS   s                      : 2
    NUMBER OF EFFECTIVE NOZZLES Neff                : 9
    NUMBER OF SCANS IN 1 SET  m                     : 2
    VIRTUAL NOZZLE PITCH  n                         : 3
    NUMBER OF NOZZLES IN VIRTUAL NOZZLE ARRAY Nps   : 36
    SUB-SCAN FEED SET                               : (9,8), (9,14)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 9 | 8 | 9 | 8 | 9 | 8 | 9 | 8 | 9 | 8 | 9 | 14 |
| Σ L | 0 | 9 | 17 | 26 | 34 | 43 | 51 | 60 | 68 | 77 | 85 | 94 | 108 |
| F = (Σ L) % k | 0 | 3 | 5 | 2 | 4 | 1 | 3 | 0 | 2 | 5 | 1 | 4 | 0 |
| Δ F = L % k | 0 | 3 | 2 | 3 | 2 | 3 | 2 | 3 | 2 | 3 | 2 | 3 | 2 |
| DOT RECORD POSITION* | 0 | 0 | 1 | 1 | 0 | 0 | 1 | 1 | 0 | 0 | 1 | 1 | 0 |

*: 0 DENOTES EVEN DOT POSITION, AND 1 DENOTES ODD DOT POSITION

Fig. 33(B) RASTER NUMBERS OF EFFECTIVE RASTER LINES RECORDED BY RESPECTIVE NOZZLES

| NOZZLE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| #0  | . | . | . | . | . | . | . | . | . | . | . | 5' | 19 | 28 | 36' | 45' | 53 | (62) |
| #1  | . | . | . | . | . | . | . | . | . | . | 2' | 11' | 25 | 34 | 42' | 51' | (58) | |
| #2  | . | . | . | . | . | . | . | . | . | 0 | 8' | 17' | 31 | 40 | 48' | (57)' | | |
| #3  | . | . | . | . | . | . | . | . | . | 6 | 14' | 23' | 37 | 46 | (54)' | | | |
| #4  | . | . | . | . | . | . | . | . | 3 | 12 | 20' | 29' | 43 | 52 | (60)' | | | |
| #5  | . | . | . | . | . | . | . | 1' | 9 | 18 | 26' | 35' | 49 | (58) | | | | |
| #6  | . | . | . | . | . | . | . | 7' | 15 | 24 | 32' | 41' | (55) | | | | | |
| #7  | . | . | . | . | . | . | 4' | 13' | 21 | 30 | 38' | 47' | (61) | | | | | |
| #8  | . | . | . | . | . | 2 | 10' | 19' | 27 | 36 | 44' | 53' | (67) | | | | | |
| #9  | . | . | . | . | . | 8 | 16' | 25' | 33 | 42 | 50' | (59)' | | | | | | |
| #10 | . | . | . | . | 5 | 14 | 22' | 31' | 39 | 48 | (56)' | | | | | | | |
| #11 | . | . | . | 3' | 11 | 20 | 28' | 37' | 45 | (54) | | | | | | | | |
| #12 | . | . | 0' | 9' | 17 | 26 | 34' | 43' | 51 | (60) | | | | | | | | |
| #13 | . | . | 6' | 15' | 23 | 32 | 40' | 49' | (57) | | | | | | | | | |
| #14 | . | 4 | 12' | 21' | 29 | 38 | 46' | (55)' | | | | | | | | | | |
| #15 | 1 | 10 | 18' | 27' | 35 | 44 | 52' | (61)' | | | | | | | | | | |
| #16 | 7 | 16 | 24' | 33' | 41 | 50 | (58)' | | | | | | | | | | | |
| #17 | 13 | 22 | 30' | 39' | 47 | (56) | | | | | | | | | | | | |

RASTER NUMBERS WITHOUT QUOTATION MARK SHOWS THAT EVEN DOT POSITIONS ARE TARGET OF RECORDING
RASTER NUMBERS WITH QUOTATION MARK SHOWS THAT ODD DOT POSITIONS ARE TARGET OF RECORDING

Fig. 34

NOZZLE NUMBERS FOR RECORDING RESPECTIVE RASTER LINES
(SIXTH EMBODIMENT FOR k=6)

| RASTER No. | NOZZLE No. EVEN | NOZZLE No. ODD | SCAN No. ($\Delta$) EVEN | SCAN No. ($\Delta$) ODD | HISTORY @ EVEN/ODD | NUMBER OF SUB-SCAN FEED 0 | 1 | 2 | 3 | 4 | 5 | 6 | 7 | 8 | 9 | 10 | 11 | 12 |
|---|---|---|---|---|---|---|---|---|---|---|---|---|---|---|---|---|---|---|
| 0 | #2 | #12 | 9(---) | 2(---) | ↓ · | . | . | $ | . | . | . | . | . | . | @ | . | . | . |
| 1 | #15 | #5 | 0( -9) | 7( 5) | · ↑ | @ | . | . | . | . | . | . | . | . | . | . | . | . |
| 2 | #8 | #1 | 5( 5) | 10( 3) | ↑ X | . | . | . | . | . | @ | . | . | . | . | . | . | . |
| 3 | #4 | #11 | 8( 3) | 3( -7) | X · | . | . | . | $ | . | . | . | . | @ | . | . | . | . |
| 4 | #14 | #7 | 1( -7) | 6( 3) | · ↑ | . | @ | . | . | . | . | . | . | . | . | . | . | . |
| 5 | #10 | #0 | 4( 3) | 11( 5) | ↑ X | . | . | . | . | @ | . | . | . | . | . | . | . | . |
| 6 | #3 | #13 | 9( 5) | 2( -9) | X · | . | . | $ | . | . | . | . | . | . | @ | . | . | . |
| 7 | #16 | #6 | 0( -9) | 7( 5) | · ↑ | @ | . | . | . | . | . | . | . | . | . | . | . | . |
| 8 | #9 | #2 | 5( 5) | 10( 3) | ↑ X | . | . | . | . | . | @ | . | . | . | . | . | . | . |
| 9 | #5 | #12 | 8( 3) | 3( -7) | X · | . | . | . | $ | . | . | . | . | @ | . | . | . | . |
| 10 | #15 | #8 | 1( -7) | 6( 3) | · ↑ | . | @ | . | . | . | . | . | . | . | . | . | . | . |
| 11 | #11 | #1 | 4( 3) | 11( 5) | ↑ X | . | . | . | . | @ | . | . | . | . | . | . | . | . |
| 12 | #4 | #14 | 9( 5) | 2( -9) | X · | . | . | $ | . | . | . | . | . | . | @ | . | . | . |
| 13 | #17 | #7 | 0( -9) | 7( 5) | · ↑ | @ | . | . | . | . | . | . | . | . | . | . | . | . |
| 14 | #10 | #3 | 5( 5) | 10( 3) | ↑ X | . | . | . | . | . | @ | . | . | . | . | . | . | . |
| 15 | #6 | #13 | 8( 3) | 3( -7) | X · | . | . | . | $ | . | . | . | . | @ | . | . | . | . |
| 16 | #16 | #9 | 1( -7) | 6( 3) | · ↑ | . | @ | . | . | . | . | . | . | . | . | . | . | . |
| 17 | #12 | #2 | 4( 3) | 11( 5) | ↑ X | . | . | . | . | @ | . | . | . | . | . | . | . | . |
| 18 | #5 | #15 | 9( 5) | 2( -9) | ↑ · | . | . | $ | . | . | . | . | . | . | @ | . | . | . |
| 19 | #0 | #8 | 12( 3) | 7( 5) | X ↑ | . | . | . | . | . | . | . | $ | . | . | . | . | @ |
| 20 | #11 | #4 | 5( -7) | 10( 3) | · X | . | . | . | . | . | @ | . | . | . | . | . | . | . |

@ INDICATES THAT EVEN DOT POSITIONS ARE TARGET OF RECORDING.
$ INDICATES THAT ODD DOT POSITIONS ARE TARGET OF RECORDING.

Fig. 35

SCAN PARAMETERS FOR DOT RECORDING SCHEME OF SEVENTH EMBODIMENT FOR k=6

NOZZLE PITCH k : 6 [dot]
NUMBER OF USED NOZZLES N : 34
NUMBER OF SCAN REPEATS s : 4
NUMBER OF EFFECTIVE NOZZLES Neff : 8.5
NUMBER OF SCANS IN 1 SET m : 2
VIRTUAL NOZZLE PITCH n : 3
NUMBER OF NOZZLES IN VIRTUAL NOZZLE ARRAY Nps : 68
SUB-SCAN FEED SET : (9,8)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 9 | 8 | 9 | 8 | 9 | 8 | 9 | 8 | 9 | 8 | 9 | 8 |
| $\Sigma L$ | 0 | 9 | 17 | 26 | 34 | 43 | 51 | 60 | 68 | 77 | 85 | 94 | 102 |
| $F = (\Sigma L) \% k$ | 0 | 3 | 5 | 2 | 4 | 1 | 3 | 0 | 2 | 5 | 1 | 4 | 0 |
| $\Delta F = L \% k$ | 0 | 3 | 2 | 3 | 2 | 3 | 2 | 3 | 2 | 3 | 2 | 3 | 2 |
| DOT RECORD POSITION* | 0 | 0 | 1 | 1 | 2 | 2 | 3 | 3 | 0 | 0 | 1 | 1 | 2 |
| NUMBER OF SUB-SCAN FEED | | 13 | 14 | 15 | 16 | 17 | 18 | 19 | 20 | 21 | 22 | 23 | 24 |
| FEED AMOUNT L [dot] | | 9 | 8 | 9 | 8 | 9 | 8 | 9 | 8 | 9 | 8 | 9 | 8 |
| $\Sigma L$ | | 111 | 119 | 128 | 136 | 145 | 153 | 162 | 170 | 179 | 187 | 196 | 204 |
| $F = (\Sigma L) \% k$ | | 3 | 5 | 2 | 4 | 1 | 3 | 0 | 2 | 5 | 1 | 4 | 0 |
| $\Delta F = L \% k$ | | 3 | 2 | 3 | 2 | 3 | 2 | 3 | 2 | 3 | 2 | 3 | 2 |
| DOT RECORD POSITION* | | 2 | 3 | 3 | 0 | 0 | 1 | 1 | 2 | 2 | 3 | 3 | 0 |

*: 0 DENOTES %0 DOT POSITION;
 1 DENOTES %1 DOT POSITION;
 2 DENOTES %2 DOT POSITION; AND
 3 DENOTES %3 DOT POSITION.

Fig. 36
RASTER NUMBERS OF EFFECTIVE RASTER LINES RECORDED BY RESPECTIVE NOZZLES
(SEVENTH EMBODIMENT FOR k=6)

Fig. 37

NOZZLE NUMBERS FOR RECORDING RESPECTIVE RASTER LINES
(SEVENTH EMBODIMENT FOR k=6)

| RASTER No. | NOZZLE No. %0 %1 %2 %3 | SCAN No. (DIFFERENCE) %0 %1 %2 %3 | HISTORY %0%1%2%3 |
|---|---|---|---|
| 0  | #19 #29 #2  #12 | 9(—) 2(—) 21(—) 14(—) | → · · · → · X → · X → · X |
| 1  | #32 #5  #15 #22 | 0(-9) 19(17) 12(-9) 7(-7) | → → · · X → · X → · X |
| 2  | #8  #18 #25 #1  | 17(17) 10(-9) 5(-7) 22(15) | · X → X → · X → · X |
| 3  | #21 #28 #4  #11 | 8(-9) 3(-9) 20(15) 15(-7) | X → · · X → · X → · X |
| 4  | #31 #7  #14 #24 | 1(-7) 18(15) 13(-7) 6(-9) | · X → X → · X → · X |
| 5  | #10 #17 #27 #0  | 16(15) 11(-7) 4(-9) 23(17) | X → · · X → · X → · X |
| 6  | #20 #30 #3  #13 | 9(-7) 2(-9) 21(17) 14(-9) | → · · · X → · X → · X |
| 7  | #33 #6  #16 #23 | 0(-9) 19(17) 12(-9) 7(-7) | → → · · X → · X → · X |
| 8  | #9  #19 #26 #2  | 17(17) 10(-9) 5(-7) 22(15) | · X → X → · X → · X |
| 9  | #22 #29 #5  #12 | 8(-9) 3(-9) 20(15) 15(-7) | X → · · X → · X → · X |
| 10 | #32 #8  #15 #25 | 1(-7) 18(15) 13(-7) 6(-9) | · X → X → · X → · X |
| 11 | #11 #18 #28 #1  | 16(15) 11(-7) 4(-9) 23(17) | X → · · X → · X → · X |
| 12 | #21 #31 #4  #14 | 9(-7) 2(-9) 21(17) 14(-9) | → · · · X → · X → · X |
| 13 | #0  #7  #17 #24 | 24(15) 19(-7) 12(-7) 7(-7) | X X → · → · X → · X |
| 14 | #10 #20 #27 #3  | 17(-7) 10(-9) 5(-7) 22(15) | X → · · X → · X → · X |
| 15 | #23 #30 #6  #13 | 8(-9) 3(-9) 20(15) 15(-7) | X → · · X → · X → · X |
| 16 | #33 #9  #16 #26 | 1(-7) 18(15) 13(-7) 6(-9) | · X → X → · X → · X |
| 17 | #12 #19 #29 #2  | 16(15) 11(-7) 4(-9) 23(17) | X → · · X → · X → · X |
| 18 | #22 #32 #5  #15 | 9(-7) 2(-9) 21(17) 14(-9) | → · · · X → · X → · X |
| 19 | #1  #8  #18 #25 | 24(15) 19(-7) 12(-9) 7(-7) | X · · → X → · X → · X |
| 20 | #11 #21 #28 #4  | 17(-7) 10(-9) 5(-7) 22(15) | X X → · → · X → · X |

NUMBER OF SUB-SCAN FEED
0 1 2 3 4 5 6 7 8 9 0 1 2 3 4 5 6 7 8 9 0 1 2 3 4 5 6 7 8 9 0 1 2 3 4

DOT RECORDING SCHEME OF EIGHTH EMBODIMENT FOR k=6

Fig. 38(A) SCAN PARAMETERS

NOZZLE PITCH k                               : 6 [dot]
    NUMBER OF USED NOZZLES  N                    : 15,16  (ALTERNATELY)
    NUMBER OF SCAN REPEATS  s                    : 1
    NUMBER OF EFFECTIVE NOZZLES Neff             : 15.5
    NUMBER OF SCANS IN 1 SET  m                  : 2
    VIRTUAL NOZZLE PITCH  n                      : 3
    NUMBER OF NOZZLES IN VIRTUAL NOZZLE ARRAY Nps : 31
    SUB-SCAN FEED SET                            : (3,28)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 3 | 28 | 3 | 28 | 3 | 28 | 3 | 28 | 3 | 28 | 3 | 28 |
| ΣL | 0 | 3 | 31 | 34 | 62 | 65 | 93 | 96 | 124 | 127 | 155 | 158 | 186 |
| F = (ΣL) % k | 0 | 3 | 1 | 4 | 2 | 5 | 3 | 0 | 4 | 1 | 5 | 2 | 0 |
| ΔF = L % k | 0 | 3 | 4 | 3 | 4 | 3 | 4 | 3 | 4 | 3 | 4 | 3 | 4 |
| UNUSED NOZZLE No. | 0 | - | 0 | - | 0 | - | 0 | - | 0 | - | 0 | - | 0 |

Fig. 38(B) RASTER NUMBERS OF EFFECTIVE RASTER LINES RECORDED BY RESPECTIVE NOZZLES

| NOZZLE | \multicolumn{12}{c}{NUMBER OF SUB-SCAN FEED} |
|---|---|---|---|---|---|---|---|---|---|---|---|---|
|  | 0 | 1 | 2 | 3 | 4 | 5 | 6 | 7 | 8 | 9 | 10 | 11 |
| #0  | . | . | . | . | . | 2 | . | 33 | . | 64 | . | (95) |
| #1  | . | . | . | . | 5 | 8 | 36 | 39 | 67 | 70 | (98) | |
| #2  | . | . | . | . | 11 | 14 | 42 | 45 | 73 | 76 | (104) | |
| #3  | . | . | . | . | 17 | 20 | 48 | 51 | 79 | 82 | (110) | |
| #4  | . | . | . | . | 23 | 26 | 54 | 57 | 85 | 88 | (116) | |
| #5  | . | . | . | 1 | 29 | 32 | 60 | 63 | 91 | (94) | | |
| #6  | . | . | 4 | 7 | 35 | 38 | 66 | 69 | (97) | | | |
| #7  | . | . | 10 | 13 | 41 | 44 | 72 | 75 | (103) | | | |
| #8  | . | . | 16 | 19 | 47 | 50 | 78 | 81 | (109) | | | |
| #9  | . | . | 22 | 25 | 53 | 56 | 84 | 87 | (115) | | | |
| #10 | . | 0 | 28 | 31 | 59 | 62 | 90 | (93) | | | | |
| #11 | 3 | 6 | 34 | 37 | 65 | 68 | (96) | | | | | |
| #12 | 9 | 12 | 40 | 43 | 71 | 74 | (102) | | | | | |
| #13 | 15 | 18 | 46 | 49 | 77 | 80 | (108) | | | | | |
| #14 | 21 | 24 | 52 | 55 | 83 | 86 | (114) | | | | | |
| #15 | 27 | 30 | 58 | 61 | 89 | 92 | (120) | | | | | |

Fig. 39

NOZZLE NUMBERS FOR RECORDING RESPECTIVE RASTER LINES
(EIGHTH EMBODIMENT FOR k=6)

| RASTER No. | NOZZLE No. | SCAN No. ($\Delta$) | HISTORY @ | NUMBER OF SUB-SCAN FEED |   |   |   |   |   |
|---|---|---|---|---|---|---|---|---|---|
|   |   |   |   | 0 | 1 | 2 | 3 | 4 | 5 |
| 0 | 10 | 1(---) | · | . | @ |   |   |   |   |
| 1 | 5 | 3( 2) | ↑ | . | . | . | @ |   |   |
| 2 | 0 | 5( 2) | X | . | . | . | . | . | @ |
| 3 | 11 | 0( -5) | · | @ |   |   |   |   |   |
| 4 | 6 | 2( 2) | ↑ | . | . | @ |   |   |   |
| 5 | 1 | 4( 2) | X | . | . | . | . | @ |   |
| 6 | 11 | 1( -3) | · | . | @ |   |   |   |   |
| 7 | 6 | 3( 2) | ↑ | . | . | . | @ |   |   |
| 8 | 1 | 5( 2) | X | . | . | . | . | . | @ |
| 9 | 12 | 0( -5) | · | @ |   |   |   |   |   |
| 10 | 7 | 2( 2) | ↑ | . | . | @ |   |   |   |
| 11 | 2 | 4( 2) | X | . | . | . | . | @ |   |
| 12 | 12 | 1( -3) | · | . | @ |   |   |   |   |
| 13 | 7 | 3( 2) | ↑ | . | . | . | @ |   |   |
| 14 | 2 | 5( 2) | X | . | . | . | . | . | @ |
| 15 | 13 | 0( -5) | · | @ |   |   |   |   |   |
| 16 | 8 | 2( 2) | ↑ | . | . | @ |   |   |   |
| 17 | 3 | 4( 2) | X | . | . | . | . | @ |   |
| 18 | 13 | 1( -3) | · | . | @ |   |   |   |   |
| 19 | 8 | 3( 2) | ↑ | . | . | . | @ |   |   |
| 20 | 3 | 5( 2) | X | . | . | . | . | @ |   |

@ INDICATES TARGET OF RECORDING.

DOT RECORDING SCHEME OF NINTH EMBODIMENT FOR k=6

Fig. 40(A)  SCAN PARAMETERS

NOZZLE PITCH k : 6 [dot]
NUMBER OF USED NOZZLES  N : 14
NUMBER OF SCAN REPEATS  s : 2
NUMBER OF EFFECTIVE NOZZLES Neff : 7
NUMBER OF SCANS IN 1 SET  m : 3
VIRTUAL NOZZLE PITCH  n : 2
NUMBER OF NOZZLES IN VIRTUAL NOZZLE ARRAY Nps : 42
SUB-SCAN FEED SET : (8,8,5)

| NUMBER OF SUB-SCAN FEED | 0 | 1 | 2 | 3 | 4 | 5 | 6 | 7 | 8 | 9 | 10 | 11 | 12 |
|---|---|---|---|---|---|---|---|---|---|---|---|---|---|
| FEED AMOUNT L [dot] | 0 | 8 | 8 | 5 | 8 | 8 | 5 | 8 | 8 | 5 | 8 | 8 | 5 |
| $\Sigma L$ | 0 | 8 | 16 | 21 | 29 | 37 | 42 | 50 | 58 | 63 | 71 | 79 | 84 |
| $F = (\Sigma L) \% k$ | 0 | 2 | 4 | 3 | 5 | 1 | 0 | 2 | 4 | 3 | 5 | 1 | 0 |
| $\Delta F = L \% k$ | 0 | 2 | 2 | 5 | 2 | 2 | 5 | 2 | 2 | 5 | 2 | 2 | 5 |
| DOT RECORD POSITION* | 0 | 1 | 0 | 0 | 1 | 0 | 1 | 0 | 1 | 1 | 0 | 1 | 0 |

*: 0 DENOTES EVEN DOT POSITION, AND 1 DENOTES ODD DOT POSITION

Fig. 40(B)  RASTER NUMBERS OF EFFECTIVE RASTER LINES RECORDED BY RESPECTIVE NOZZLES

```
          NUMBER OF SUB-SCAN FEED
NOZZLE  0   1    2   3    4    5   6    7    8    9    10   11   12   13   14   15   16    17
   #0   .   .    .   .    .    .   .    .    .    .    .    5'   10   18'  26   31   39'  (47)
   #1   .   .    .   .    .    .   .    .    .    .    3    11'  16   24'  32   37   (45)'
   #2   .   .    .   .    .    .   .    .    .    1'   9    17'  22   30'  38   (43)
   #3   .   .    .   .    .    .   .    .    2'   7'   15   23'  28   36'  (44)
   #4   .   .    .   .    .    .   .    0    8'   13'  21   29'  34   (42)'
   #5   .   .    .   .    .    .   6    14'  19'  27   35'  40   (48)'
   #6   .   .    .   .    .    4'  12   20'  25'  33   41'  (46)
   #7   .   .    .   .    5    10'  18   26'  31'  39   (47)'
   #8   .   .    .   3'   11   16'  24   32'  37'  (45)
   #9   .   .    1   9'   17   22'  30   38'  (43)'
  #10   .   .   .2   7    15'  23   28'  36   (44)'
  #11   .   0'   8   13   21'  29   34'  (42)
  #12   .   6'   14  19   27'  35   40'  (48)
  #13   4   12'  20  25   33'  41   (46)'
```

RASTER NUMBERS WITHOUT QUOTATION MARK SHOWS THAT EVEN DOT POSITIONS ARE TARGET OF RECORDING
RASTER NUMBERS WITH QUOTATION MARK SHOWS THAT ODD DOT POSITIONS ARE TARGET OF RECORDING

Fig. 41

NOZZLE NUMBERS FOR RECORDING RESPECTIVE RASTER LINES
(NINTH EMBODIMENT FOR k=6)

| RASTER No. | NOZZLE No. EVEN | NOZZLE No. ODD | SCAN No. (Δ) EVEN | SCAN No. (Δ) ODD | HISTORY @ EVEN/ODD | NUMBER OF SUB-SCAN FEED 0 | 1 | 2 | 3 | 4 | 5 | 6 | 7 | 8 | 9 | 10 | 11 | 12 |
|---|---|---|---|---|---|---|---|---|---|---|---|---|---|---|---|---|---|---|
| 0 | #4 | #11 | 7(---) | 1(---) | ↓ · | . | $ | . | . | . | . | . | @ | . | . | . | . | . |
| 1 | #9 | #2 | 3( -4) | 9( 8) | ↓ X | . | . | . | @ | . | . | . | . | . | . | . | . | . |
| 2 | #10 | #3 | 2( -1) | 8( -1) | · ↓ | . | . | @ | . | . | . | . | . | . | . | . | . | . |
| 3 | #1 | #8 | 10( 8) | 4( -4) | X · | . | . | . | . | . | $ | . | . | . | . | @ | . | . |
| 4 | #13 | #6 | 0(-10) | 6( 2) | · ↑ | @ | . | . | . | . | . | . | . | . | . | . | . | . |
| 5 | #7 | #0 | 5( 5) | 11( 5) | ↑ X | . | . | . | . | . | . | @ | . | . | . | . | . | . |
| 6 | #5 | #12 | 7( 2) | 1(-10) | X · | . | $ | . | . | . | . | . | @ | . | . | . | . | . |
| 7 | #10 | #3 | 3( -4) | 9( 8) | ↓ X | . | . | . | @ | . | . | . | . | . | . | . | . | . |
| 8 | #11 | #4 | 2( -1) | 8( -1) | · ↓ | . | . | @ | . | . | . | . | . | . | . | . | . | . |
| 9 | #2 | #9 | 10( 8) | 4( -4) | ↑ · | . | . | . | . | . | $ | . | . | . | . | @ | . | . |
| 10 | #0 | #7 | 12( 2) | 6( 2) | X ↑ | . | . | . | . | . | . | . | $ | . | . | . | . | @ |
| 11 | #8 | #1 | 5( -7) | 11( 5) | · X | . | . | . | . | . | . | @ | . | . | . | . | . | . |
| 12 | #6 | #13 | 7( 2) | 1(-10) | X · | . | $ | . | . | . | . | . | @ | . | . | . | . | . |
| 13 | #11 | #4 | 3( -4) | 9( 8) | ↓ X | . | . | . | @ | . | . | . | . | . | . | . | . | . |
| 14 | #12 | #5 | 2( -1) | 8( -1) | · ↓ | . | . | @ | . | . | . | . | . | . | . | . | . | . |
| 15 | #3 | #10 | 10( 8) | 4( -4) | ↑ · | . | . | . | . | . | $ | . | . | . | . | @ | . | . |
| 16 | #1 | #8 | 12( 2) | 6( 2) | X ↑ | . | . | . | . | . | . | . | $ | . | . | . | . | @ |
| 17 | #9 | #2 | 5( -7) | 11( 5) | · ↑ | . | . | . | . | . | . | @ | . | . | . | . | . | . |
| 18 | #7 | #0 | 7( 2) | 13( 2) | X X * | . | . | . | . | . | . | . | @ | . | . | . | . | . |
| 19 | #12 | #5 | 3( -4) | 9( -4) | ↓ ↓ * | . | . | . | @ | . | . | . | . | . | . | . | . | . |
| 20 | #13 | #6 | 2( -1) | 8( -1) | · ↓ | . | . | @ | . | . | . | . | . | . | . | . | . | . |

@ INDICATES THAT EVEN DOT POSITIONS ARE TARGET OF RECORDING.
$ INDICATES THAT ODD DOT POSITIONS ARE TARGET OF RECORDING.

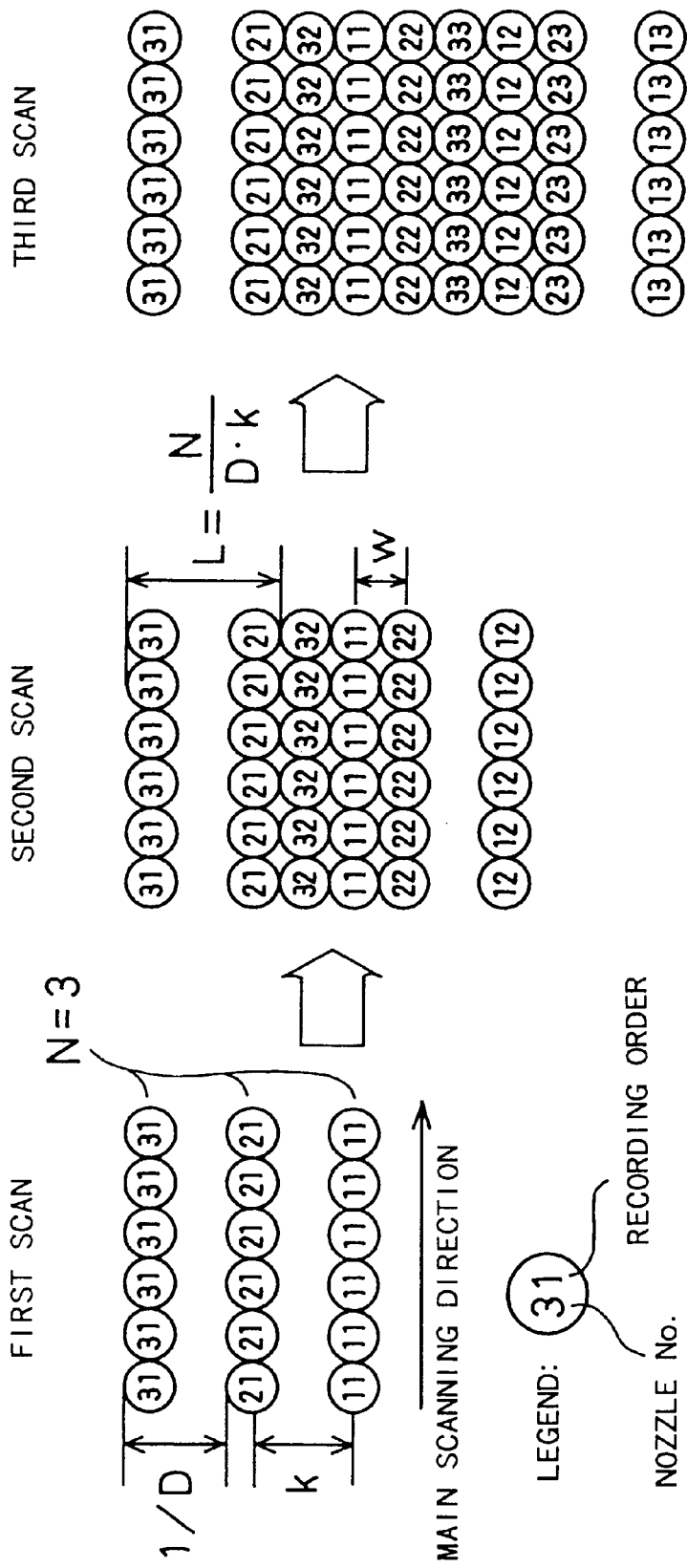

DOT RECORDING METHOD AND DOT RECORDING DEVICE

BACKGROUND OF THE INVENTION

1. Field of the Invention

The present invention relates to a technique of recording dots on the surface of a printing medium with a dot recording head.

2. Discussion of the Background

Serial scan-type printers and drum scan-type printers are dot recording devices which record dots with a recording head while carrying out scans both in a main scanning direction and a sub-scanning direction. There is a technique called the "interlace scheme", which is taught by U.S. Pat. No. 4,198,642 and Japanese Patent Laid-Open Gazette No. 53-2040, for improving the image quality of printers of this type, especially ink jet printers.

FIG. 42 is a diagram for explaining an example of the interlace scheme. In this specification, the following parameters are used to define a printing scheme.

N: Number of nozzles;
k: Nozzle pitch [dots];
s: Number of scan repeats;
D: Nozzle density [nozzles/inch];
L: Sub-scanning pitch [dots] or [inch];
w: Dot pitch [inch].

The number of nozzles N is the number of nozzles actually used to form dots. In the example of FIG. 42, N=3. The nozzle pitch k is the interval between the centers of the recording head nozzles expressed in units of the recorded image pitch (dot pitch w). In the example of FIG. 42, k=2. The number of scan repeats s is the number of main scans in which all dot positions on a main scanning line are serviced. In the example of FIG. 42, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the recording head. The sub-scanning pitch L (inch) is the distance moved in 1 sub-scan. The dot pitch w (inch) is the pitch of the dots in the recorded image. In general, it holds that w=1/(D·k), k=1/(D·w).

The circles containing two-digit numerals in FIG. 42 indicate dot recording positions. As indicated in the legend, the numeral on the left in each circle indicates the nozzle number and the numeral on the right indicates the recording order (the number of the main scan in which it was recorded).

The interlace scheme shown in FIG. 42 is characterized by the configuration of the nozzle array of the recording head and the sub-scanning method. Specifically, in the interlace scheme, the nozzle pitch k indicating the interval between the centers of adjacent nozzles is defined as an integer not smaller than 2, while the number of nozzles N and the nozzle pitch k are selected as integers which are relatively prime. Further, sub-scanning pitch L is set at a constant value given by N/(D·k).

The interlace scheme makes irregularities in nozzle pitch and ink jetting Feature to thin out over the recorded image. Because of this, it improves image quality by mitigating the effect of any irregularity that may be present in the nozzle pitch, the jetting Feature and the like.

The "overlap scheme", also known as the "multi-scan scheme", taught for example by Japanese Patent Laid-Open Gazette No. 3-207665 and Japanese Patent Publication Gazette No. 4-19030 is another technique used to improve image quality in color ink jet printers.

FIG. 43 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since S=2 in the example of FIG. 43, a dot is formed at every second dot position. The timing of the driving of the nozzle sets is controlled so that the each nozzle set forms dots at different positions from the other in the man scanning direction. In other words, as shown in FIG. 43, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the nozzle pick k is set at an integer no less than 2, as in the interlace scheme. However, the number of nozzles N and the nozzle pitch k are not relatively prime, but the nozzle pitch k and the value N/s, which is obtained by dividing the number of nozzles N by the number of scan repeats s, are set at relatively prime integers instead.

In the overlap scheme, the dots of each main scanning line are not all recorded by the same nozzle but by multiple nozzles. Even when the nozzle characteristics (pitch, jetting characteristic etc.) are not completely uniform, therefore, enhanced image quality can be obtained because the characteristics of the individual nozzles is prevented from affecting the entire main scanning line.

As described above, a variety of dot recording schemes have been proposed so far. There are various restrictions for the parameters defining a dot recording scheme (that is, the number of nozzles N, the nozzle pitch k, the number of scan repeats s, and the sub-scan feed amount L), and it is sometimes difficult to establish a recording scheme to attain high image quality. When the nozzle pitch k is equal to 8 dots, for example, a recording scheme attaining high image quality can be established relatively easily. When the nozzle pitch k is equal to 4 dots or 6 dots, on the other hand, it is sometimes difficult to establish a recording scheme attaining high image quality. This problem is also found in the technique of recording dots on a surface of a printing medium with a head having dot-forming elements other than ink-jet nozzles.

SUMMARY OF THE INVENTION

The present invention is made to solve the above problem of the prior art, and an object of the present invention is to provide a technique that enables an appropriate recording scheme to be adopted according to a pitch of dot-forming elements, to thereby record a high quality image.

In order to solve at least part of the above problems, there is provided a dot recording apparatus for recording dots on a surface of a printing medium with a dot recording head. The dot recording apparatus comprises: a dot-forming element array arranged on the dot recording head to face the printing medium, the dot-forming element array comprising a plurality of dot-forming elements for forming a plurality of dots of an identical color at a substantially constant pitch in a sub-scanning direction; a main scan driving unit that drives at least one of the dot recording head and the printing medium to carry out main scan; a head driving unit that drives at least part of the plurality of dot-forming elements to form dots during the main scan; a sub-scan driving unit that drives at least one of the dot recording head and the printing medium every time when the main scan is completed, thereby carrying out sub-scan; and a control unit that controls the above units.

The pitch k of dot-forming elements is set at a product m·n of two integers m and n (where m an n are integers of no less than 2). The sub-scan feed is executed by plural sub-scan feed sets, each consisting of m sub-scan feeds. When feed amounts of the m sub-scan feeds in each sub-scan feed set are expressed as Li dots (where i is an integer of 1 to m), the following (1) and (2) hold: (1) the feed amounts Li (i=1 to (m−1)) at first through (m-l)-th sub-scan feeds are established so that a remainder obtained by dividing each feed amount Li by the pitch k is equal to the integer n; (2) a feed amount Lm in the m-th sub-scan is established so that a remainder obtained by dividing the feed amount Lm by the pitch k is an integer that is different from a value n·j that is j times the integer n (where j denotes an arbitrary integer).

When the sub-scan feed amounts are established according to the condition (1), combination of the positions of dot-forming elements in m main scans, in which first through (m−1)-th sub-scan feeds are interposed in each sub-scan feed set, gives a virtual dot-forming element array in which a virtual pitch of the dot-forming elements is n dots. When the feed amount Lm in the m-th sub-scan is established according to the condition (2), the virtual dot-forming element array is fed in the sub-scanning direction by the feed amount of Lm dots. This arrangement allows an appropriate recording scheme suitable to the pitch of the dot-forming elements to be established relatively easily, thereby enabling high quality images to be recorded.

The plural sub-scan feed sets may be constituted from a single type of sub-scan feed set which has an identical combination of the feed amounts for the m sub-scan feeds. This arrangement simplifies the sub-scan feeds.

The plural sub-scan feed sets may be constituted from plural different types of sub-scan feed sets which have different combinations of the feed amounts for the m sub-scan feeds. This arrangement increases the degree of freedom in setting the sub-scan feed amounts and may facilitate the establishing of the appropriate sub-scan feed.

The feed amount Lm in the m-th sub-scan may be established so that the remainder obtained by dividing the feed amount Lm by the pitch k is an integer other than 1 and (k−1). In general, when the remainder obtained by dividing the feed amount L by the pitch k is equal to either 1 or (k−1), adjoining scanning lines are recorded by successive two main scans. Setting the feed amount Lm in the m-th sub-scan in the above manner prevents adjoining scanning lines from being recorded by successive two main scans. If adjoining scanning lines are recorded by successive two main scans, problems like a blue of ink may arise in forming dots with the ink jet and lead to deterioration of the image quality. Setting the feed amount Lm in the m-th sub-scan in the above manner effectively prevents the deterioration of the image quality.

The remainder obtained by dividing the feed amount Lm for the m-th sub-scan in each sub-scan feed set by the pitch k may be fixed to a constant integer that is common to all of the sub-scan feed sets. This arrangement makes a virtual nozzle array to be fed by the constant feed amount Lm and thereby attains stable image quality along the sub-scanning direction.

It is preferable that the pitch k is equal to 6, that the integer m is equal to 2, that the integer n is equal to 3, and that the remainder obtained by dividing the feed amount Lm in the m-th sub-scan by the pitch k is equal to 2 or 4. Although it may be difficult to set the dot recording scheme attaining the high image quality when the pitch k is equal to 6 dots, the values given above enable the dot recording scheme attaining the high image quality to be established relatively easily.

The number of dot-forming elements used for a main scan after at least one sub-scan out of the m sub-scans may be varied in each sub-scan feed set. This arrangement facilitates the setting of the dot recording scheme that enables the main scanning lines to be recorded without any dropout or overlap.

When the pitch k is equal to 4, the specific dot recording mode may include a sub-scan feed amount which changes by 2 a remainder obtained by dividing a summation of sub-scan feed amounts by 4. This arrangement effectively prevents the accumulated sub-scan feed error from occurring at a relatively large period, thereby relieving the deterioration of the image quality.

The number of effective dot-forming elements may set at an integer which is no less than 2 and which is not prime relative to 4, in the specific dot recording mode, where the number of effective dot-forming elements represents a net number of raster lines in a main scanning direction which can be recorded by one main scan. This arrangement readily implements the dot recording mode that include a sub-scan feed amount which changes by 2 a remainder obtained by dividing a summation of sub-scan feed amounts by 4.

The present invention has another aspect as a dot recording method used in the dot recording apparatus. The present invention has still another aspect as a computer readable medium storing a computer program for implementing the dot recording method and the dot recording apparatus with a computer.

BRIEF DESCRIPTION OF THE DRAWINGS

FIGS. 5(A) and 5(B) show an arrangement of ink jet nozzles on ink jet heads 61 through 64;

FIGS. 6(A) and 6(B) show the fundamental conditions of a general dot recording scheme when the number of scan repeats s is equal to 1;

FIGS. 7(A) and 7(B) show the fundamental conditions of the general dot recording scheme when the number of scan repeats s is no less than 2;

FIGS. 8(A) and 8(B) show the principle of the dot recording scheme for k=4;

FIGS. 9(A) and 9(B) show the parameters of two dot recording schemes for k=6;

FIGS. 13(A) and 13(B) show the scanning parameters and the raster numbers of the effective raster lines recorded by the respective nozzles in the first embodiment of the dot recording scheme for k=4;

FIG. 14 shows the nozzle numbers for recording the effective raster lines in the first embodiment of the dot recording scheme for k=4;

FIGS. 15(A) and 15(B) show the scanning parameters and the raster numbers of the effective raster lines recorded by the respective nozzles in a first control example of the dot recording scheme for k=4;

FIG. 16 shows the nozzle numbers for recording the effective raster lines in the first control example of the dot recording scheme for k=4;

FIGS. 17(A) through 17(F) show possible combinations of the offset F and its difference ΔF when the nozzle pitch k is equal to 4 dots and the number of scan repeats s is equal to 1;

FIG. 18 shows the scanning parameters in a second control example of the dot recording scheme for k=4;

FIGS. 19(A) and 19(B) shows the scanning parameters and the raster numbers of the effective raster lines recorded by the respective nozzles in a second embodiment of the dot recording scheme for k=4;

FIG. 20 shows the nozzle numbers for recording the effective raster lines in the second embodiment of the dot recording scheme for k=4;

FIGS. 21(A) and 21(B) show the scanning parameters in third and fourth embodiments of the dot recording scheme for k=4;

FIGS. 22(A) through 22(D)) shows the scanning parameters in fifth through eighth embodiments of the dot recording scheme for k=4;

FIGS. 23(A) and 23(B) show the scanning parameters and the raster numbers of the effective raster lines recorded by the respective nozzles in a first embodiment of the dot recording scheme for k=6;

FIG. 24 shows the nozzle numbers for recording the effective raster lines in the first embodiment of the dot recording scheme for k=6;

FIGS. 25(A) and 25(B) show the scanning parameters and the raster numbers of the effective raster lines recorded by the respective nozzles in a second embodiment of the dot recording scheme for k=6;

FIG. 26 shows the nozzle numbers for recording the effective raster lines in the second embodiment of the dot recording scheme for k=6;

FIGS. 27(A) and 27(B) show the scanning parameters and the raster numbers of the effective raster lines recorded by the respective nozzles in a third embodiment of the dot recording scheme for k=6;

FIG. 28 shows the nozzle numbers for recording the effective raster lines in the third embodiment of the dot recording scheme for k=6;

FIGS. 29(A) and 29(B) show the scanning parameters and the raster numbers of the effective raster lines recorded by the respective nozzles in a fourth embodiment of the dot recording scheme for k=6;

FIG. 30 shows the nozzle numbers for recording the effective raster lines in the fourth embodiment of the dot recording scheme for k=6;

FIGS. 31(A) and 31(B) show the scanning parameters and the raster numbers of the effective raster lines recorded by the respective nozzles in a fifth embodiment of the dot recording scheme for k=6;

FIG. 32 shows the nozzle numbers for recording the effective raster lines in the fifth embodiment of the dot recording scheme for k=6;

FIGS. 33(A) and 33(B) show the scanning parameters and the raster numbers of the effective raster lines recorded by the respective nozzles in a sixth embodiment of the dot recording scheme for k=6;

FIG. 34 shows the nozzle numbers for recording the effective raster lines in the sixth embodiment of the dot recording scheme for k=6;

FIG. 35 shows the scanning parameters in a seventh embodiment of the dot recording scheme for k=6;

FIG. 36 shows the raster numbers of the effective raster lines recorded by the respective nozzles in the seventh embodiment of the dot recording scheme for k=6;

FIG. 37 shows the nozzle numbers for recording the effective raster lines in the seventh embodiment of the dot recording scheme for k=6;

FIGS. 38(A) and 38(B) show the scanning parameters and the raster numbers of the effective raster lines recorded by the respective nozzles in an eighth embodiment of the dot recording scheme for k=6;

FIG. 39 shows the nozzle numbers for recording the effective raster lines in the eighth embodiment of the dot recording scheme for k=6;

FIGS. 40(A) and 40(B) show the scanning parameters and the raster numbers of the effective raster lines recorded by the respective nozzles in a ninth embodiment of the dot recording scheme for k=6;

FIG. 41 shows the nozzle numbers for recording the effective raster lines in the ninth embodiment of the dot recording scheme for k=6;

FIG. 42 shows an example of the conventional interlace recording scheme; and

DETAILED DESCRIPTION OF THE PREFERRED EMBODIMENTS

A. Structure of Apparatus

Figure 1:
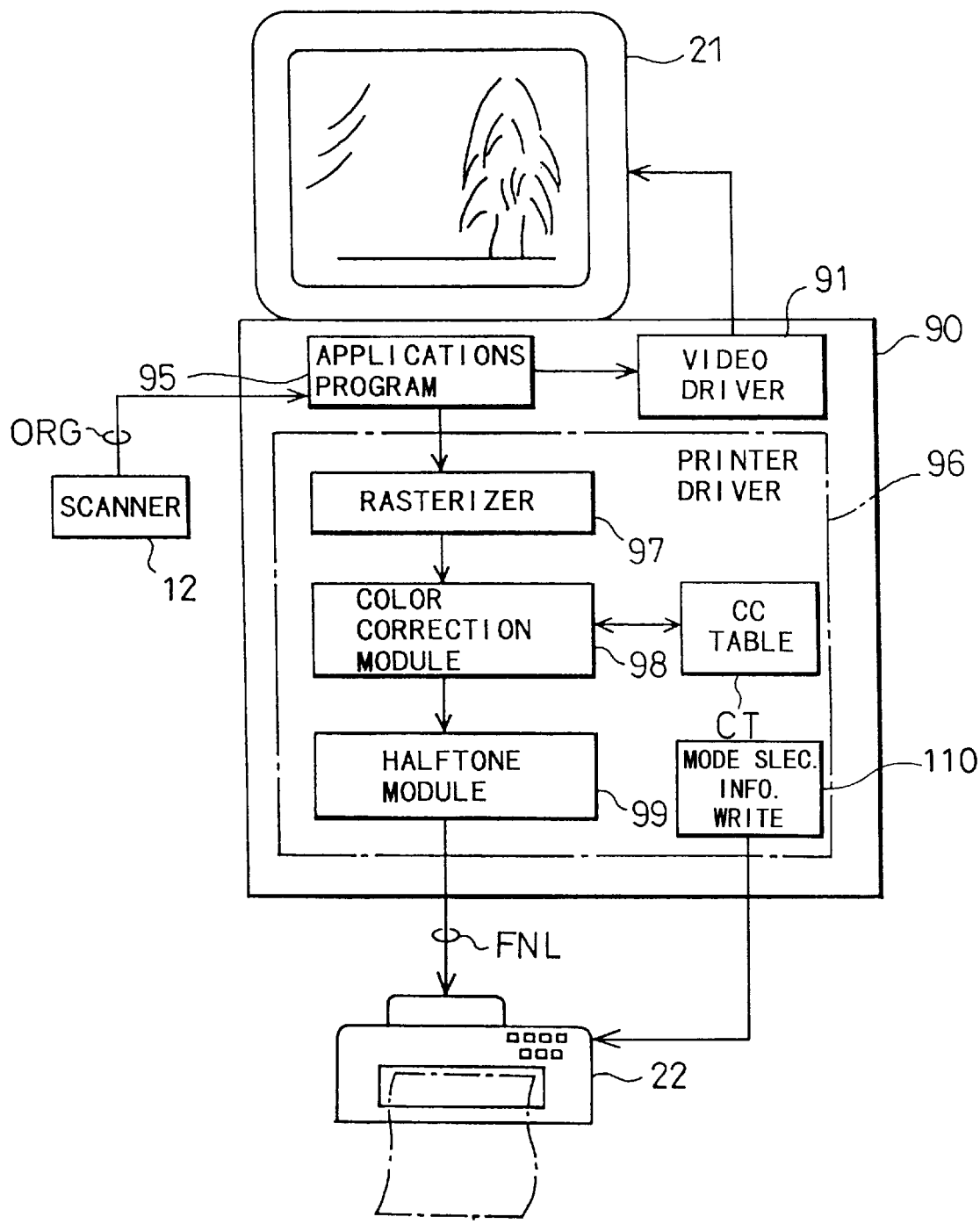
FIG. 1 is a block diagram schematically illustrating the structure of an image processing system embodying the present invention.

FIG. 1 is a block diagram illustrating the structure of a color image processing system embodying the present invention. The color image processing system includes a scanner 12, a personal computer 90, and a color printer 22. The personal computer 90 includes a color display 21. The scanner 21 captures color image data of a color original, and supplies the original color image data ORG, including R, G, and B components, to the computer 90.

The computer 90 is provided therein with CPU, RAM, and ROM (not shown), and an applications program 95 runs under a specific operating system. A video driver 91 and a printer driver 96 are incorporated in the operating system, and final color image data FNL of the applications program 95 are output through these drivers. The applications program 95 used for, for example, retouching an image, reads an image from the scanner, execute a prescribed processing, and displays the image on the CRT display 93 through the video driver 91. When the applications program 95 outputs a printing instruction, the printer driver 96 receives image information from the applications program 95 and converts the input image information to printing signals for the printer 22. (The printing signals are binarized signals for the respective colors of C, M, Y, and K.) In the example of FIG. 1, the printer driver 96 includes: a rasterizer 97 for converting the color image data processed by the applications program 95 to dot-based image data; a color correction module 98 for executing color correction on the dot-based image data according to the ink colors of C, M, and Y used by the printer 22 and the colorimetric characteristics of the printer 22; a color correction table CT referred to by the color correction module 98; a halftone module 99 for generating halftone image data, which represents image density in a particular area by on/off of ink in each dot, from the color-corrected image data; and a mode selection writing module 110 for writing mode selection information, which will be described later, into a memory in the color printer 22.

Figure 2:
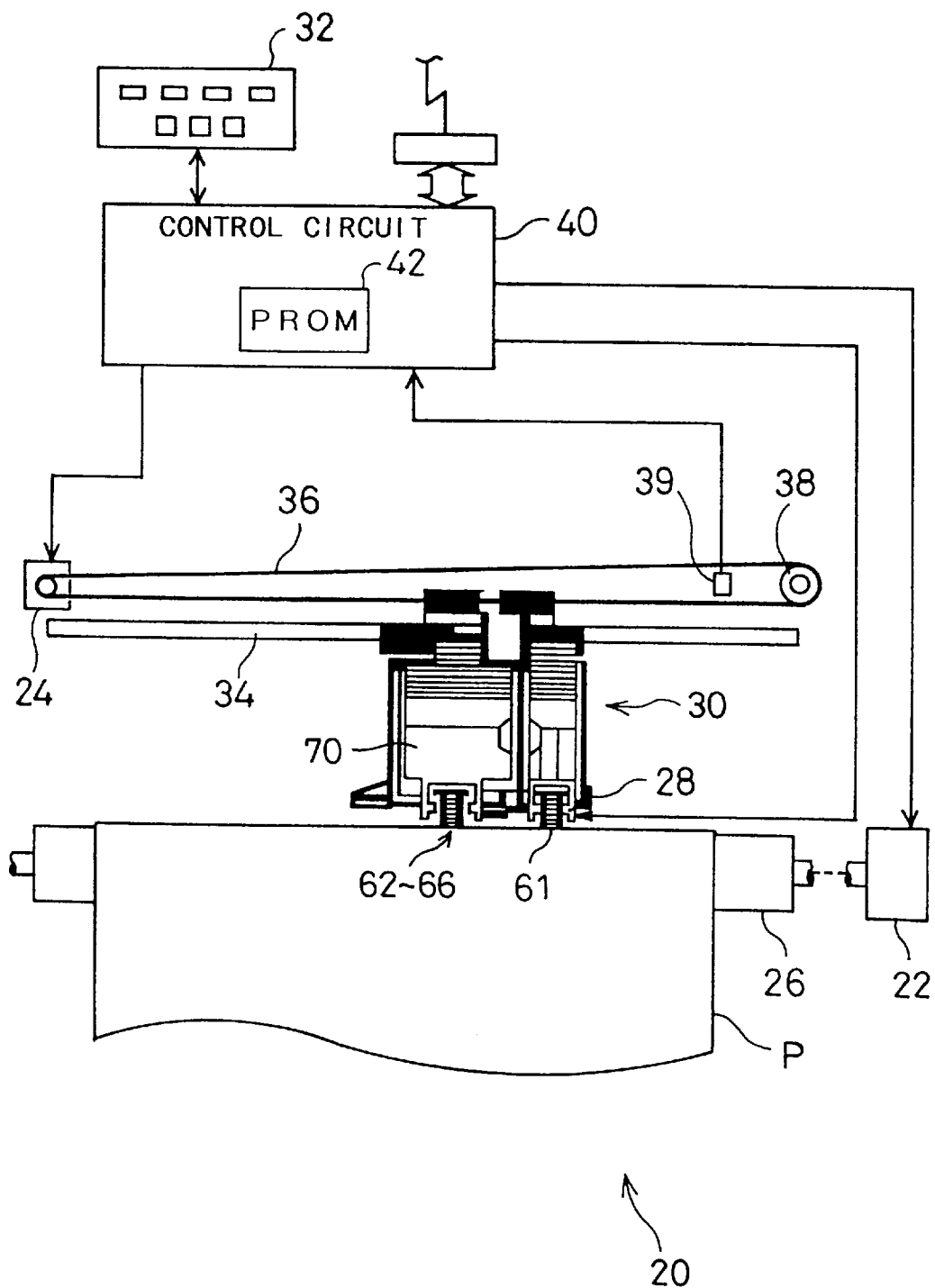
FIG. 2 schematically illustrates the structure of a color printer 22 as an example of the image output apparatus 20.

FIG. 2 schematically illustrates the structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan, magenta, and yellow, may be mounted on the carriage 31 of the printer 22. Four ink discharge heads 61 through 64 are formed on the print head 28 that is disposed in the lower portion of the carriage 31, and ink supply conduits 65 (see FIG. 3) are formed in the bottom portion of the carriage 31 for leading supplies of ink from ink tanks to the respective ink discharge heads 61 through 64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61 through 64.

Figure 3:
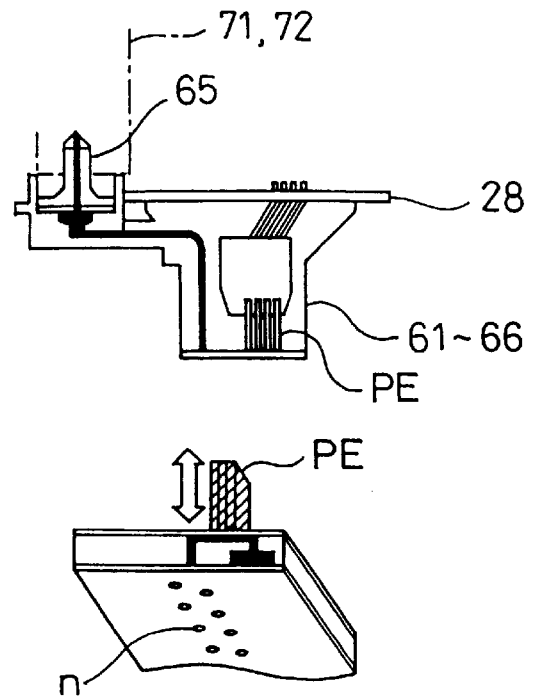
FIG. 3 illustrates the structure of a print head 28.

The following briefly describes the mechanism of discharging ink. When the ink cartridges 71 and 72 are attached to the carriage 31, inks in the ink cartridges 71 and 72 are sucked out through the ink supply conduits 65 by capillarity and are led to the ink discharge heads 61 through 64 formed in the print head 28 arranged in the lower portion of the carriage 31 as shown in FIG. 3. When the ink cartridges 71 and 72 are attached to the carriage 31, a pump works to suck first supplies of ink into the respective ink discharge heads 61 through 64. In this embodiment, the structures of the pump for suction and a cap for covering the print head 28 during the suction are not illustrated nor described specifically.

Figure 4:
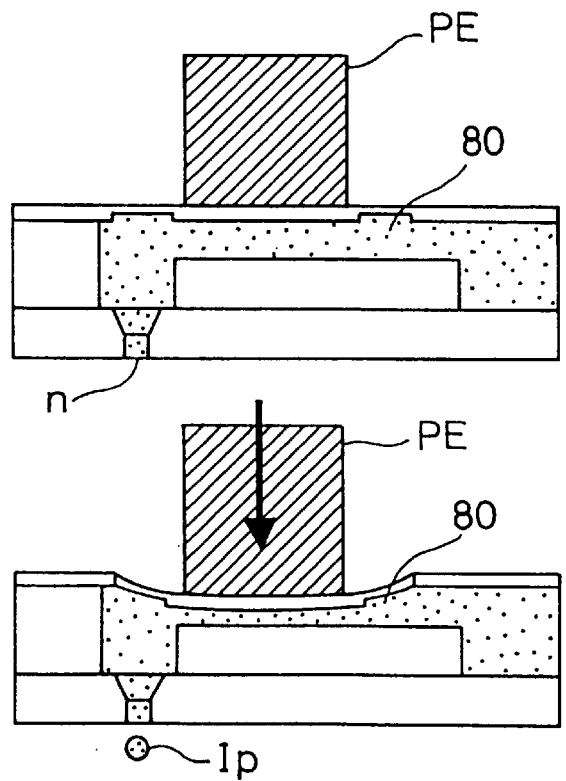
FIG. 4 shows the principle of ink jet.

An array of thirty-two nozzles "n" is formed in each of the ink discharge heads 61 through 64 as shown in FIG. 3. A piezoelectric element PE, which is one of electrically distorting elements and has an excellent response, is provided for each nozzle "n". FIG. 4 illustrates a configuration of the piezoelectric element PE and the nozzle "n". The piezoelectric element PE is disposed at a position that comes into contact with an ink conduit 80 for leading ink to the nozzle "n". As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 80 as shown in the lower part of FIG. 4. The volume of the ink conduit 80 is reduced with an extension of the piezoelectric element PE, and a certain amount of ink corresponding to the reduced volume is sprayed as ink particles Ip from the ends of the nozzle "n" at a high speed. The ink particles Ip soak into the sheet of paper P set on the platen 26, so as to reproduce a print.

In the printer 22 of the embodiment having the hardware structure discussed above, the sheet feed motor 23 rotates the platen 26 and the other related rollers to feed the printing paper P. The carriage motor 24 drives and reciprocates the carriage 31, simultaneously with actuation of the piezoelectric elements PE on the respective ink discharge heads 61 through 64 of the print head 28. The printer 22 accordingly sprays the respective color inks and forms a multi-color image on the printing paper P. Concrete arrangements of the nozzles in the respective ink discharge heads 61 through 64 will be discussed later.

The mechanism for feeding the printing paper P includes a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for sidably supporting the carriage 31, a pulley 38, an endless drive belt 36 spanned between the carriage motor 24 and the pulley 38, and a position sensor 39 for detecting the position of the origin of the carriage 31.

The control circuit 40 includes a CPU (not shown), main memories having a ROM and a RAM (not shown), and a programmable ROM (PROM) 42, which is a rewritable non-volatile memory. The PROM 42 stores dot recording mode information including parameters with respect to a plurality of dot recording modes. The "dot recording mode" denotes the dot recording scheme defined by parameters such as the number of actually used nozzles N and the sub-scan feed amount L. In the specification hereof, the terms "recording scheme" and "recording mode" have substantially the same meanings. Concrete examples of the dot recording modes and their related parameters will be described later. Mode selection information is also stored in the PROM 42 to select a desired mode among the plurality of dot recording modes. For example, when the PROM 42 can store sixteen pieces of dot recording mode information, the mode selection information consists of four-bit data.

The dot recording mode information is read by the printer driver 96 from the PROM 42 when the printer driver 96 (FIG. 1) is installed at the startup of the computer 90. In more concrete terms, the printer driver 96 reads the dot recording mode information corresponding to a desired dot recording mode specified by the mode selection information from the PROM 42. The processes in the rasterizer 97 and the halftone module 99 as well as the main scans and sub-scans are carried out according to the dot recording mode information.

The PROM 42 may be any rewritable non-volatile memory and is, for example, an EEPROM or a flash memory. The dot recording mode information may be stored in a non-rewritable ROM, while it is preferable that the mode selection information is stored in the rewritable non-volatile memory. Plural sets of dot recording mode information may be stored in a storage device other than the PROM 42 or alternatively in the printer driver 96.

FIG. 5 shows an arrangement of ink jet nozzles in the ink discharge heads 61 through 64. The first head 61 has a nozzle array for jetting black ink. Similarly the second through the fourth heads 62 through 64 respectively have nozzle arrays for jetting cyan, magenta, and yellow inks. These four nozzle arrays have identical positions in the sub-scanning direction.

Each of the four nozzle arrays includes thirty-two nozzles arranged in a zigzag manner with a constant nozzle pitch k in the sub-scanning direction. The thirty-two nozzle n included in each nozzle array may be arranged in alignment, instead of in the zigzag manner. The zigzag arrangement as shown in FIG. 5(A), however, has the advantage of being able to set a smaller nozzle pitch k in the manufacturing process.

FIG. 5(B) shows an arrangement of a plurality of dots formed by one nozzle array. In this embodiment, driving signals are supplied to the piezoelectric elements PE (FIG. 4) of the respective nozzles in order to cause a plurality of dots formed by one nozzle array to be arranged substantially in alignment in the sub-scanning direction, regardless of the arrangement of the ink nozzles; that is, whether the nozzles are arranged in zigzag or in alignment. By way of example, it is assumed that the nozzles are arranged in zigzag as shown in FIG. 5(A) and that the head 61 is scanned rightward in the drawing to form dots. In this case, a group of preceding nozzles 100, 102, . . . receive driving signals at an earlier timing by d/v [second] than a group of following nozzles 101, 103 . . . Here, d [inch] denotes a pitch between the two nozzle groups in the head 61(See FIG. 5(A)), and v [inch/second] denotes the scanning speed of the head 61. A plurality of dots formed by one nozzle array are accordingly arranged in alignment in the sub-scanning direction. As described later, all of the plural nozzles provided in each of the heads 61 through 64 are not always used, but only part of the nozzles may be used according to the dot recording scheme.

The nozzle array in each ink jet head shown in FIG. 5(A) corresponds to the dot forming element array of the present invention. The feeding mechanism of the carriage 31 including the carriage motor 24 shown in FIG. 2 corresponds to the main scan driving unit, and the feeding mechanism of the paper including the sheet feed motor 23 corresponds to the sub-scan driving unit. Moreover, a circuit including the piezoelectric element PE of each nozzle corresponds to the head driving of the present invention. The control circuit 40 and the printer driver 96 (FIG. 1) correspond to the control unit of the present invention.

B. Basic Conditions of Middle Area Recording Scheme

Before describing the dot recording schemes used in the embodiment of the present invention, the following describes basic conditions required for general recording schemes.

FIGS. 6(A) and 6(B) show basic conditions of a general dot recording scheme when the number of scan repeats s is equal to one. FIG. 6(A) illustrates an example of sub-scan feeds with few nozzles, and FIG. 6(B) shows parameters of the dot recording scheme. In the drawing of FIG. 6(A), solid circles including numerals indicate the positions of the few nozzles in the sub-scanning direction after each sub-scan feed. The encircled numerals 0 through 3 denote the nozzle numbers. The few nozzles are shifted in the sub-scanning direction every time when one main scan is concluded. Actually, however, the sub-scan feed is executed by feeding a printing paper with the sheet feed motor 23 (FIG. 2).

As shown on the left-hand side of FIG. 6(A), the sub-scan feed amount L is fixed to four dots. On every sub-scan feed, the four nozzles are shifted by four dots in the sub-scanning direction. When the number of scan repeats s is equal to one, each nozzle can record all dots (pixels) on the raster line. The right-hand side of FIG. 6(A) shows the nozzle numbers of the nozzles which record dots on the respective raster lines. There are non-serviceable raster lines above or below those raster lines that are drawn by the broken lines, which extend rightward (in the main scanning direction) from a circle representing the position of the nozzle in the sub-scanning direction. Recording of dots is thus prohibited on these raster lines drawn by the broken lines. On the contrary, both the raster lines above and below a raster line that is drawn by the solid line extending in the main scanning direction are recordable with dots. The range in which all dots can be recorded is hereinafter referred to as the "effective record area" (or the "effective print area"). The range in which the nozzles scan but all the dots cannot be recorded are referred to as the "non-effective record area (or the non-effective print area)". All the area which is scanned with the nozzles (including both the effective record area and the non-effective record area) is referred to as the nozzle scan area.

Various parameters related to the dot recording scheme are shown in FIG. 6(B). The parameters of the dot recording scheme include the nozzle pitch k [dots], the number of used nozzles N, the number of scan repeats s, number of effective nozzles Neff, and the sub-scan feed amount L [dots].

In the example of FIGS. 6(A) and 6(B), the nozzle pitch k is 3 dots, and the number of used nozzles N is 4. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster line. In the case of FIGS. 6(A) and 6(B), the number of scan repeats s is 1. The number of effective nozzles Neff is obtained by dividing the number of used nozzles N by the number of scan repeats s. The number of effective nozzles Neff may be regarded as the net number of raster lines that can be fully recorded during a single main scan. The meaning of the number of effective nozzles Neff will be further discussed later.

The table of FIG. 6(B) shows the sub-scan feed amount L, its accumulated value ΣL, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 6(A)). For example, as shown in FIG. 6(A), a first sub-scan feed moves the nozzles in the sub-scanning direction by the sub-scan feed amount L (4 dots). The nozzle pitch k is 3 dots as mentioned above. The nozzle offset Fs after the first sub-scan feed is accordingly 1 (see FIG. 6(A)). Similarly, the position of the nozzles after the second sub-scan feed is ΣL(=8) dots away from the initial position so that the offset F is 2. The position of the nozzles after the third sub-scan feed is ΣL(=12) dots away from the initial position so that the offset F is 0. Since the third sub-scan feed brings the nozzle offset F back to zero, all dots of the raster lines within the effective record area can be serviced by repeating the cycle of 3 sub-scans.

As will be understood from the above example, when the nozzle position is apart from the initial position by an integral multiple of the nozzle pitch k, the offset F is zero. The offset F is given by (ΣL)%k, where ΣL is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the effective record area:

Condition c1: The number of sub-scan feeds in one feed cycle is equal to the nozzle pitch k.

Condition c2: The nozzle offsets F after the respective sub-scan feeds in one feed cycle assume different values in the range of 0 to (k−1).

Condition c3: Average sub-scan feed amount ($\Sigma L/k$) is equal to the number of used nozzles N. In other words, the accumulated value $\Sigma L$ of the sub-scan feed amount L for the whole feed cycle is equal to a product (N×k) of the number of used nozzles N and the nozzle pitch k.

The above conditions can be understood as follows. Since (k−1) raster lines are present between adjoining nozzles, the number of sub-scan feeds required in one feed cycle is equal to k so that the (k−1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition c1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k−1). The second condition c2 is accordingly required.

When the first and the second conditions c1 and c2 are satisfied, each of the N nozzles records k raster lines in one feed cycle. Namely N×k raster lines can be recorded in one feed cycle. When the third condition c3 is satisfied, the nozzle position after one feed cycle (that is, after the k sub-scan feeds) is away from the initial position by the N×k raster lines as shown in FIG. 6(A). Satisfying the above first through the third conditions c1 to c3 thus prevents skipping or overwriting of raster lines to be recorded in the range of N×k raster lines.

FIGS. 7(A) and 7(B) show the basic conditions of a general dot recording scheme when the number of scan repeats s is no less than 2. When the number of scan repeats s is 2 or greater, each raster line is recorded with s different nozzles. In the description hereinafter, the dot recording scheme adopted when the number of scan repeats s is not less than 2 is referred to as the "overlap scheme".

The dot recording scheme shown in FIGS. 7(A) and 7(B) amounts to that obtained by changing the number of scan repeats s and the sub-scan feed amount L among the dot recording scheme parameters shown in FIG. 6(B). As will be understood from FIG. 7(A), the sub-scan feed amount L in the dot recording scheme of FIGS. 7(A) and 7(B) is a constant value of two dots. In FIG. 7(A), the nozzle positions after the odd-numbered sub-scan feeds are indicated by the diamonds. As shown on the right-hand side of FIG. 7(A), the dot positions recorded after the odd-numbered sub-scan feed are shifted by one dot in the main scanning direction from the dot positions recorded after the even-numbered sub-scan feed. This means that the plurality of dots on each raster line are recorded intermittently by each of two different nozzles. For example, the upper-most raster in the effective record area is intermittently recorded on every other dot by the No. 2 nozzle after the first sub-scan feed and then intermittently recorded on every other dot by the No. 0 nozzle after the fourth sub-scan feed. In the overlap scheme, each nozzle is generally driven at an intermittent timing so that recording is prohibited for (s−1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 7(A). In one possible scheme, dot recording is executed at the positions indicated by the circles shown in the right-hand side of FIG. 7(A) after the first sub-scan feed, and is executed at the shifted positions indicated by the diamonds after the fourth sub-scan feed.

The lower-most row of the table of FIG. 7(B) shows the values of the offset F after each sub-scan feed in one feed cycle. One feed cycle includes six sub-scan feeds. The offsets F after each of the six sub-scan feeds assume every value between 0 and 2, twice. The variation in the offset F after the first through the third sub-scan feeds is identical with that after the fourth through the sixth sub-scan feeds. As shown on the left-hand side of FIG. 7(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is an integer of not less than 2, the first through the third conditions c1 to c3 discussed above are rewritten into the following conditions c1' through c3':

Condition c1': The number of sub-scan feeds in one feed cycle is equal to a product (k×s) of the nozzle pitch k and the number of scan repeats s.

Condition c2': The nozzle offsets F after the respective sub-scan feeds in one feed cycle assume every value between 0 to (k−1), s times.

Condition c3': Average sub-scan feed amount $\{\Sigma L/(k \times s)\}$ is equal to the number of effective nozzles Neff (=N/s). In other words, the accumulated value $\Sigma L$ of the sub-scan feed amount L for the whole feed cycle is equal to a product {Neff×(k×s)} of the number of effective nozzles Neff and the number of sub-scan feeds (k×s).

The above conditions c1' through c3' hold even when the number of scan repeats s is one. This means that the conditions c1' through c3' generally hold for the dot recording scheme irrespective of the number of scan repeats s. When these three conditions c1' through c3' are satisfied, there is no skipping or overwriting of dots recorded in the effective record area. If the overlap scheme is applied (if the number of scan repeats s is not less than 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions c1' through c3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neff). The number of effective nozzles Neff in this embodiment corresponds to the number of effective dot forming elements in the present invention.

C. Principles of Dot recording scheme in the Embodiment

FIGS. 8(A) and 8(B) show the principle of the dot recording scheme when the nozzle pitch k is equal to 4. FIG. 8(A) shows fundamental parameters of the dot recording scheme for k=4 in the embodiment, and FIG. 8(B) shows the positions of the nozzle array after each sub-scan feed. In the drawing of FIG. 8(B), the figures, such as circles and rhombuses, represent the positions of the nozzles and the black dots represent the dot positions where the nozzles are not present.

The upper half of FIG. 8(B) shows the actual nozzle positions, where the offset F of the sub-scan feed amount is plotted as ordinate and the number of sub-scan feeds as abscissa. The offset F of the sub-scan feed amount is repeated in the sequence of 0, 2, 1, and 3. A difference $\Delta F$ in offset F is repeated in the sequence of 2, 3, 2, and 1. The difference $\Delta F$ in offset F' here is defined as an integer which is to be added to the offset after an (i−1)-th sub-scan to obtain the offset F after an i-th sub-scan and which is in a range of 1 to (i−1). In other words, the difference $\Delta F$ in offset F is an increment of the offset F. The difference $\Delta F$ is equal to a remainder (L%k) obtained by dividing the sub-scan feed amount L by the nozzle pitch k.

The lower half of FIG. 8(B) shows the positions of a virtual nozzle array which are formed by combining the positions of the nozzle array in successive two scans. For example, combination of the positions of the nozzle array after the 0th and 1st sub-scans gives a virtual nozzle array whose nozzle pitch n is equal to 2 dots. In a similar manner, combination of the positions of the nozzle array after the 2nd and the 3rd sub-scans gives a virtual nozzle array whose nozzle pitch n is equal to 2 dots. It can be thought that this dot recording scheme uses such a virtual nozzle array.

In this specification, the nozzle pitch n of the virtual nozzle array is referred to as the "virtual nozzle pitch n". A set of main scans constituting the virtual nozzle array and the subsequent sub-scans after the respective main scans are collectively referred to as "one scan set". The number of main scans included in one scan set is referred to as "the number of scans in one scan set". In the example of FIG. 8(B), for example, the 0th and 1st main scans and the 1st and the 2nd sub-scans constitute one scan set. A set of sub-scan feeds in one scan set is referred to as the "sub-scan feed set". Although no concrete values of the sub-scan feed amount are shown in FIG. 8(A), it can be understood that first and second sub-scan feed sets are alternately used where the combination of the offset difference $\Delta F$ in the first sub-scan feed set is (2,3) and the combination of the offset difference $\Delta F$ in a second sub-scan feed set is (2,1).

Since the virtual nozzle array shown in FIG. 8(B) has the virtual nozzle pitch n of 2, all the raster lines can be recorded without any dropout or overlap if ansub-scan feed amount Lps for the virtual nozzle array is fixed to one dot. The sub-scan feed amount Lps for the virtual nozzle array is not restricted to 1 dot, but may be set equal to any value that allows a remainder obtained by dividing the amount Lps by the virtual nozzle pitch n to be equal to one. This enables all the raster lines to be recorded without any dropout or overlap.

FIGS. 9(A) and 9(B) show the principles of two dot recording schemes when the nozzle pitch k is equal to 6. In a first dot recording scheme shown in FIG. 9(A), the number of scans in one scan set is equal to 2 and the virtual nozzle pitch n is equal to 3 dots. In the first dot recording scheme of FIG. 9(A), combination of the nozzle positions in two scans gives a virtual nozzle array whose virtual nozzle pitch n is equal to 3 dots. In a second dot recording scheme shown in FIG. 9(B), the number of scans in one scan set is equal to 3 dots and the virtual nozzle pitch n is equal to 2 dots. In the seond dot recording scheme of FIG. 9(B), combination of the nozzle positions in three scans gives a virtual nozzle array whose virtual nozzle pitch n is equal to 2 dots.

Figure 10:
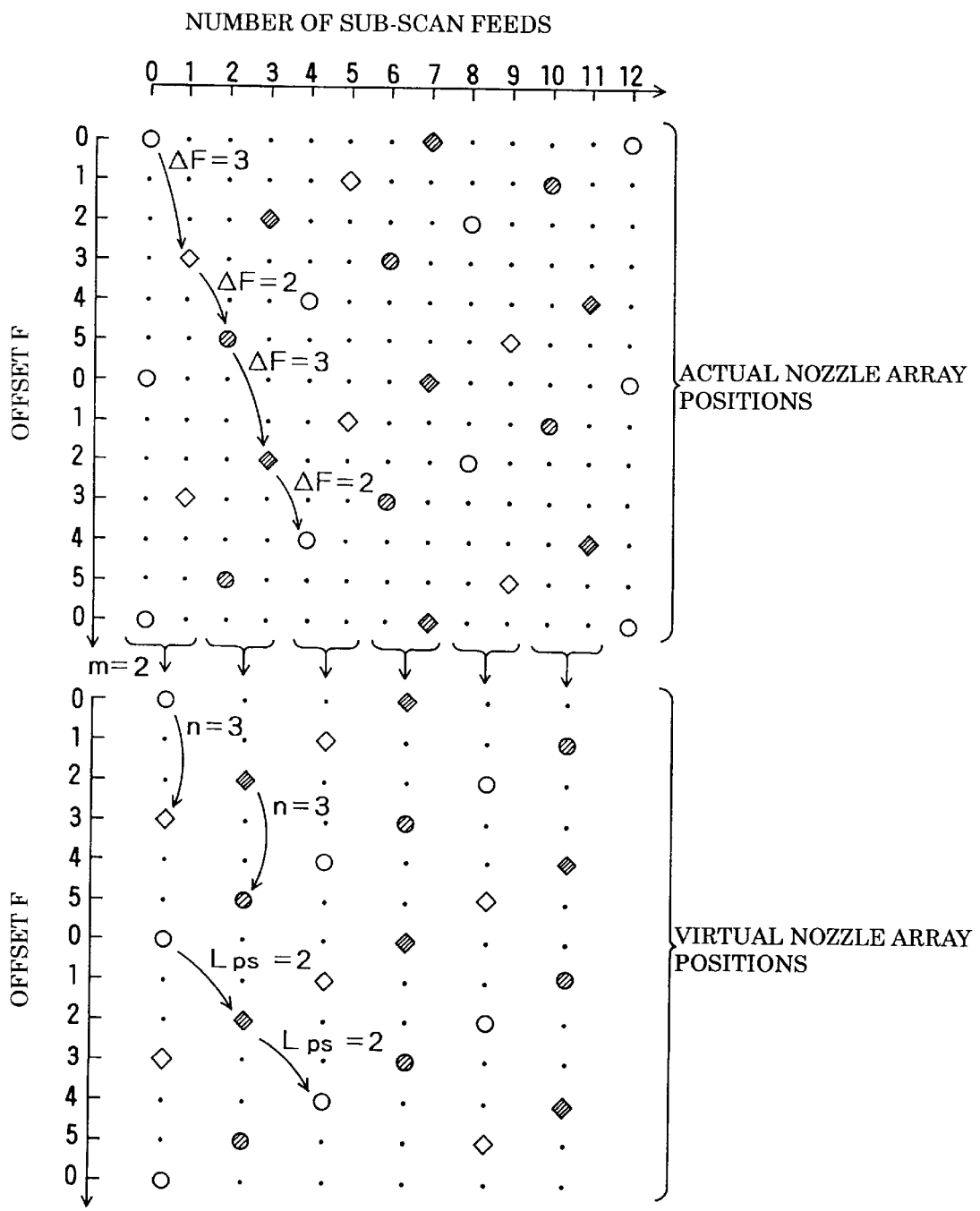
FIG. 10 shows the positions of a nozzle array in the first dot recording scheme for k=6.

FIG. 10 shows the positions of the nozzle array after each sub-scan feed in the first dot recording scheme. As shown in the upper half of FIG. 9, the combination (3,2) is repeated for the difference $\Delta F$ in offset F of the sub-scan feed amount. Namely the difference $\Delta F$ in offset F in one sub-scan feed set has the combination (3,2). The lower half of FIG. 10 shows the positions of a virtual nozzle array which are formed by combining the positions of the nozzle array in successive two scans. The virtual nozzle pitch n of this virtual nozzle array is equal to 3 dots.

Since the virtual nozzle pitch n is equal to 3 in the virtual nozzle array shown in FIG. 10, all the raster lines can be recorded without any dropout or overlap if the sub-scan feed amount Lps for the virtual nozzle array is fixed to 2 dots. As far as the sub-scan feed amount Lps for the virtual nozzle array is set at a value that allows the remainder obtained by dividing the amount Lps by the virtual nozzle pitch n to be equal to 2, all the raster lines can be recorded without any dropout or overlap.

Figure 11:
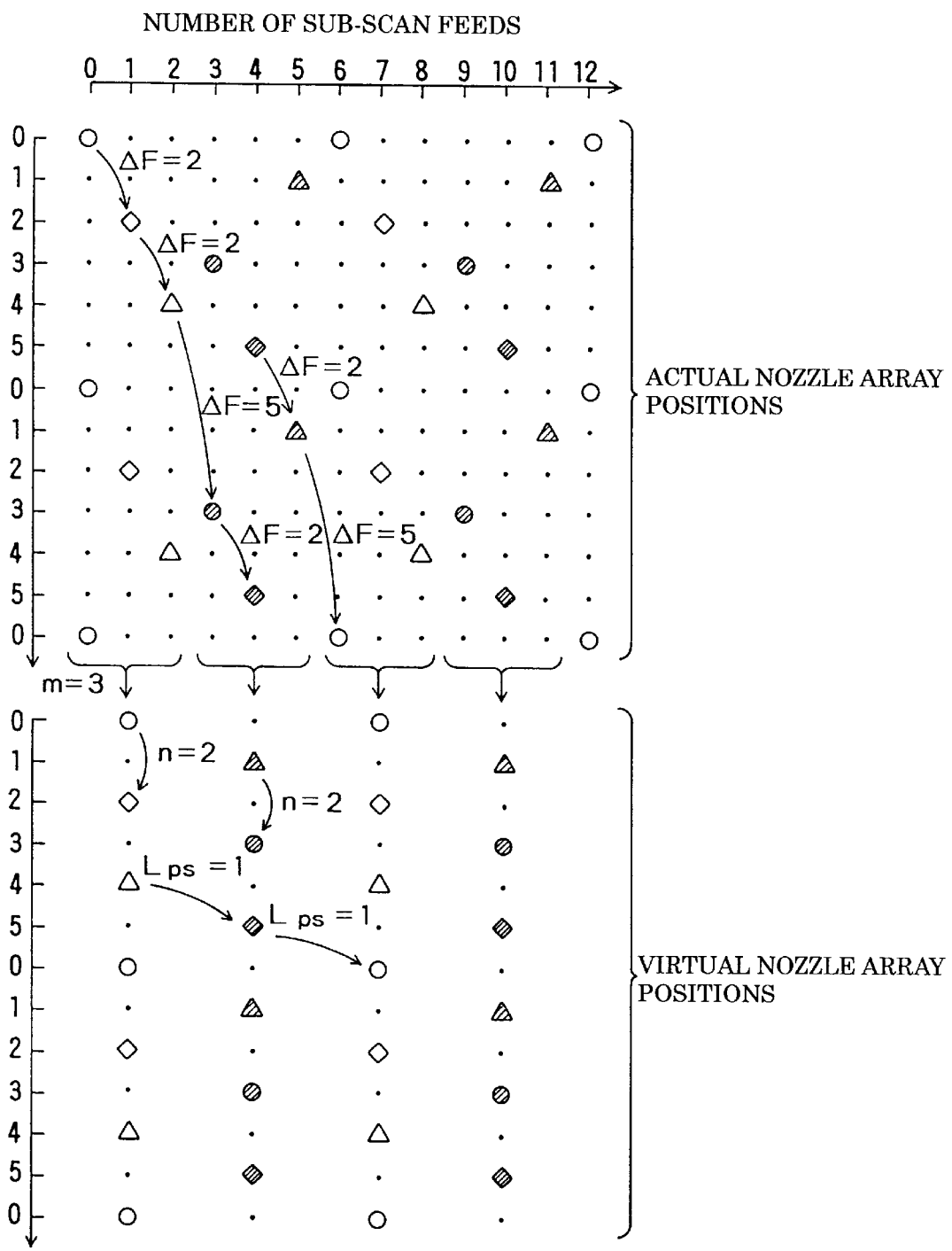
FIG. 11 shows the positions of a nozzle array in the second dot recording scheme for k=6.

FIG. 11 shows the positions of the nozzle array after each sub-scan feed in the second dot recording scheme shown in FIG. 9(B). As shown in the upper half of FIG. 11, the combination (2,2,5) is repeated for the difference $\Delta F$ in offset F of the sub-scan feed amount. Namely the difference $\Delta F$ in offset F in one sub-scan feed set has the combination (2,2,5). The lower half of FIG. 11 shows the positions of a virtual nozzle array which are formed by combining the positions of the nozzle array in successive three scans. The virtual nozzle pitch n of this virtual nozzle array is equal to 2 dots.

Since the virtual nozzle pitch n is equal to 2 in the virtual nozzle array shown in FIG. 11, all the raster lines can be recorded without any dropout or overlap if the sub-scan feed amount Lps in the virtual nozzle array is fixed to 1 dot. As far as the sub-scan feed amount Lps in the virtual nozzle array is set at a value that allows the remainder obtained by dividing the amount Lps by the virtual nozzle pitch n to be equal to 1, all the raster lines can be recorded without any dropout or overlap.

As shown in FIGS. 8(A) through 11, a virtual nozzle array having a virtual nozzle pitch n can be constructed by combining m scans. The nozzle pitch of the virtual nozzle array is not restricted to a constant value of n dots, but part of the nozzle pitch in the virtual nozzle array may be an integral multiple of n.

The number of nozzles Nps in the virtual nozzle array is determined in the following manner. When the number of used nozzles is fixed to N in each of the m scans constituting the virtual nozzle array, the number of nozzles Nps in the virtual nozzle array is equal to m×N. The number of used nozzles N may, however, be varied for one or plural main scans included in the m scans. In general, the number of virtual nozzles Nps is equal to a value $\Sigma Ni$ which is obtained by summing up the number of used nozzles Ni in an i-th scan (i is 1 to m) in one scan set.

Since the virtual nozzle array corresponds to m combinations of the actual nozzle array that is successively shifted by a fixed interval of n dots, the virtual nozzle pitch n is equal to the value k/m obtained by dividing the actual nozzle pitch k by the integer m. In other words, the actual nozzle pitch k is equal to the product m·n of the number of scans m in one scan set and the virtual nozzle pitch n. The virtual nozzle array cannot be constructed if the actual nozzle pitch k cannot be expressed as the product m·n of the two integers m and n. Namely the virtual nozzle array is constructed when the actual nozzle pitch k can be expressed as the product m·n of the two integers m and n (where m and n are no less than 2, respectively).

When the virtual nozzle array can be constructed, the scanning parameters are set for the virtual nozzle pitch n. This facilitates the setting of the scanning parameters. For example, when the actual nozzle pitch k is equal to 6 dots, it is difficult to set appropriate scanning parameters that attain high image quality. Construction of the virtual nozzle array having the virtual nozzle pitch n equal to 2 dots or 3 dots enables the appropriate scanning parameters to be set relatively easily.

The following relation is held between the actual nozzle pitch k, the sub-scan feed amount Li included in one set, the number of scans in one scan set, and the virtual nozzle pitch n. When the feed amounts of the m sub-scan feeds included in each sub-scan feed set are expressed as Li dots (where i=1 to m), the feed amounts Li (where i=1 to (m−1)) in first through (m−1)-th sub-scan feeds are set so that a remainder Li%k (that is, the difference ΔF in offset) obtained by dividing each feed amount Li by the nozzle pitch k is equal to the virtual nozzle pitch n. A feed amount Lm in the m-th sub-scan is set so that a remainder Lm%k obtained by dividing the feed amount Lm by the nozzle pitch k is an integer that is different from a value n·j that is j times the virtual nozzle pitch n (where j is an arbitrary integer). This arrangement establishes the dot recording scheme that enables all the raster lines in the effective recording area to be recorded without any dropout or overlap.

The following conditions c1" through c3" are held with respect to the virtual nozzle array, instead of the first through the third conditions c1' through c3' discussed above.

Condition c1": The number of virtual sub-scan feeds included in one cycle with respect to the virtual nozzle array is equal to the product (n×s) of the virtual nozzle pitch n and the number of scan repeats s. Namely the number of actual sub-scan feeds included in one cycle constituting the virtual nozzle array is equal to the product (m×n×s) of the number of scans m in one scan set, the virtual nozzle pitch n, and the number of scan repeats s. This is also equal to the product (k×s) of the actual nozzle pitch k and the number of scan repeats s.

Condition c2": The offset Fps of the virtual nozzle array after each virtual sub-scan feed included in one cycle assumes the values in the range of 0 to (n−1), and each value is repeated s times. The offset Fps of the virtual nozzle array is a remainder (ΣLps%n) obtained by dividing the summation ΣLps of the sub-scan feed amounts Lps by the virtual nozzle pitch n.

Condition c3": An average virtual sub-scan feed amount {ΣLps/(n×s)} is equal to the number of effective nozzles Npseff (=Nps/s) of the virtual nozzle array, where Nps denotes the number of nozzles in the virtual nozzle array. In other words, the summation ΣLps of the virtual sub-scan feed amounts Lps per one cycle is equal to the product {Npseff×(n×s)} of the number of effective nozzles Npseff in the virtual nozzle array and the number of virtual sub-scan feeds (n×s).

After the scanning of one cycle of the virtual nozzle array, the offset Fps of the virtual nozzle array is always returned to zero. The offset F of the actual nozzle array may, however, not be returned to zero but may be an integral multiple of the virtual nozzle pitch n.

The methods of constructing the virtual nozzle array shown in FIGS. 8(A) through 11 discussed above are only illustrative and may be modified in various ways. The following describes a variety of embodiments when the nozzle pitch k is equal to 4 or 6.

D. Embodiments and Control examples of Dot recording scheme for k=4

Figure 12:
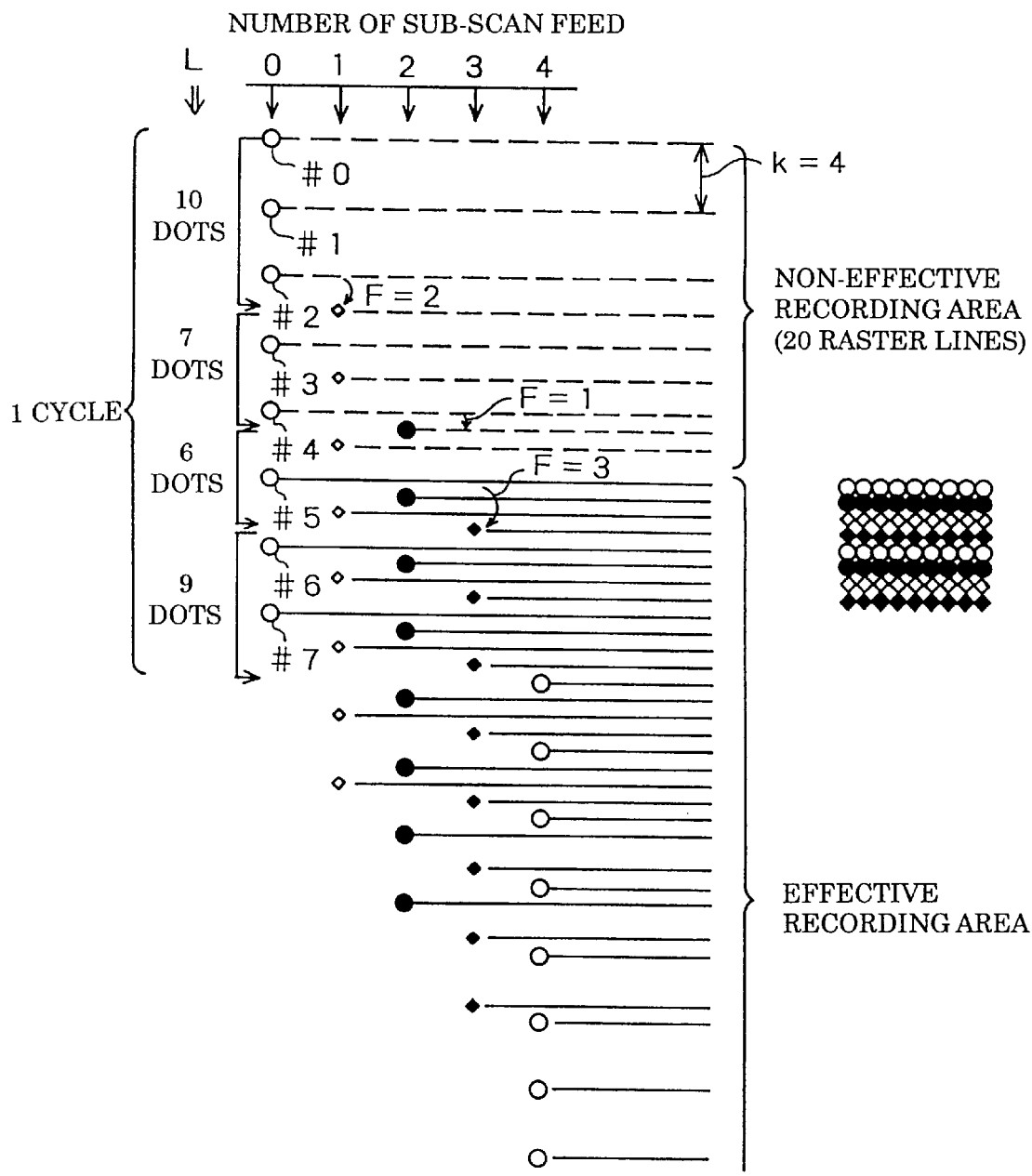
FIG. 12 shows a first embodiment of the dot recording scheme for k=4 according to the present invention.
Figure 43:
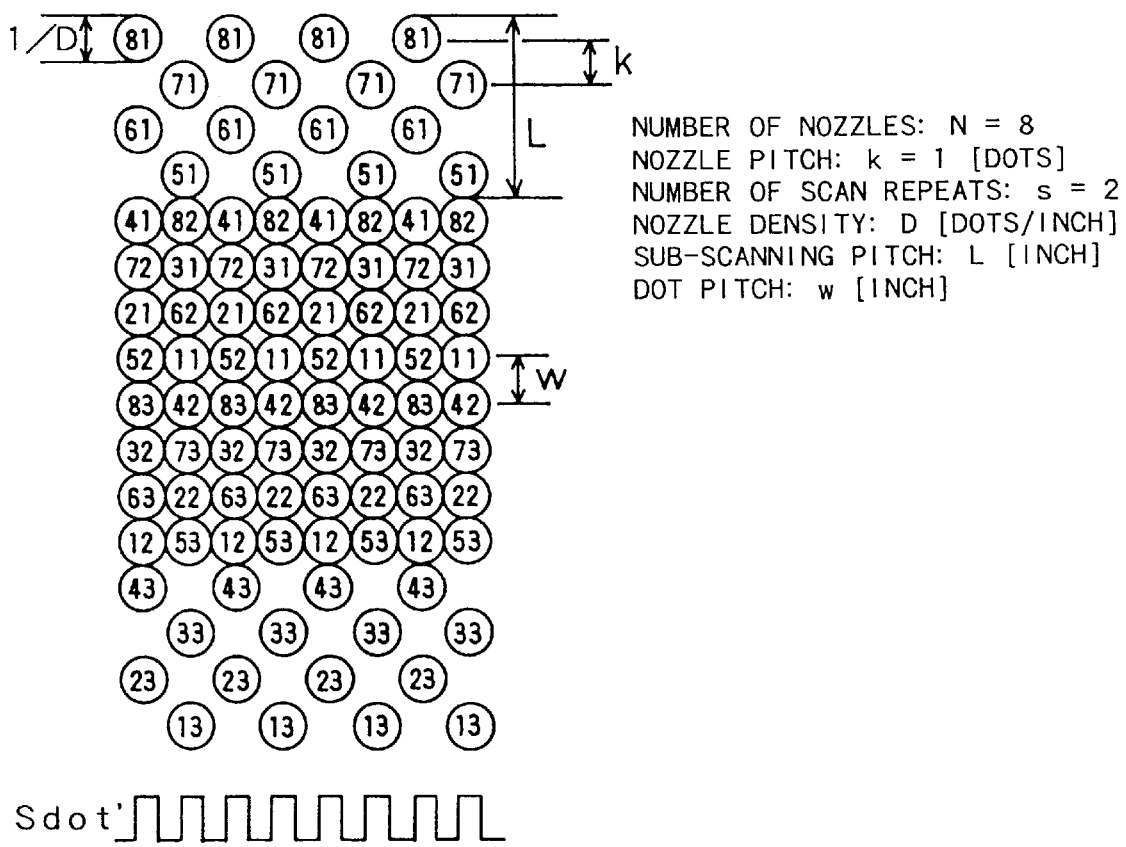
FIG. 43 shows an example of the conventional overlap recording scheme.

FIG. 12 shows a first embodiment of a dot recording scheme for k=4. The scanning parameters of this dot recording scheme are shown in the bottom of FIG. 12, where the nozzle pitch k is equal to 4 dots, the number of used nozzles N is equal to 8, the number of scan repeats s is equal to 1, and the number of effective nozzles Neff is equal to 8.

In the example of FIG. 12, nozzle numbers #0 through #7 are allocated to the eight used nozzles from the top. In the first embodiment of the dot recording scheme for k=4, four sub-scan feeds constitute one cycle, and the amount of the sub-scan feed L is varied in the sequence of 10, 7, 6, and 9 dots. This means that a plurality of different values are used for the sub-scan feed amount L. The positions of the eight nozzles in the respective sub-scan feeds are shown by four different figures. The right-hand side of FIG. 12 shows by which nozzle and after which sub-scan feed the dots on the raster lines in the effective record area are to be recorded.

FIGS. 13(A) and 13(B) shows the scanning parameters and the raster numbers of the effective raster lines recorded by the respective nozzles in the first embodiment for k=4. The parameters with respect to the virtual nozzle array include: the number of scans in one scan equal to 2, the virtual nozzle pitch n equal to 2 dots, and the number of nozzles Nps in the virtual nozzle array equal to 16. Two different sets of sub-scan feeds, which have he combinations of the feed amounts (10,7) and (6,9), respectively, are repeatedly used. The table of FIG. 13(A) shows the sub-scan feed amount L and its summation ΣL for each sub-scan feed, the nozzle offset Fs after each sub-scan feed, and the difference ΔF in offset F. The difference ΔF in offset is equal to the remainder obtained by dividing the sub-scan feed amount L by the nozzle pitch k.

The offset F and its difference ΔF shown in FIGS. 13(A) are identical with those shown in FIG. 8(A). It is accordingly considered that the first embodiment for k=4 shown in FIG. 13 carries out the recording with the virtual nozzle array having the virtual nozzle pitch n equal to 2 dots. The virtual sub-scan feed amount Lps is equal to 17 dots for the virtual nozzle array which is constructed by the first sub-scan feed set having the combination (10,7) of sub-scan feed amounts, and the amount of virtual sub-scan feed Lps is equal to 15 dots for the virtual nozzle array which is constructed by the second sub-scan feed set having the combination (6,9) of sub-scan feed amounts. The remainder (Lps%n) in both the first and second sets is equal to one, which is obtained by dividing the amount of virtual sub-scan feed Lps (=17,15) by the virtual nozzle pitch n(=2). This clearly shows that the recording scheme of FIGS. 13(A) and 13(B) is equivalent to that shown in FIGS. 8(A) and 8(B).

The parameters shown in FIG. 13(A) satisfy the three conditions c1" through c3" with respect to the virtual nozzle array. The number of virtual sub-scan feeds (=2) in one cycle with respect to the virtual nozzle array is equal to the product (n×s) of the virtual nozzle pitch n(=2) and the number of scan repeats s(=1) (the first condition c1'). The offset Fps of the virtual nozzle array after each virtual sub-scan feed included in one cycle assume the values in the range of 0 to (n−1), and each value is repeated s times (the second condition c2"). The average virtual sub-scan feed amount {Lps/(n×s)}=16 is equal to the number of effective nozzles Npseff (=Nps/s) in the virtual nozzle array (the third condition c3").

The parameters shown in FIG. 13(A) also satisfy the conditions c1' through c3' with respect to the actual nozzle array. The number of sub-scan feeds in one cycle is equal to the product (k×s=4) of the nozzle pitch k(=4) and the number of scan repeats s(=1) (the first condition c1'). The nozzle offset F after each sub-scan feed in one cycle assume the values in the range of 0 to (k−1) (i.e., in the range of 0 to 3) (the second condition c2'). The average sub-scan feed amount (ΣL/k) is equal to the number of effective nozzles Neff(=8) (the third condition c3'). The first embodiment of the dot recording scheme for k=4 accordingly satisfies the fundamental requirement; that is, there is no dropout or overlap of recorded raster lines in the effective recording area.

The first embodiment of the dot recording scheme for k=4 also has the following two features. The first feature for k=4 is that the nozzle pitch k and the number of used nozzles N are integers which are no less than 2 and which are not relatively prime. The second feature is that a plurality of different values are used for the sub-scan feed amount L. As discussed previously in the prior art, the number of nozzles N and the nozzle pitch k are sets at integers that are relatively prime in the conventional dot recording scheme The number of nozzles N actually used among a large number of nozzles provided is thus restricted to the value that is prime to the nozzle pitch k. In other words, the problem of the conventional scheme is that the nozzles are not effectively used in many cases. Application of the dot recording scheme having the first feature that the nozzle pitch k and the number of used nozzles N are integers which are no less than 2 and which are not relatively prime, on the other hand, advantageously increases the number of used nozzles as many as possible. The above second feature is aimed to satisfy the fundamental requirement that there is no dropout or overlap of recorded raster lines in the effective recording area when the dot recording scheme has the first feature. There will be dropout or overlap of raster lines if the dot recording scheme that has the first feature and a fixed sub-scan feed amount L is applied.

The first embodiment of the dot recording scheme for k=4 further has a third feature that the differences ΔF in offset F with respect to the summation of the sub-scan feed amount include a value of 2 dots. The advantage of this feature will be discussed later.

FIG. 13(B) shows the raster numbers of the effective raster lines recorded by the respective nozzles in the main scan after each sub-scan feed in the first embodiment of the dot recording scheme for k=4. The left-hand side of FIG. 13(B) shows the nozzle numbers #0 through #7. The values on the right-hand side of the nozzle numbers represent which raster lines in the effective recording area are recorded by the respective nozzles after the 0th to 7th sub-scan feeds. By way of example, in the main scan after the 0th sub-scan feed (that is, in the first main scan for recording the effective recording area), the nozzles #5 through #7 record the 1st, 5th, and 9th effective raster lines. In the main scan after the 1st sub-scan feed, the nozzles #3 through #7 record the 3rd, 7th, 11th, 15th, and 19th effective raster lines. The term "effective raster lines" here denotes the raster lines in the effective recording area.

In FIG. 13(B), the difference between any successive raster numbers of the effective raster lines recorded by one main scan is equal to the nozzle pitch k(=4). One cycle of scanning accordingly records N×k (that is, 32) raster lines. Since the nozzles are apart from each other by the nozzle pitch k, one cycle does not record 32 sequential raster lines as clearly understood from FIG. 12. FIG. 13(B) shows which nozzles are used to record the first 32 raster lines in the effective recording area.

In FIG. 13(B), the effective raster numbers expressed by the numerals in the brackets show that the raster lines at the positions having the equivalent scanning conditions have been recorded in the previous cycle. Namely the values obtained by subtracting 32 from the numerals in the brackets of FIG. 13(B) denotes the equivalent raster line. For example, the raster line of the effective raster number 36 recorded by the nozzle #0 is present at the position having the equivalent scanning conditions to those of the raster line of the effective raster number 4.

FIG. 14 shows the nozzle numbers for recording the effective raster lines in the first embodiment of the dot recording scheme for k=4. The numerals 1 through 31 on the left-end column of FIG. 14 show the effective raster numbers. The right-hand side of FIG. 14 shows the positions of the effective raster lines recorded by the eight nozzles #0 through #7 in the main scans after the respective sub-scan feeds. For example, in the main scan after the 0th sub-scan feed, the nozzles #5 through #7 record the 1st, 5th, and 9th effective raster lines. Comparison between FIG. 14 and FIG. 13(B) clearly shows the relationship between the effective raster lines and the nozzle numbers.

Four different symbols "·", "×", "↑", and "↓" in the second-left column of FIG. 14 show whether or not the adjoining raster lines have already been recorded before the recording of each raster line. The respective symbols have the following meaning:

↓: Only one raster line immediately below itself has already been recorded.

↑: Only one raster line immediately above itself has already been recorded.

×: Both raster lines above and below itself have already been recorded.

·: Neither of the raster lines above and below itself have been recorded.

The recording state of the adjoining raster lines above and below each raster line affects the image quality of the raster line being recorded. The effects on the image quality are ascribed to the dryness of ink on the adjoining raster lines that have already been recorded and the sub-scan feed error. The appearance of the pattern by the four different symbols at a relatively large cycle may deteriorate the image quality of the whole image. In the first embodiment of the dot recording scheme for k=4 shown in FIG. 14, however, the pattern by the four different symbols does not show any distinct periodicity. It is accordingly expected that the first dot recording scheme causes less deterioration of the image quality due to this reason but enables an image of relatively high image quality to be recorded.

The third-left column of FIG. 14 shows the value Δ representing how many sub-scan feeds have been executed at the maximum between recording of each raster line and recording of the adjoining raster line. The value Δ is hereinafter referred to as the "sub-scan feed number difference". By way of example, the second effective raster line is recorded by the nozzle #1 after the 2nd sub-scan feed, whereas the first raster line is recorded by the nozzle #5 after the 0th sub-scan feed and the third raster line is recorded by the nozzle #3 after the 1st sub-scan feed. The sub-scan feed number difference Δ is accordingly equal to 2 with respect to the second raster line. In a similar manner, the fourth raster line is recorded after three sub-scan feeds have been executed since the recording of the fifth raster line. The sub-scan feed number difference Δ is thus equal to 3 with respect to the fourth raster line.

It is ideal that the sub-scan feed is carried out strictly by the amount equal to an integral multiple of the dot pitch. In the actual state, however, the sub-scan feed has some feeding error. The sub-scan feed error is accumulated at every time of sub-scan feed. When a large number of sub-scan feeds are interposed between the recording of adjoining two raster lines, the accumulated sub-scan feed error may cause a positional misalignment of the adjoining two raster lines. As mentioned above, the sub-scan feed number difference Δ shown in FIG. 14 denotes the number of sub-scan feeds carried out between recording of the adjoining raster lines. The smaller sub-scan feed number difference Δ is preferable, in order to minimize the positional misalignment of the adjoining raster lines due to the accumulated sub-scan feed error. Especially when a relatively large accumulated error occurs at a large period, the positional misalignment tends to become conspicuous to the naked eyes. It is accordingly preferable that the occurrence of the large accumulated error does not have any distinct, large cycles.

FIGS. 15(A) and 15(B) show the scanning parameters and the raster numbers of the effective raster lines recorded by the respective nozzles in a first control example of the dot recording scheme for k=4. The first control example of the dot recording scheme for k=4 has the same nozzle pitch k, which is equal to 4 dots, as those of the above first embodiment of the dot recording scheme for k=4, but the different number of used nozzles N. In the first control example of the dot recording scheme, k=4 and N=7, which are relatively prime. The sub-scan feed amount L is fixed to 7 dots. The first control example satisfies all the three conditions c1' through c3' discussed above.

FIG. 16 shows the nozzle numbers for recording the effective raster lines in the first control example of the dot recording scheme for k=4. Unlike the first embodiment of the dot recording scheme for k=4 (FIG. 14), the pattern of the symbols @ representing the recording state of the adjoining raster lines above and below each raster line has a significantly distinct periodicity in the first control example of the dot recording scheme for k=4. The raster lines having the sub-scan feed number difference Δ equal to 3 appear rather periodically. Such periodicity is clearly understood from the comparison between the distribution of the nozzle numbers in the first control example for k=4 shown in FIG. 16 and the distribution of the nozzle numbers in the first embodiment for k=4 shown in FIG. 14. In the first control example for k=4, the occurrence of the relatively large accumulated error of sub-scan feed (that is, the position of Δ=3) has a rather distinct, large period. When such an image is observed with naked eyes, there is a possibility of recognizing the periodical structure of the accumulated sub-scan feed error as the noise. The first control example of the dot recording scheme for k=4 is accordingly thought to have poorer image quality, compared with the first embodiment of the dot recording scheme for k=4,.

The periodical structure of the accumulated sub-scan feed error is closely correlated with a variation in the nozzle offset F (see the tables of FIGS. 13(A) and 15(A)). This is ascribed to the reason discussed below. FIGS. 17(A) through 17(F) show the possible combinations of the offset F and its difference ΔF when the nozzle pitch k is equal to 4 dots and the number of scan repeats s is equal to one. According to the condition c1' described above, when the nozzle pitch k is equal to 4 dots, the scanning of one cycle includes four sub-scan feeds. According to the condition c2', the offset F of the summation ΣL of the sub-scan feed amount in one cycle assumes each value in the range of 0 to 3 dots once.

When the number of scan repeats s is equal to one, the nozzle offset F is not allowed to assume 0 but only allowed to assume the values in the range of 1 to 3 after the first through the third sub-scan feeds. Accordingly, when the nozzle pitch k is equal to 4 and the number of scan repeats s is equal to 1, the possible variations of the nozzle offset F and its difference ΔF are restricted to the six combinations shown in FIGS. 17(A)–17(F).

When the nozzle pitch k is equal to 4 dots, the value of the offset F (F=0 to 3) is substantially equivalent to the value (4−F) obtained by subtracting the value F from 4. The expression "substantially equivalent" means that the deviation from the reference position of the nozzle is the same but its direction is opposite. These values are substantially equivalent because the offset F is defined as the "deviation from the periodic reference positions of the nozzles" as described previously. Namely a deviation of F dots from one reference position of the nozzle denotes a deviation of (4−F) dots from another reference position. The nozzle offset F of 3 dots is thus substantially equivalent to the offset F of 1 dot. The same concept is applied for the difference ΔF in offset F. Namely the difference ΔF in offset F being equal to 3 dots is substantially equivalent to the difference ΔF in offset F being equal to 1 dot.

The variation of the offset F shown in FIG. 17(A) is identical with that in the first control example of the dot recording scheme for k=4 shown in FIGS. 15(A) and 16. In the combination of FIG. 17(A), the difference ΔF of the offset F in each sub-scan feed is equal to 3 dots. As discussed above, 3 dots are substantially equivalent to 1 dot as the value of the difference ΔF of the offset F. The nozzle offset F is thus virtually shifted to the negative side in the sub-scanning direction by one dot at every time of the sub-scan feed. The every one-dot variation in the nozzle offset F is understood from the distribution of the nozzle numbers shown in FIG. 16. When the difference ΔF in the nozzle offset F includes only a value of 3 dots, the relatively large accumulated error of sub-scan feed appears at a rather distinct, large period. This is not preferable from the viewpoint of the image quality.

The variation of the offset F shown in FIG. 17(B) is not preferable from the viewpoint of the image quality, since the difference ΔF in the nozzle offset F includes only a value of 1 dot. FIG. 18 shows the scan parameters in a second control example of the dot recording scheme for k=4 having the same variation of the offset F as that of FIG. 17(B). In the second control example for k=4, the number of used nozzles N is equal to 5 and the sub-scan feed amount L is fixed to 5 dots. As shown in the lower rows of the table of FIG. 18, the nozzle the offset F and its difference ΔF are equal to those shown in FIG. 17(B).

The variation of the offset F shown in FIG. 17(C) is identical with that in the first embodiment of the dot recording scheme for k=4 discussed above (see FIG. 13(A)). The variation of the offset shown in FIG. 17(C) is different from the first and second control examples for k=4 described above, since the difference ΔF in the nozzle offset F takes a value of 2 dots. When the difference ΔF in the nozzle offset F takes a value of 2 dots, the distribution of the nozzle numbers does not have any distinct periodicity as clearly understood from FIG. 14. This means that the occurrence of the relatively large accumulated sub-scan feed error does not have any distinct periodicity. This arrangement is accordingly expected to attain high image quality.

The difference between the first embodiment and the first control example for k=4 can be seen as follows. In the first embodiment for k=4 shown in FIG. 14, adjoining two raster lines are recorded by successive two main scans. In the first control example for k=4 shown in FIG. 16, on the other hand, adjoining three or four raster lines are recorded by successive three or four main scans. Since the greater number of the raster lines that are successively recorded increases the period of the boundaries between the sets of these adjoining raster lines, the boundaries are often observed as the noise in the image. The smaller number of the raster lines that are successively recorded, on the other hand, decreases the period of the boundaries between the sets of these adjoining raster lines, and these boundaries are inconspicuous to the naked eyes.

The fact that the difference ΔF in the nozzle offset F takes a value of 2 dots is equivalent to that the remainder (L%k) obtained by dividing the sub-scan feed amount L by the nozzle pitch k(=4) takes a value of 2. This is understood from the fact that, in the example of FIG. 13(A), the difference ΔF in the nozzle offset F is equal to 2 dots in the first and third sub-scan feeds and the subs-can feed amounts L at these sub-scan feeds are equal to 10 dots and 6 dots, respectively.

The first embodiment of the dot recording scheme for k=4 is preferable to the first control example of the dot recording scheme for k=4 also from the viewpoint of the recording speed. This is because the first embodiment of the dot recording scheme for k=4 uses eight nozzles and records eight raster lines simultaneously, whereas the first control example of the dot recording scheme for k=4 uses seven nozzles and records seven raster lines simultaneously.

In the dot recording schemes of FIGS. 17(C) through 17(F), the sub-scan feed whose difference ΔF in offset F is equal to 2 is carried out at every other feed. In this case, combination of the nozzle positions in the two main scans before and after the sub-scan feed whose difference ΔF is equal to 2 constructs a virtual nozzle array whose virtual nozzle pitch n is equal to 1 dot. For example, in the dot recording schemes of FIGS. 17(C) and 17(E), the two main scans before and after the first sub-scan feed construct one set of virtual nozzle array. The two main scans before and after the third sub-scan feed construct another set of virtual nozzle array. In a similar manner, in the dot recording schemes of FIGS. 17(D) and 17(F), the two main scans before and after the second sub-scan feed construct one set of virtual nozzle array. The two main scans before and after the fourth sub-scan feed construct another set of virtual nozzle array. These dot recording schemes can thus be regarded as the embodiments of the present invention.

FIGS. 19(A) and 19(B) show the scanning parameters and the raster numbers of the effective raster lines recorded by the respective nozzles in a second embodiment of the dot recording scheme for k=4 according to the present invention. FIGS. 19(A) and 19(B) correspond to FIGS. 13(A) and 13(B) in the first embodiment of the dot recording scheme for k=4 discussed above. Since the first and second embodiments of the dot recording schemes for k=4 have the same nozzle pitch k, they can record images at an identical resolution [dpi]. Moreover, since the first and second embodiments have the same number of effective nozzles Neff, they can record images at an identical recording speed. The difference between the first and second embodiments of the dot recording scheme for k=4 is only the sequence of the sub-scan feed amounts L. In the first embodiment of the dot recording scheme for k=4, the sub-scan feed amount L is varied in the sequence of 10, 7, 6, and 9 dots. In the second embodiment of the dot recording scheme for k=4, on the other hand, the sub-scan feed amount is varied in the sequence of 7, 6, 9, and 10 dots. The variation in the nozzle offset F in the second embodiment for k=4 corresponds to those shown in FIG. 17(D).

Like the first embodiment of the dot recording scheme for k=4, the second embodiment of the dot recording scheme for k=4 has the first feature that the nozzle pitch k and the number of used nozzles N are integers which are no less than 2 and which are not relatively prime, and the second feature that a plurality of different values are used for the sub-scan feed amount L. The second embodiment of the dot recording scheme for k=4 also has the third feature that the difference ΔF in offset F for the summation of the sub-scan feed amounts takes the value of 2 dots.

FIG. 20 shows the nozzle numbers for recording the effective raster lines in the second embodiment of the dot recording scheme for k=4. FIG. 20 corresponds to FIG. 14 in the first embodiment of the dot recording scheme for k=4. Like the first embodiment of the dot recording scheme for k=4 shown in FIG. 14, in the second embodiment of the dot recording scheme for k=4, the pattern of the symbols @ representing the recording state of adjoining raster lines above and below each raster line does not show any distinct, large periodicity, nor does the sub-scan feed number difference A. It is accordingly expected that relatively high quality images can be recorded by the second embodiment.

FIGS. 21(A) and 21(B) show the scanning parameters in third and fourth embodiments of the dot recording scheme for k=4. The difference of the third and the fourth embodiments for k=4 from those of the first and second embodiments for k=4 discussed above is only the sequence of the sub-scan feed amounts L. The variations of the nozzle offset F in the third and fourth embodiments for k=4 correspond to those shown in FIGS. 17(E) and 17(F), respectively.

As described above, all the dot recording schemes of the first through fourth embodiments for k=4 have the first feature that the nozzle pitch k and the number of used nozzles N are integers which are no less than 2 and which are not relatively prime, the second feature that a plurality of different values are used for the sub-scan feed amounts L, and the third feature that the difference ΔF in offset F for the summation of the sub-scan feed amounts takes the value of 2 dots. These dot recording schemes accordingly attain high image quality.

As clearly understood from these examples, there may be a large number of equivalent dot recording schemes having the three features discussed above while they are different only in the sequence of the sub-scan feed amounts L. When there are a plurality of equivalent dot recording schemes having different sequences of the sub-scan feed amounts L and identical resolution and recording speed, the dot recording scheme attaining the highest image quality depends upon the individual printers. This is because the image quality of the image recorded by each printer depends upon a combination of an error due to the manufacture of the printer (for example, the nozzle pitch error and the sub-scan feed error) and the scanning method (mainly the sub-scan feed amounts) in the dot recording scheme. When there are a number of alternative dot recording schemes having the different sequence of the sub-scan feed amounts, like the dot recording schemes of the first through fourth embodiments for k=4, it is preferable to select the dot recording scheme which attains the highest image quality for each individual printer. When the desirable dot recording scheme is selected for each printer, the mode selection information indicating the desirable dot recording scheme is written into the PROM 42 (see FIG. 2).

FIGS. 22(A) through 22(D) show the scanning parameters in fifth through eighth embodiments of the dot recording scheme for k=4. In the fifth through eighth embodiments of the dot recording scheme for k=4, the numbers of used nozzles N in the first through the fourth embodiments of the dot recording scheme for k=4 are doubled respectively, and the number of scan repeats s is set at 2. The number of effective nozzles Neff in the fifth through eighth embodiments of the dot recording scheme for k=4 are equal to 8, which is identical with the value in the first through fourth embodiments of the dot recording scheme for k=4. The repetition patterns of the sub-scan feed amounts L in the fifth through eighth embodiments for k=4 are respectively identical with those in the first through fourth embodiments for k=4. Since the number of scan repeats s is equal to 2, the cycle of the sub-scan feed amounts L in the first through the fourth embodiments of the dot recording scheme for k=4 are respectively repeated twice in the fifth through eighth embodiments of the dot recording scheme for k=4.

Since the nozzle pitch k in the fifth through eighth embodiments of the dot recording scheme for k=4 is the same with that in the first through fourth embodiments of the dot recording scheme, they can record images at an identical resolution. The fifth through eighth embodiments of the dot recording scheme for k=4 also have the first through third features discussed above, thereby attaining high image quality. The fifth through eighth embodiments of the dot recording scheme for k=4 has another feature that the dots on each raster line are recorded not with one identical nozzle but with a plurality of different nozzles. Accordingly, even when the characteristics of the nozzles (for example, the pitch and the jetting characteristics) have some variation, the characteristics of a specific nozzle is effectively prevented from affecting the whole raster line, thereby improving the image quality.

In the fifth through eighth embodiments of the dot recording scheme for k=4, the number of effective nozzles Neff is equal to 8, which is the same as the value in the first through fourth embodiments. These eight dot recording schemes accordingly have an identical recording speed. Since the dots are recorded intermittently in the fifth through eighth embodiments of the dot recording scheme for k=4, as described previously with FIG. 7(A), additional processing time is required for the printer driver 96 to generate the driving signals for the intermittent operations. When the speed of generating the driving signals is the rate-determining factor in the process of image recording, the first through fourth embodiments of the dot recording scheme for k=4 have higher actual recording speed than that of the fifth through eighth embodiments of the dot recording scheme for k=4.

As described above in the embodiments, when the nozzle pitch k is equal to 4 dots, the sub-scan feed amounts L are set so that a combination of nozzle positions in successive two scans constructs a virtual nozzle array. This arrangement facilitates setting of the dot recording scheme that attains high image quality. The execution of sub-scan feeds such that the difference ΔF in the nozzle offset F includes the value of 2 dots effectively prevents the occurrence of the relatively large accumulated error of sub-scan feed from having a distinct, large period, and thereby enables high quality images to be recorded.

When there are a plurality of equivalent dot recording schemes having different sequences of sub-scan feed amounts L and identical resolution and recording speed, selection of the desirable dot recording scheme according to the state of each individual printer enables each printer to record high quality images.

E. Embodiments of Dot recording scheme for k=6

FIGS. 23(A) and 23(B) shows a first embodiment of the dot recording scheme for k=6. The scanning parameters of this dot recording scheme include the nozzle pitch k equal to 6 dots, the number of used nozzles N equal to 17 dots, the number of scan repeats s equal to 2, and the number of effective nozzles Neff equal to 8.5. The parameters with respect to the virtual nozzle array include the number of scans in one scan set equal to 2, the virtual nozzle pitch n equal to 3 dots, and the number of nozzles Nps in the virtual nozzle array equal to 34. One combination of the feed amounts (3,14) is repeatedly used for the sub-scan feed set.

The table of FIG. 23(A) shows the sub-scan feed amount L and its summation ΣL for each sub-scan feed, the nozzle offset F after each sub-scan feed, the difference ΔF in offset F, and the dot recording position. The numerals 0 and 1 in the row of "dot recording position" respectively indicate which of the even dot positions and the odd dot positions on each raster line are the target of recording.

The offset F and its difference ΔF shown in FIG. 23(A) are identical with those shown in FIG. 9(A) described before. Accordingly, the recording in the first embodiment for k=6 shown in FIGS. 23(A) and 23(B) can be thought to be carried out using a virtual nozzle array having the virtual nozzle pitch n of 3 dots. The virtual sub-scan feed amount Lps for the virtual nozzle array is equal to 17 dots (=3+14), and the remainder (Lps%n) obtained by dividing the feed amount Lps by the virtual nozzle pitch n(=3) is equal to 2.

The parameters shown in FIG. 23(A) satisfy all the three conditions c1" through c3" with respect to the virtual nozzle array and the conditions c1' through c3' with respect to the actual nozzle array, but the detailed discussion will be omitted here. The first embodiment of the dot recording scheme for k=6 thus satisfies the fundamental requirement that there is no dropout or overlap of the recorded raster lines in the effective recording area.

FIG. 23(B) shows the raster numbers of the effective raster lines recorded by the respective nozzles in the main scan after each sub-scan feed in the first embodiment of the dot recording scheme for k=6. The raster number without the quotation mark ' shows that the even dot positions are the target of recording in the scan. The raster number with the quotation mark ', on the other hand, shows that the odd dot positions are the target of recording in the scan.

FIG. 24 shows the nozzle numbers for recording the effective raster lines in the first embodiment of the dot recording scheme for k=6. The second left column of FIG. 24 shows the nozzle numbers for recording the even dot positions and the odd dot positions on each raster line. The third left column shows after which time of sub-scan feed the even dot positions and odd dot positions respectively become the target of recording. The numerals in brackets are sub-scan feed number differences. The "sub-scan feed number difference" denotes the maximum number of sub-scan feeds carried out between recording of each raster line and recording of the adjoining raster line. The four symbols "·", "×", "↑", and "↓" written in the fourth left column of FIG. 24 show whether or not the adjoining raster lines before and after each raster line have already been recorded before recording of each raster line. The right most column of FIG. 24 shows which of the even dot position and the odd dot position is recorded on each raster line by the main scan after each sub-scan feed.

As clearly understood from the right most column of FIG. 24, in the first embodiment for k=6, adjoining raster lines are not the target of recording in successive two main scans. If adjoining raster lines are recorded by successive two main scans, the ink spouted on the printing paper in the first main scan may not be completely dried up before additional ink is discharged on the adjoining raster line by the second main scan. This may possibly cause a blur of ink and thereby deteriorate image quality. Since adjoining raster lines are not recorded by successive two main scans in the first embodiment for k=6, such image quality deterioration is prevented and high image quality can be attained. Moreover, this dot recording scheme repeats the sub-scan feeds of 3 dots and 14 dots, and the control of the sub-scan feed is simple accordingly.

FIGS. 25(A) and 25(B) show a second embodiment of the dot recording scheme for k=6. The scanning parameters of this dot recording scheme are substantially similar to those of the first embodiment for k=6 shown in FIG. 23(A), except for the sub-scan feed set (9,8).

FIG. 26 shows the nozzle numbers for recording the effective raster lines in the second embodiment of the dot recording scheme for k=6. As clearly understood from the comparison with FIG. 24, like the first embodiment for k=6, adjoining raster lines are not recorded by successive two main scans in the second embodiment for k=6, and high image quality can be attained accordingly. Moreover, the sub-scan feeds of 9 dots and 8 dots are repeated, and therefore the control of the sub-scan feed is simple.

FIGS. 27(A) and 27(B) show a third embodiment of the dot recording scheme for k=6. The scanning parameters of this dot recording scheme include the nozzle pitch k equal to 6 dots, the number of used nozzles N equal to 20, the number of scan repeats s equal to 2, and the number of effective nozzles Neff equal to 10. The parameters with respect to the virtual nozzle array include the number of scans in one scan set equal to 2, the virtual nozzle pitch n equal to 3 dots, and the number of nozzles Nps in the virtual nozzle array equal to 40. One combination of the feed amounts (9,11) is repeatedly used for the sub-scan feed set.

FIG. 28 shows the nozzle numbers for recording the effective raster lines in the third embodiment of the dot recording scheme for k=6. In the third embodiment for k=6, adjoining raster lines may be recorded by successive two main scans. For example, the main scan after the 1st sub-scan feed records the 1st raster line, and the main scan after the 2nd sub-scan feed records the preceding 0th raster line. The main scan after the 3rd sub-scan feed records the 3rd raster line, and the main scan after the 4th sub-scan feed records the preceding 2nd raster line. Since the first embodiment and the second embodiment for k=6 discussed above do not record adjoining raster lines by successive two main scans, these dot recording scheme are preferable to the third embodiment of the dot recording scheme for k=6 from the viewpoint of the image quality.

Whether or not adjoining raster lines are recorded by successive two main scans depends upon the values of the difference ΔF in offset F as described below. As shown in the table of FIG. 27(A), the values of the difference ΔF in offset F show the repetition of 3 dots and 5 dots in the third embodiment for k=6. The sub-scan feed whose offset difference ΔF is equal to 3 constructs the virtual nozzle array by the combination of main scans before and after the sub-scan feed. The question here is about the sub-scan feed whose offset difference ΔF is equal to 5. The offset difference ΔF of 5 in a certain sub-scan feed means that the raster line recorded by the main scan before the certain sub-scan feed is 5 dots apart from the raster line recorded by the main scan after the certain sub-scan feed. Since the actual nozzle pitch k is equal to 6 dots, the 5-dot distance of one raster line from another raster line means an only 1-dot distance from still another raster line. If a sub-scan is carried out such that the offset difference ΔF is 5 dots, adjoining raster lines are recorded by the successive two main scans. If a sub-scan is carried out such that the offset difference ΔF is 1 dot, adjoining raster lines are also recorded by the successive two main scans. When the actual nozzle pitch k is equal to 6 dots, it is preferable that the offset difference ΔF takes a value other than 1 dot and 5 dots. In general, it is preferable that the offset difference ΔF takes a value other than 1 dot and (k−1) dots.

When a virtual nozzle array can be constructed, the sub-scan feed amounts are set so that the offset difference ΔF is equal to the virtual nozzle pitch n in the 1st through the (m−1)-th sub-scans among the m sub-cans constituting one sub-scan feed set. The difference ΔF does not accordingly become equal to 1 dot or (k−1) dots. The question here is the feed amount Lm in the m-th sub-scan included in one set. Setting a value other than 1 dot and (k−1) dots to the offset difference ΔF of the feed amount Lm (that is, the remainder Lm%k obtained by dividing the feed amount Lm by the nozzle pitch k) prevents adjoining raster lines from being recorded by successive two main scans. For example, in the case of k=6, it is preferable that the offset difference ΔF in the m-th sub-scan feed included in one set is equal to 2 dots or 4 dots. It can be seen in the first and second embodiments for k=6 shown in FIGS. 23 and 25 that the offset difference ΔF in the m-th (2nd) sub-scan feed included in one set actually has the preferable value of 2 dots.

FIGS. 29(A) and 29(B) show a fourth embodiment of the dot recording scheme for k=6. The scanning parameters of this dot recording scheme are substantially similar to those of the third embodiment for k=6 shown in FIGS. 27(A) and 27(B), except for the sub-scan feed amounts. In the fourth embodiment for k=6, the two different combinations of sub-scan feed amounts of (9,8) and (9,14) are used respectively as the first sub-scan feed set and the second sub-scan feed set. In both of the two sets of sub-scan feeds, the combination of the offset differences ΔF is (3,2). This means that adjoining raster lines are not recorded by successive two main scans. From this point of view, the fourth embodiment for k=6 is preferable to the third embodiment for k=6. The two different sets of sub-scan feeds are used in order to make the average sub-scan feed amount of the nozzle array equal to 10 dots (that is, to make the average feed amount of the virtual nozzle array equal to 20 dots) (conditions c3' and c3").

FIG. 30 shows the nozzle numbers for recording the effective raster lines in a fourth embodiment of the dot recording scheme for k=6. From this table, it is confirmed that adjoining raster lines are not the target of recording in successive two main scans.

FIGS. 31(A) and 31(B) show a fifth embodiment of the dot recording scheme for k=6. The scanning parameters of this dot recording scheme include the nozzle pitch k equal to 6 dots, the number of used nozzles N equal to 18, the number of scan repeats s equal to 2, and the number of effective nozzles Neff equal to 9. The parameters with respect to the virtual nozzle array include the number of scans in one scan set equal to 2, the virtual nozzle pitch n equal to 3 dots, and the number of nozzles Nps in the virtual nozzle array equal to 36. Two different combinations of the feed amounts of (9,8) and (9,11) are used as the two sets of sub-scan feeds.

The first sub-scan feed set having the feed amounts of (9,8) has the combination of the offset differences ΔF of (3,2), whereas the second sub-scan feed set having the feed amounts of (9,11) has the combination of the offset difference ΔF of (3,5). As described above, in the case of the nozzle pitch k equal to 6 dots, when the offset difference $\Delta F$ for the sub-scan feed amount is equal to either 1 dot or 5 dots, adjoining raster lines are recorded by the successive two main scans. As clearly understood from FIG. 31(A), the offset difference $\Delta F$ is equal to 5 in the 6th sub-scan feed and the 12th sub-can feed, so that adjoining raster lines are the target of recording in the two main scans before and after each of these sub-scan feeds.

FIG. 32 shows the nozzle numbers for recording the effective raster lines in the fifth embodiment of the dot recording scheme for k=6. From this table, it is confirmed that adjoining raster lines are the target of recording in successive two main scans. For example, the main scan after the 5th sub-scan feed records the 5th raster line, and the main scan after the 6th sub-scan feed records the adjoining 4th raster line.

FIGS. 33(A) and 33(B) show a sixth embodiment of the dot recording scheme for k=6. The scanning parameters of this dot recording scheme are substantially similar to those of the fifth embodiment for k=6 shown in FIGS. 31(A) and 31(B), except for the sub-scan feed amounts. In the sixth embodiment for k=6, the two different combinations of sub-scan feed amounts of (9,8) and (9,14) are used respectively as the first sub-scan feed set and the second sub-scan feed set. In both of the two sets of sub-scan feeds, the combination of the offset differences $\Delta F$ is (3,2). This means that adjoining raster lines are not recorded by successive two main scans. From this point of view, the sixth embodiment for k=6 is preferable to the fifth embodiment for k=6.

FIG. 34 shows the nozzle numbers for recording the effective raster lines in the sixth embodiment of the dot recording scheme for k=6. From this table, it is confirmed that adjoining raster lines are not the target of recording in successive two main scans.

FIG. 35 shows a seventh embodiment of the dot recording scheme for k=6. The scanning parameters of this dot recording scheme include the nozzle pitch k equal to 6 dots, the number of used nozzles N equal to 34, the number of scan repeats s equal to 4, and the number of effective nozzles Neff equal to 8.5. The parameters with respect to the virtual nozzle array include the number of scans in one scan set equal to 2, the virtual nozzle pitch n equal to 3 dots, and the number of nozzles Nps in the virtual nozzle array equal to 68. One combination of the feed amounts of (9,8) is repeatedly used for the sub-scan feed set.

The numerals 0, 1, 2, and 3 written in the lower most row of "dot recording position" of the table of FIG. 35(A) indicates the four different dot positions on each raster line. The numeral j (j=0 to 3) accordingly indicates the positions whose coordinates give the remainder j when the coordinates are divided by 4 (that is, the dot positions of %j). In other words, each raster line is divided into these four dot positions, and the whole raster line is recorded by the four main scans.

Figure 36:
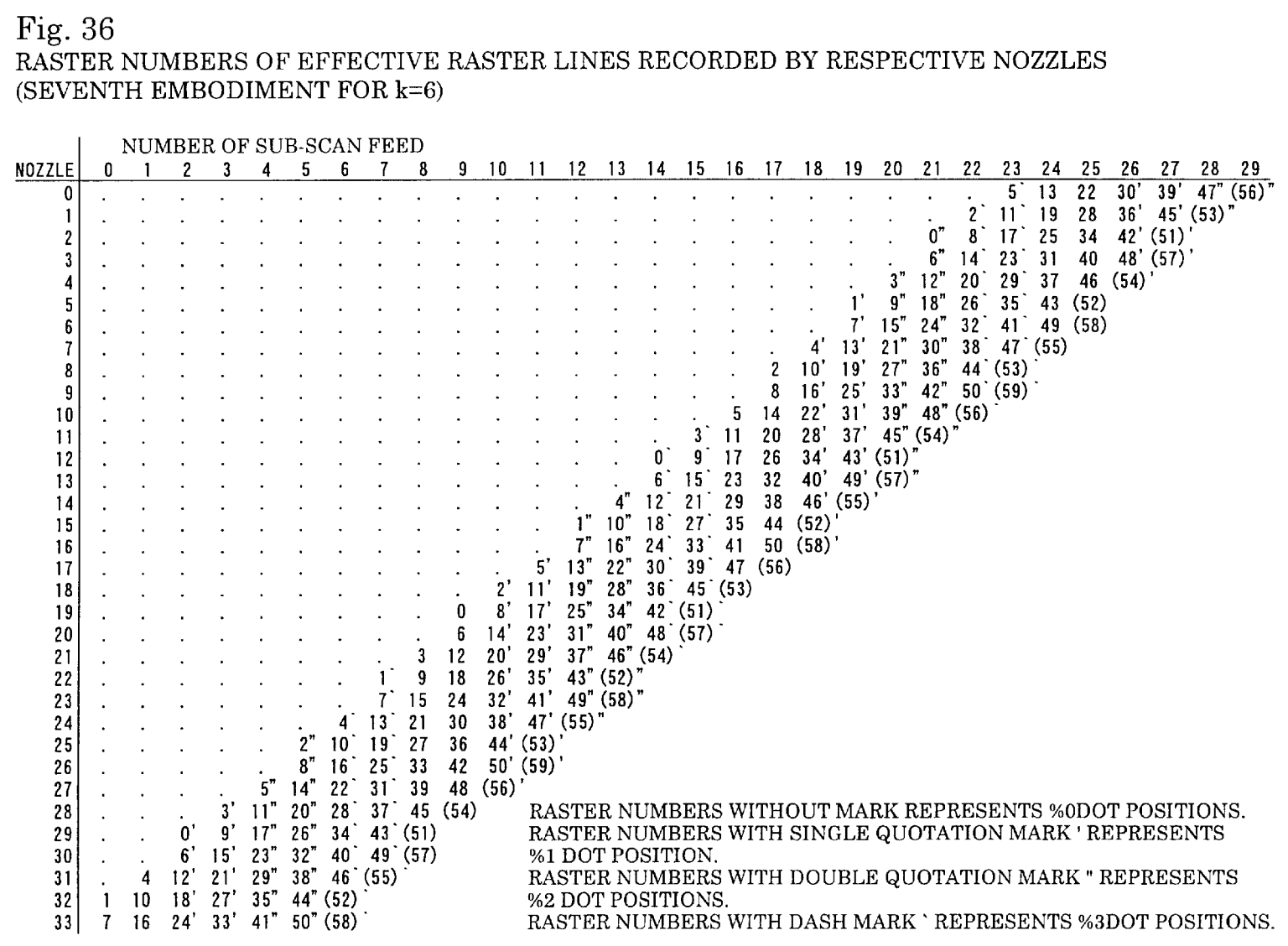

FIG. 36 shows the raster numbers of the effective raster lines recorded by the respective nozzles in the seventh embodiment of the dot recording scheme for k=6. FIG. 37 shows the nozzle numbers for recording the effective raster lines. FIG. 37 clearly shows that adjoining raster lines are not the target of recording in successive two main scans.

FIGS. 38(A) and 38(B) show an eighth embodiment of the dot recording scheme for k=6. This dot recording scheme is characterized by alternate execution of a scan using 15 nozzles and another scan using 16 nozzles. Namely the number of used nozzles N is varied so that one nozzle is not used alternately. The number of effective nozzles Neff is accordingly equal to 15.5 (the average of 15 and 16). The lower most row of the table of FIG. 38(A) shows the unused nozzle number. The 0th nozzle is not used in the main scans after the even numbered sub-scans. The sixteen nozzles including the 0th nozzle are used in the main scans after the odd numbered sub-scans.

The other scanning parameters in the eighth embodiment for k=6 include the nozzle pitch k equal to 6 dots and the number of scan repeats s equal to 1. The parameters with respect to the virtual nozzle array include the number of scans in one scan set equal to 2, the virtual nozzle pitch n equal to 3 dots, and the number of nozzles Nps in the virtual nozzle array equal to 31. One combination of the feed amounts of (3,28) is repeatedly used for the sub-scan feed set. Since the offset difference $\Delta F$ for the last sub-scan feed in each set is equal to 4, which is neither 1 nor 5, adjoining raster lines are not the target of recording in successive two main scans.

FIG. 39 shows the nozzle numbers for recording the effective raster lines in the eighth embodiment of the dot recording scheme for k=6. From this table, it is confirmed that adjoining raster lines are not the target of recording in successive two main scans.

FIGS. 40(A) and 40(B) show a ninth embodiment of the dot recording scheme for k=6. The scanning parameters of this dot recording scheme include the nozzle pitch k equal to 6 dots, the number of used nozzles N equal to 14, the number of scan repeats s equal to 2, and the number of effective nozzles Neff equal to 7. The parameters with respect to the virtual nozzle array include the number of scans in one scan set equal to 3, the virtual nozzle pitch n equal to 2 dots, and the number of nozzles Nps in the virtual nozzle array equal to 42. One combination of the feed amounts of (8,8,5) is repeatedly used for the sub-scan feed set.

This dot recording scheme is characterized by the fact that combination of the nozzle positions in three scans constructs a virtual nozzle array. The combination of the feed amounts is (8,8,5) in one sub-scan feed set, and it corresponds to the combination of the offset differences $\Delta F$ of (2,2,5). Combining the nozzle positions in three scans constructs a virtual nozzle array having the virtual nozzle pitch n equal to 2 dots and the number of virtual nozzles Nps equal to 42.

The variation of the offset F and the variation of the offset difference $\Delta F$ shown in the table of FIG. 40(A) are identical with those of FIG. 9(B) described before. The nozzle positions similar to those of FIG. 11 are accordingly attained in the ninth embodiment for k=6.

FIG. 41 shows the nozzle numbers for recording the effective raster lines in the ninth embodiment of the dot recording scheme for k=6. The right most column of this table corresponds to the actual nozzle positions shown in the upper half of FIG. 11.

In the embodiments discussed above, the combination of the nozzle positions in m main scans constructs a virtual nozzle array having the virtual nozzle pitch equal to n dots. This arrangement enables the appropriate dot recording scheme to be readily established for the nozzle pitch k and thereby ensures a recorded image of high quality. Especially when the nozzle pitch k is equal to 6 dots, it is generally difficult to establish a recording scheme to attain high quality images. The construction of the virtual nozzle array, however, enables an appropriate dot recording scheme to be established relatively easily.

The present invention is not restricted to the above embodiments or their applications, but there may be many modifications, changes, and alterations without departing from the scope or spirit of the main characteristics of the present invention. Some examples of possible modification are given below.

Although the above embodiments are concerned with dot recording schemes for one color, application of the dot recording scheme to each color will implement color printing with plural colors of inks.

The principle of the present invention is applicable not only to the color printing but to the monochrome printing. The present invention is also applicable to the printing that expresses each pixel with a plurality of dots to attain multi-tones. The present invention is further applicable to drum scan printers. In the drum scan printer, the rotating direction of the drum corresponds to the main scanning direction, and the feeding direction of the carriage corresponds to the sub-scanning direction. The present invention is applicable not only to the ink jet printers but in general to any dot recording apparatuses that record dots on the surface of a printing medium with a recording head having plural arrays of dot-forming elements. The "dot-forming elements" here denote elements for forming the dots, such as the ink nozzles in the ink jet printer.

The principle of the present invention is also applicable to the printers in which different values can be set to the dot pitches (the recording resolutions) in the main scanning direction and the sub-scanning direction, respectively. In this case, the unit of the sub-scan feed amount L [dots] and the nozzle pitch k [dots] are defined by the dot pitch in the sub-scanning direction.

The structure embodied by hardware circuitry in the above embodiments can be replaced by software, and on the contrary, the structure embodied by software can be replaced by hardware circuitry. For example, the function of the control circuit 40 of the color printer 22 (FIG. 2) may be implemented by the computer. In this case, a computer program such as the printer driver 96 executed the same control function as that of the control circuit 40.

The computer programs for implementing those functions are provided as stored on a computer readable medium, such as floppy disks or CD-ROMs. The computer 90 reads the computer programs from the storage medium and transfer them to the internal storage device or to the external storage device. Alternatively the computer programs may be supplied from a program supply apparatus to the computer 90 via a communications path. At the time of executing the functions of the computer programs, the programs stored in the main memory are executed by the microprocessor of the computer 90. Alternatively, the computer 90 may read out computer programs stored on the storage medium to directly execute it.

In the specification hereof, the term computer 90 implies both the hardware and its operating system and more specifically represents the hardware operating under the control of the operating system. The computer programs cause the computer 90 to implement the above functions. Part of these functions may be implemented by the operating system instead of the applications programs. The "computer readable medium" in the present invention is not restricted to the portable storage medium, but includes a variety of internal storage devices in the computer, for example, RAMs and ROMs, and external storage devices connected with the computer, for example, hard disks.

The present invention may be applicable to ink-jet type monochrome printers and color printers, and to any recording apparatuses that use a recording head having plural arrays of dot-forming elements.

What is claimed is:

1. A dot recording apparatus for recording dots on a surface of a printing medium with a dot recording head, the dot recording apparatus comprising:

a dot-forming element array arranged on the dot recording head to face the printing medium, the dot-forming element array comprising a plurality of dot-forming elements for forming a plurality of dots of an identical color at a pitch of k dots in a sub-scanning direction;

a main scan driving unit that drives at least one of the dot recording head and the printing medium to carry out main scan;

a head driving unit that drives at least part of the plurality of dot-forming elements to form dots in the course of the main scan;

a sub-scan driving unit that drives at least one of the dot recording head and the printing medium every time when the main scan is completed, thereby carrying out sub-scan; and a control unit that controls the respective units according to a specific dot recording mode specifying a scheme of dot recording, wherein the pitch k of the dot-forming elements is expressed as a product m·n of two integers m and n (where m and n are integers of no less than 2); and wherein the sub-scan feed in the specific dot recording mode is executed by plural sub-scan feed sets each consisting of m sub-scan feeds; and wherein when feed amounts of the m sub-scan feeds in each sub-scan feed set are expressed as Li dots (where i is an integer of 1 to m), the feed amounts Li (i=1 to (m−1)) at first through (m−1)-th sub-scan feeds are established so that a remainder obtained by dividing each feed amount Li by the pitch k is equal to the integer n; and a feed amount Lm in the m-th sub-scan is established so that a remainder obtained by dividing the feed amount Lm by the pitch k is an integer that is different from a value n·j that is j times the integer n (where j denotes an arbitrary integer).

2. A dot recording apparatus in accordance with claim 1, wherein the plural sub-scan feed sets is constituted from a single type of sub-scan feed set which has an identical combination of the feed amounts for the m sub-scan feeds.

3. A dot recording apparatus in accordance with claim 2, wherein the feed amount Lm in the m-th sub-scan is established so that the remainder obtained by dividing the feed amount Lm by the pitch k is an integer other than 1 and (k−1).

4. A dot recording apparatus in accordance with claim 1, wherein the plural sub-scan feed sets is constituted from plural different types of sub-scan feed sets which have different combinations of the feed amounts for the m sub-scan feeds.

5. A dot recording apparatus in accordance with claim 1, wherein the feed amount Lm in the m-th sub-scan is established so that the remainder obtained by dividing the feed amount Lm by the pitch k is an integer other than 1 and (k−1).

6. A dot recording apparatus in accordance with claim 4, wherein the remainder obtained by dividing the feed amount Lm for the m-th sub-scan in each sub-scan feed set by the pitch k is fixed to a constant integer that is common to all of the sub-scan feed sets.

7. A dot recording apparatus in accordance with claim 5, wherein the pitch k is equal to 6, the integer m is equal to 2, the integer n is equal to 3, and the remainder obtained by dividing the feed amount Lm in the m-th sub-scan by the pitch k is equal to 2 or 4.

8. A dot recording apparatus in accordance with claim 5, wherein the pitch k is equal to 4, and the specific dot recording mode includes a sub-scan feed amount which changes by 2 a remainder obtained by dividing a summation of sub-scan feed amounts by 4.

9. A dot recording apparatus in accordance with claim 8, wherein a number of effective dot-forming elements is set at an integer which is no less than 2 and which is not prime relative to 4, in the specific dot recording mode, the number of effective dot-forming elements representing a net number of raster lines in a main scanning direction which can be recorded by one main scan.

10. A dot recording apparatus in accordance with claim 1, wherein a number of dot-forming elements used for a main scan after at least one sub-scan out of the m sub-scans is varied in each sub-scan feed set.

11. A method of recording dots on a surface of a printing medium with a dot recording head while carrying out main scan in a direction substantially perpendicular to a sub-scanning direction, the dot recording head having a dot-forming element array including a plurality of dot-forming elements for forming a plurality of dots of an identical color arranged at a pitch of k dots in the sub-scanning direction, the method comprising the steps of:

(a) driving at least one of the dot recording head and the printing medium to carry out main scan;

(b) driving at least part of the plurality of dot-forming elements to form dots in the course of the main scan; and (c) driving at least one of the dot recording head and the printing medium every time when the main scan is completed, thereby carrying out sub-scan;

wherein the pitch k of the dot-forming elements is expressed as a product m·n of two integers m and n (where m and n are integers of no less than 2); and wherein the sub-scan feed in the step (c) is executed by plural sub-scan feed sets each consisting of m sub-scan feeds; and wherein when feed amounts of the m sub-scan feeds in each sub-scan feed set are expressed as Li dots (where i is an integer of 1 to m), the feed amounts Li (i=1 to (m−1)) at first through (m−1)-th sub-scan feeds are established so that a remainder obtained by dividing each feed amount Li by the pitch k is equal to the integer n; and a feed amount Lm in the m-th sub-scan is established so that a remainder obtained by dividing the feed amount Lm by the pitch k is an integer that is different from a value n·j that is j times the integer n (where j denotes an arbitrary integer).

12. A method in accordance with claim 11, wherein the plural sub-scan feed sets is constituted from a single type of sub-scan feed set which has an identical combination of the feed amounts for the m sub-scan feeds.

13. A method in accordance with claim 11, wherein the plural sub-scan feed sets is constituted from plural different types of sub-scan feed sets which have different combinations of the feed amounts for the m sub-scan feeds.

14. A method in accordance with claim 11, wherein the feed amount Lm in the m-th sub-scan is established so that the remainder obtained by dividing the feed amount Lm by the pitch k is an integer other than 1 and (k−1).

15. A method in accordance with claim 14, wherein the remainder obtained by dividing the feed amount Lm for the m-th sub-scan in each sub-scan feed set by the pitch k is fixed to a constant integer that is common to all of the sub-scan feed sets.

16. A method in accordance with claim 14, wherein the pitch k is equal to 6, the integer m is equal to 2, the integer n is equal to 3, and the remainder obtained by dividing the feed amount Lm in the m-th sub-scan by the pitch k is equal to 2 or 4.

17. A method in accordance with claim 14, wherein the pitch k is equal to 4, and the specific dot recording mode includes a sub-scan feed amount which changes by 2 a remainder obtained by dividing a summation of sub-scan feed amounts by 4.

18. A method in accordance with claim 17, wherein a number of effective dot-forming elements is set at an integer which is no less than 2 and which is not prime relative to 4, in the specific dot recording mode, the number of effective dot-forming elements representing a net number of raster lines in a main scanning direction which can be recorded by one main scan.

19. A method in accordance with claim 11, wherein a number of dot-forming elements used for a main scan after at least one sub-scan out of the m sub-scans is varied in each sub-scan feed set.

20. A computer program product storing a computer program for causing a printing apparatus to record dots on a surface of a printing medium while carrying out main scan in a direction substantially perpendicular to a sub-scanning direction, the printing apparatus comprising a dot recording head having a dot-forming element array including a plurality of dot-forming elements for forming a plurality of dots of an identical color arranged at a pitch of k dots in the sub-scanning direction, the computer program product comprising:

a computer readable medium; and a computer program stored on the computer readable medium for controlling the printing apparatus according to a specific dot recording mode that specifies a dot recording scheme, wherein, in the specific dot recording mode, the pitch k of the dot-forming elements is expressed as a product m·n of two integers m and n (where m and n are integers of no less than 2);

the sub-scan feed is executed by plural sub-scan feed sets each consisting of m sub-scan feeds; and when feed amounts of the m sub-scan feeds in each sub-scan feed set are expressed as Li dots (where i is an integer of 1 to m), the feed amounts Li (i=1 to (m−1)) at first through (m−1)-th sub-scan feeds are established so that a remainder obtained by dividing each feed amount Li by the pitch k is equal to the integer n; and a feed amount Lm in the m-th sub-scan is established so that a remainder obtained by dividing the feed amount Lm by the pitch k is an integer that is different from a value n·j that is j times the integer n (where j denotes an arbitrary integer).

* * * * *